Figure 1:
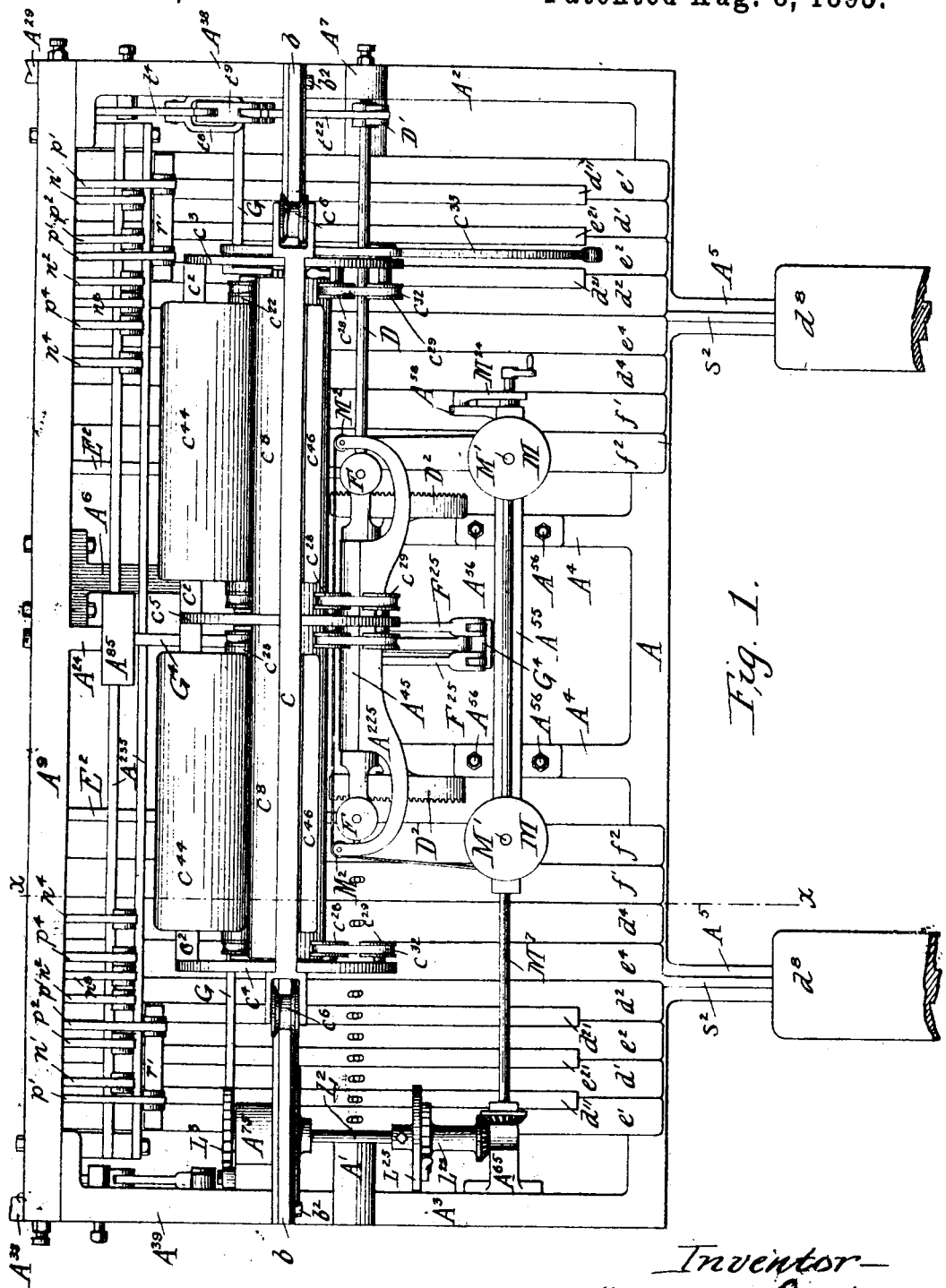
Figure 29:
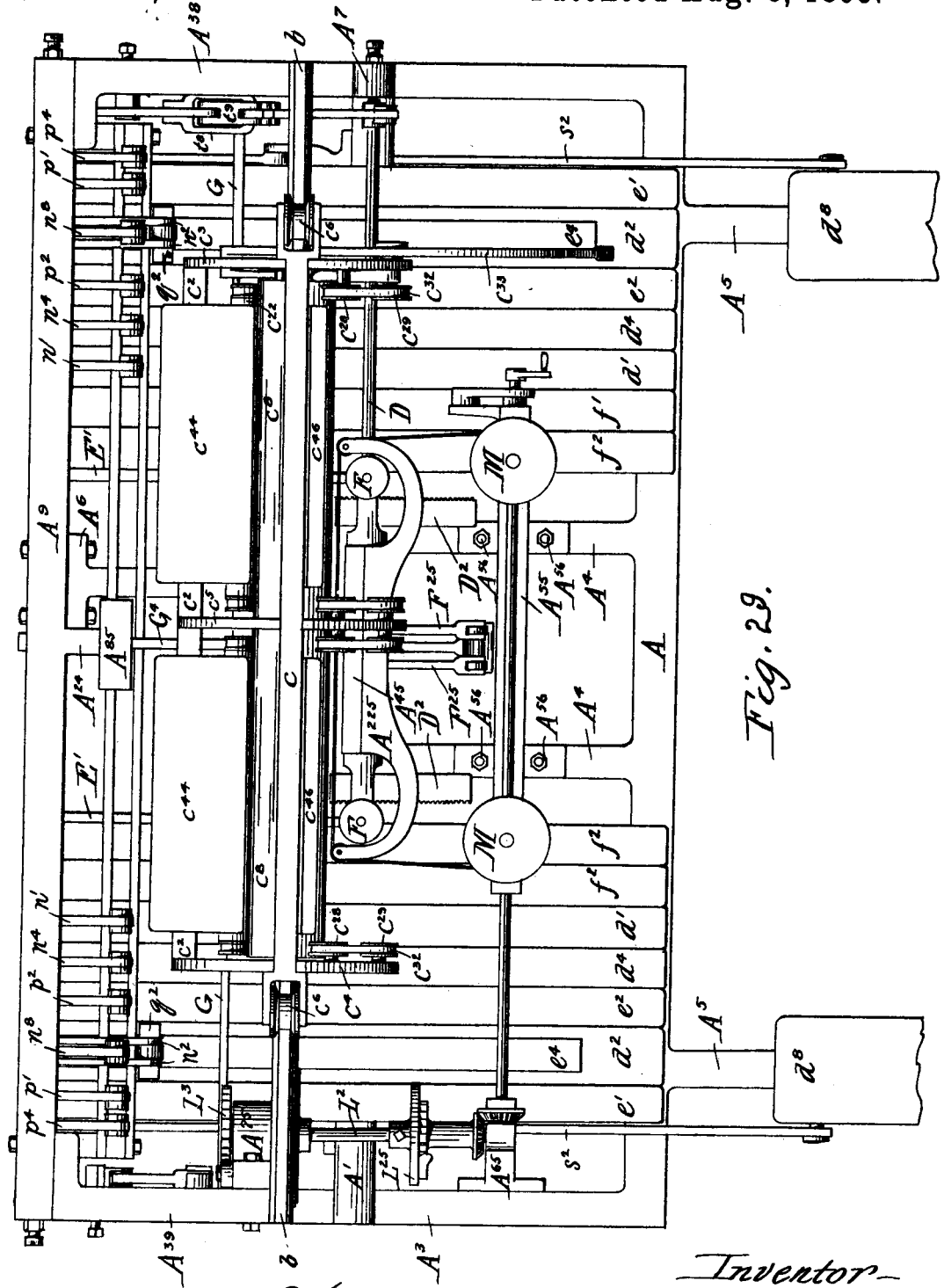

(No Model.)

T. CAHILL.
TYPE WRITING MACHINE.

No. 502,700. Patented Aug. 8, 1893.

22 Sheets—Sheet 1.

Witnesses—
W. P. Keene
Geo. H. Cahill

Inventor—
Thaddeus Cahill

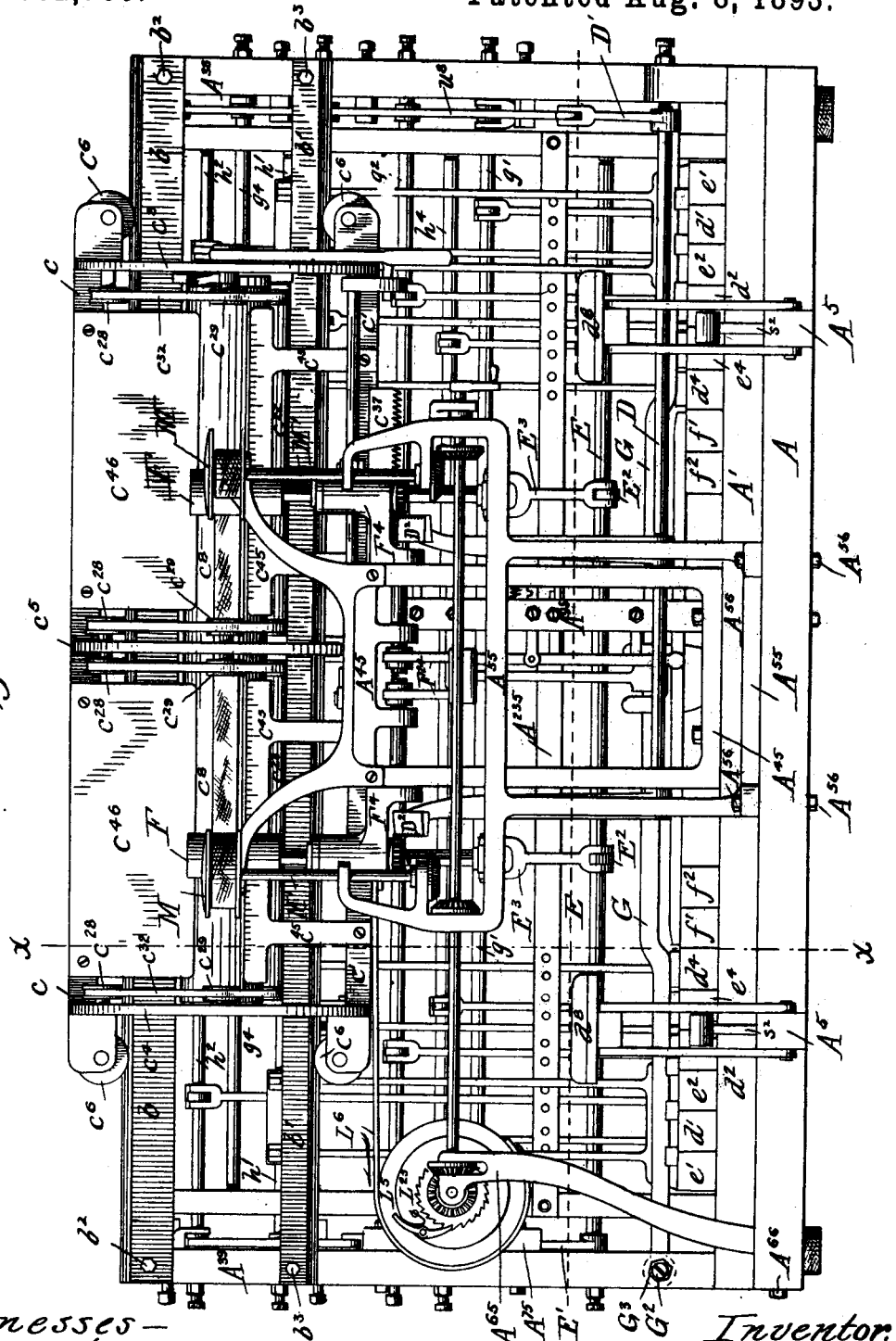

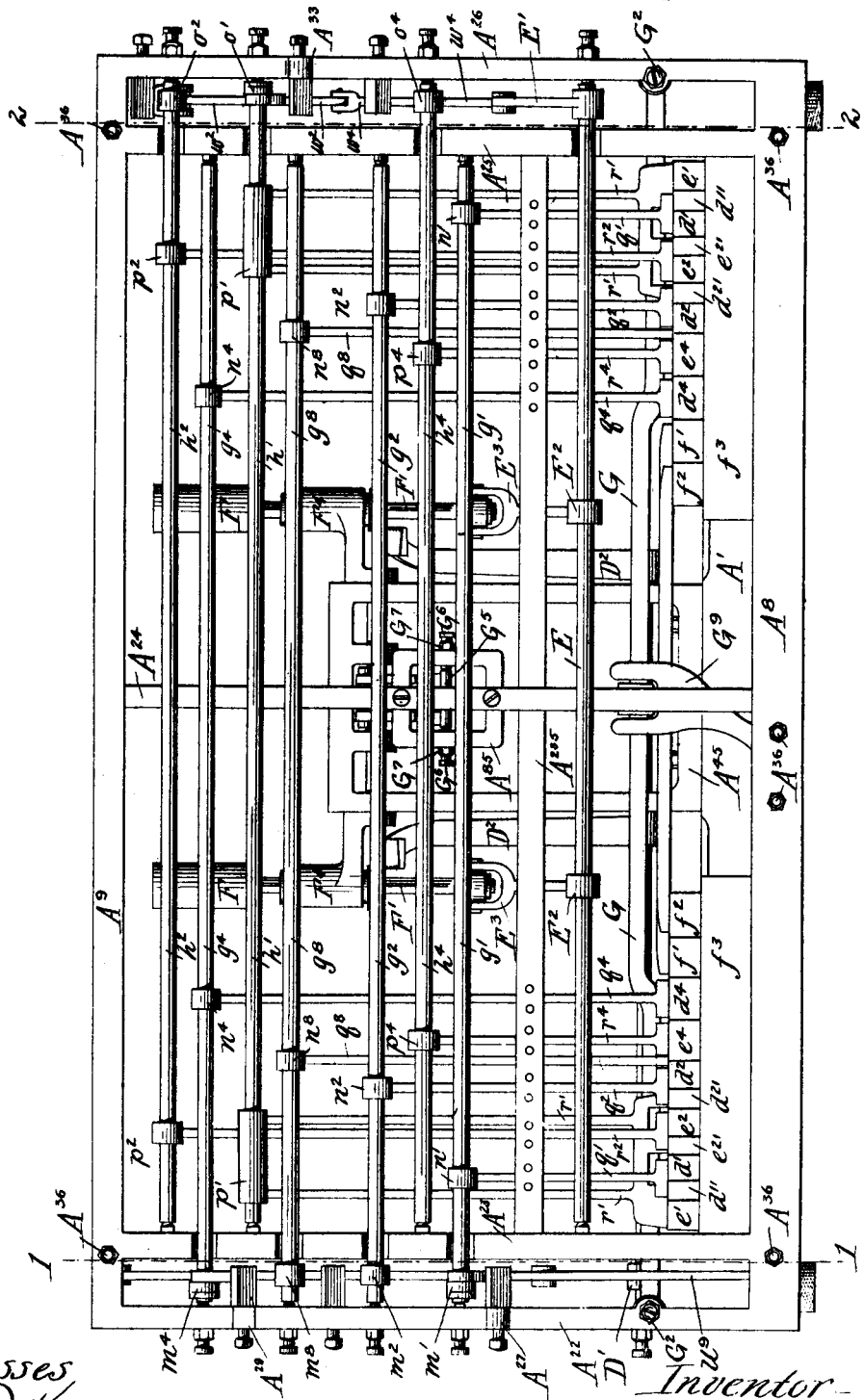

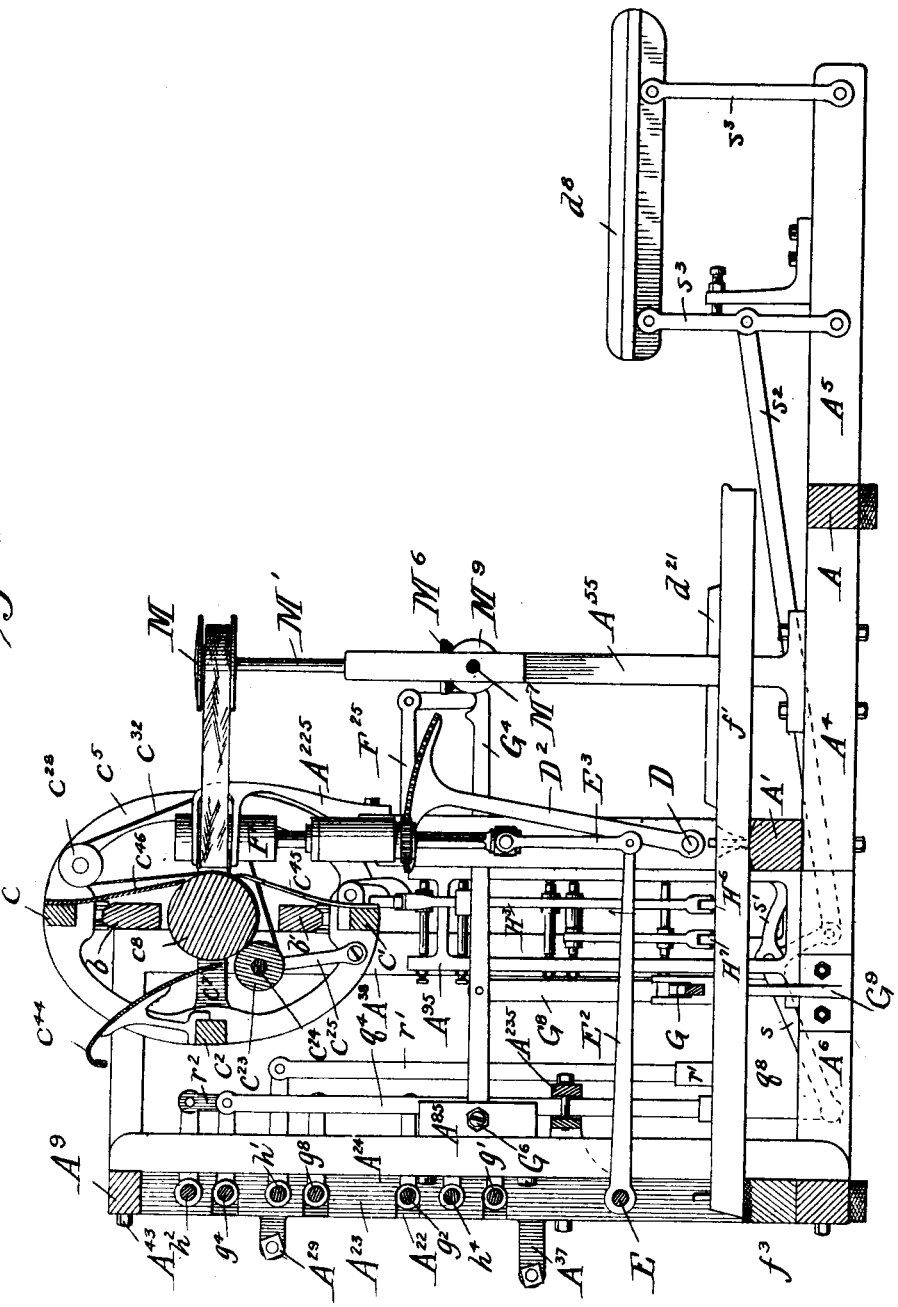

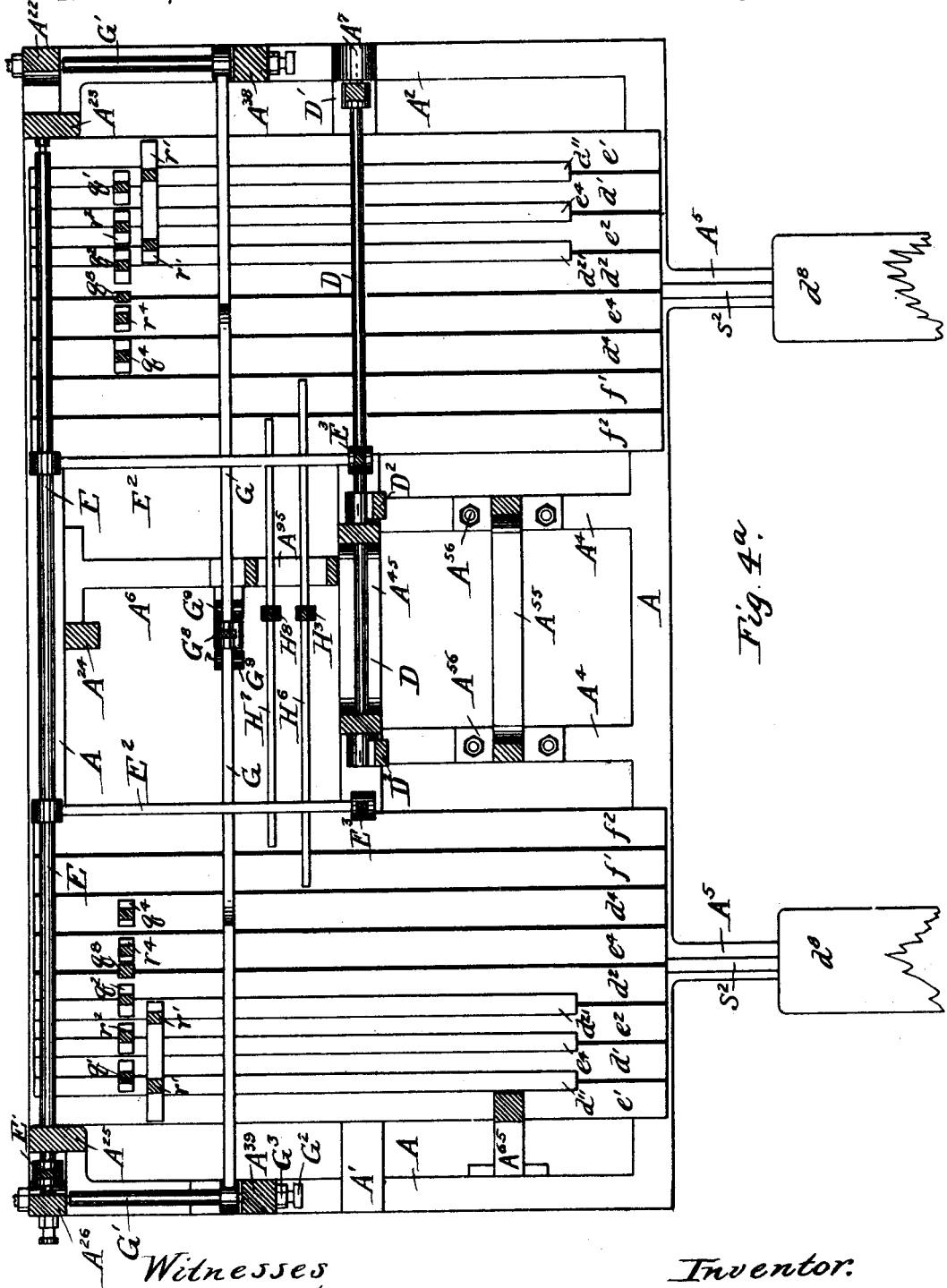

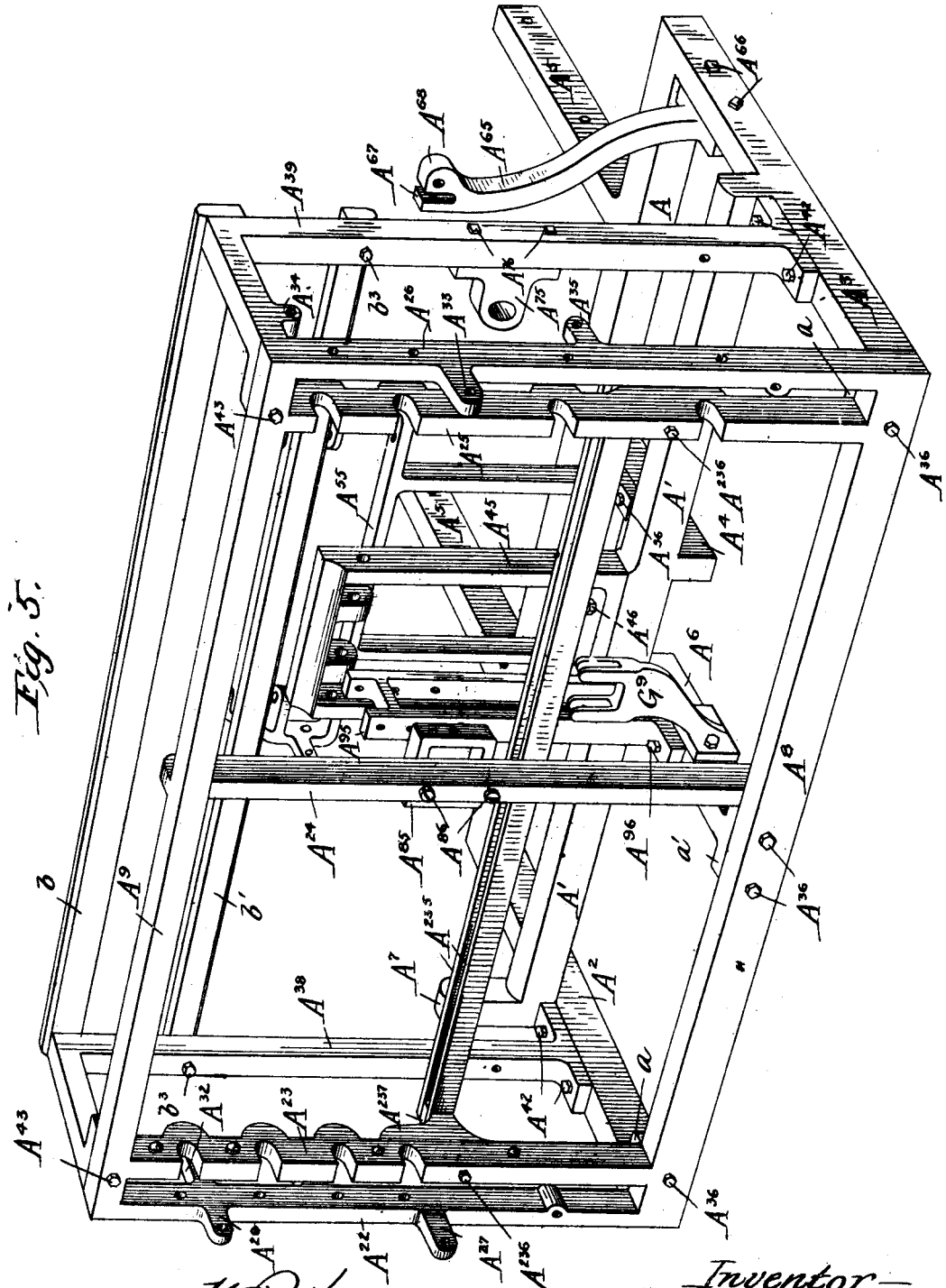

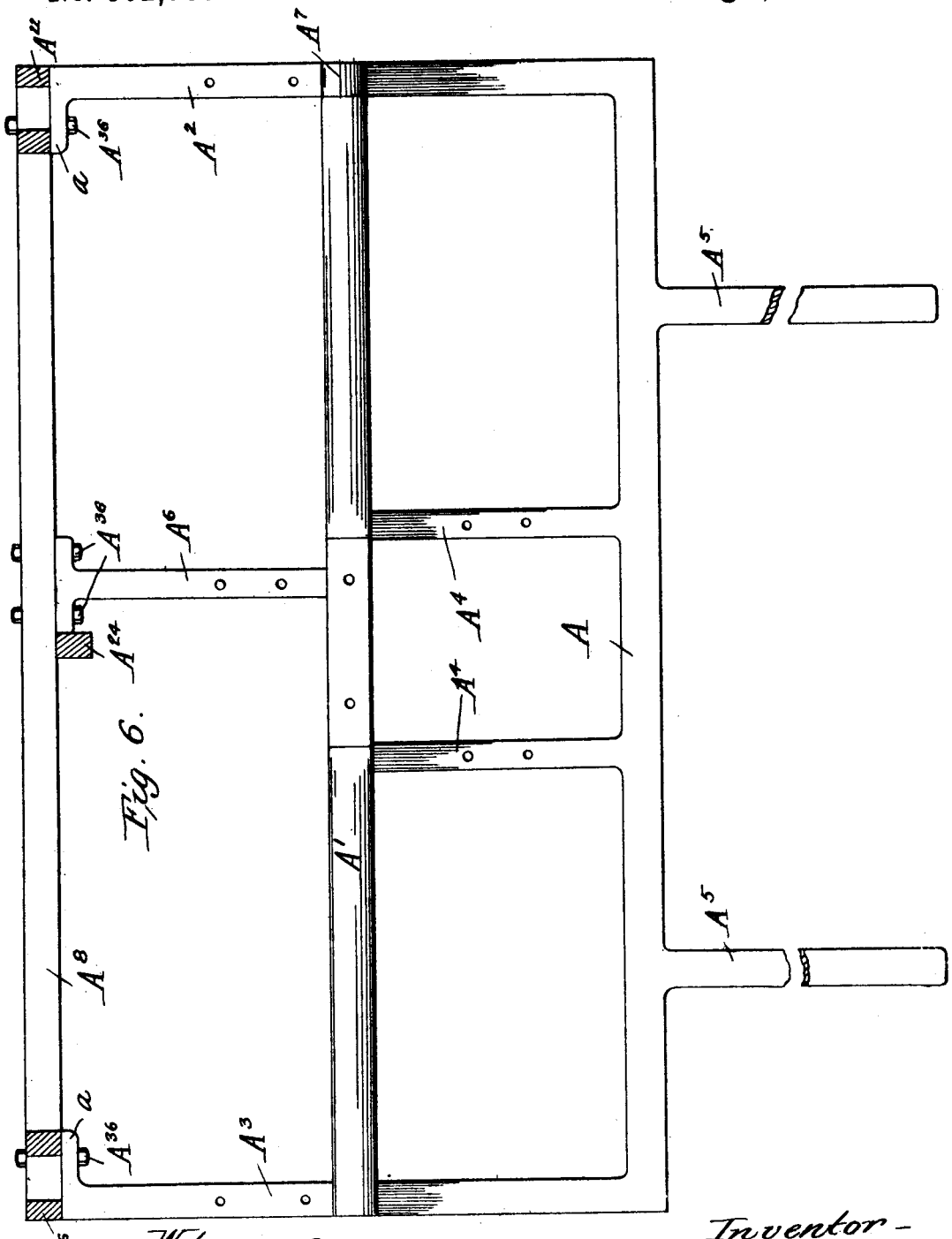

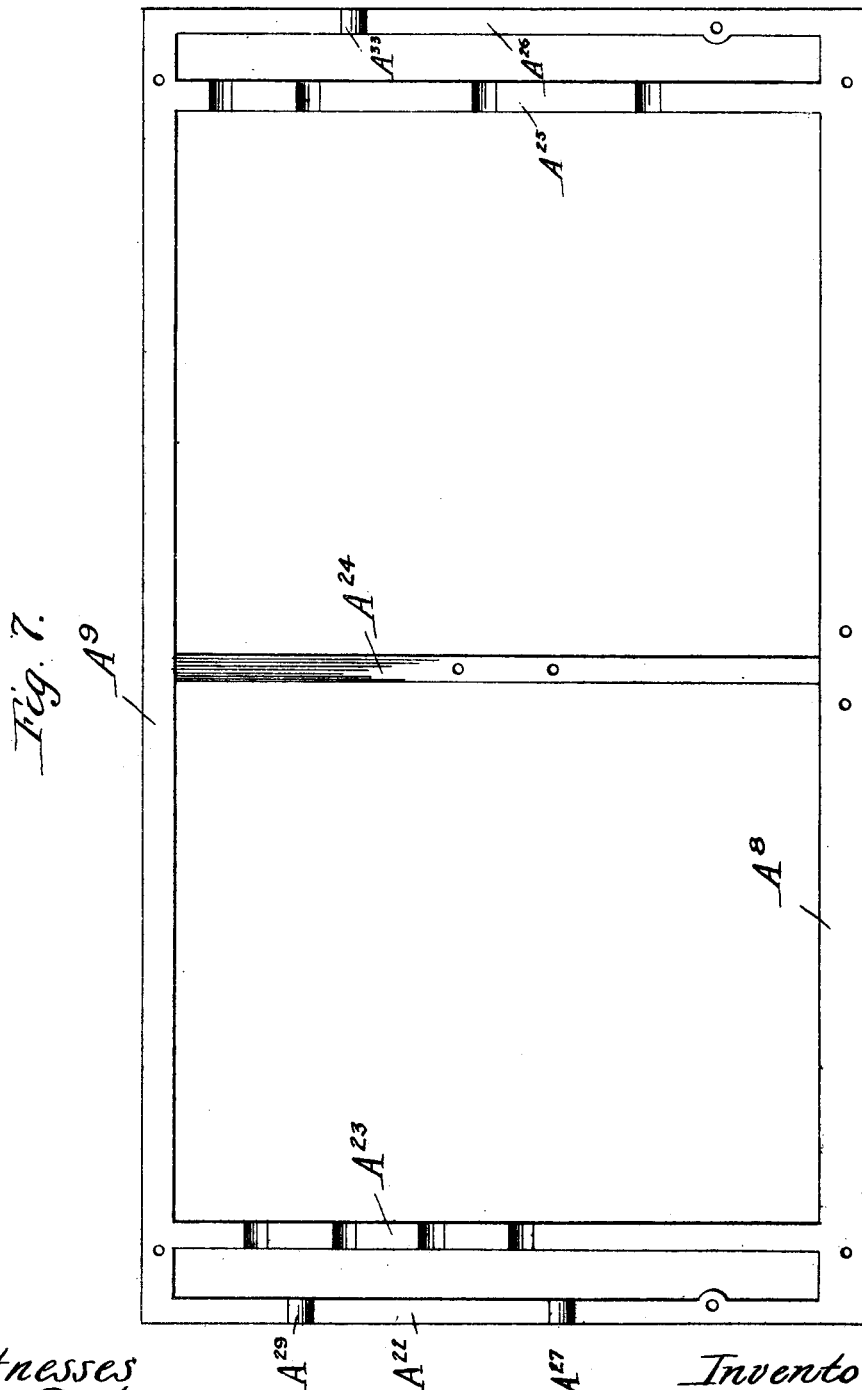

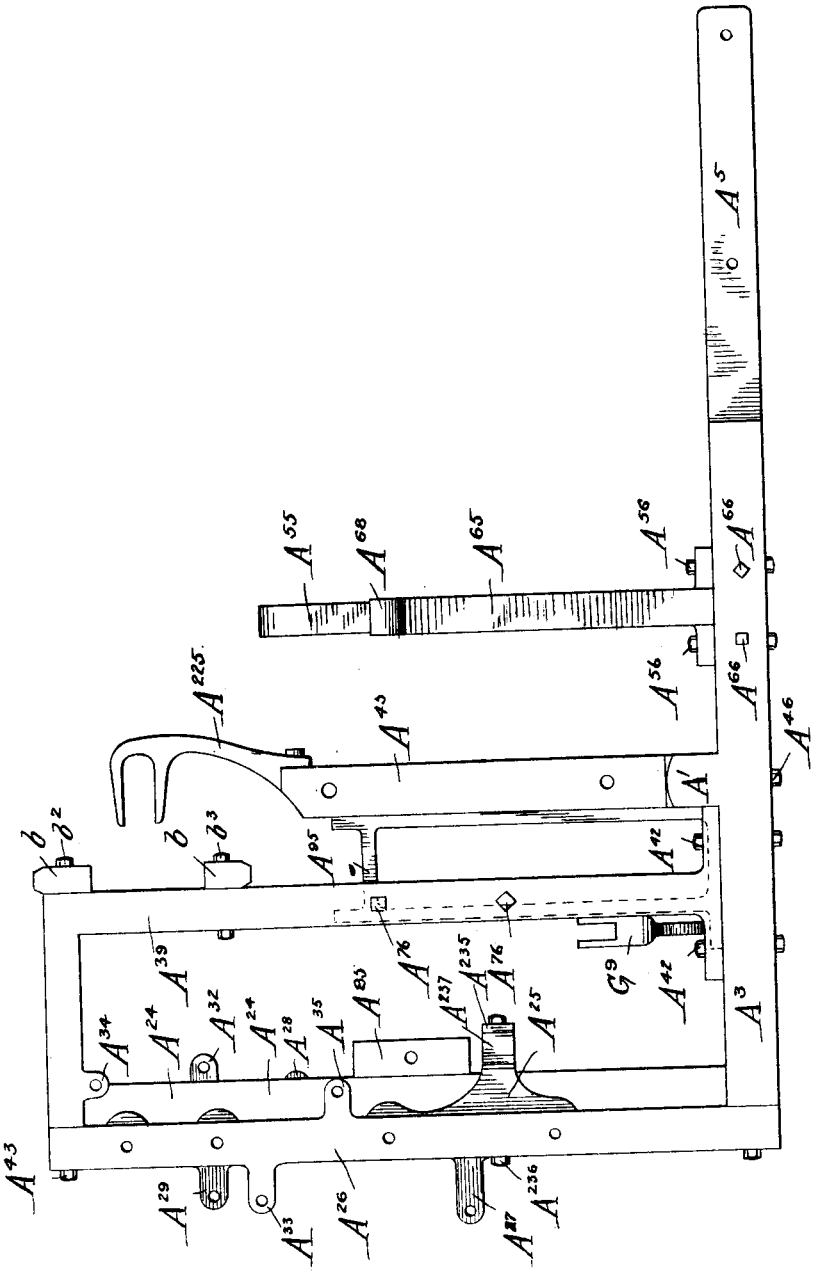

(No Model.) 22 Sheets—Sheet 10.
T. CAHILL.
TYPE WRITING MACHINE.
No. 502,700. Patented Aug. 8, 1893.
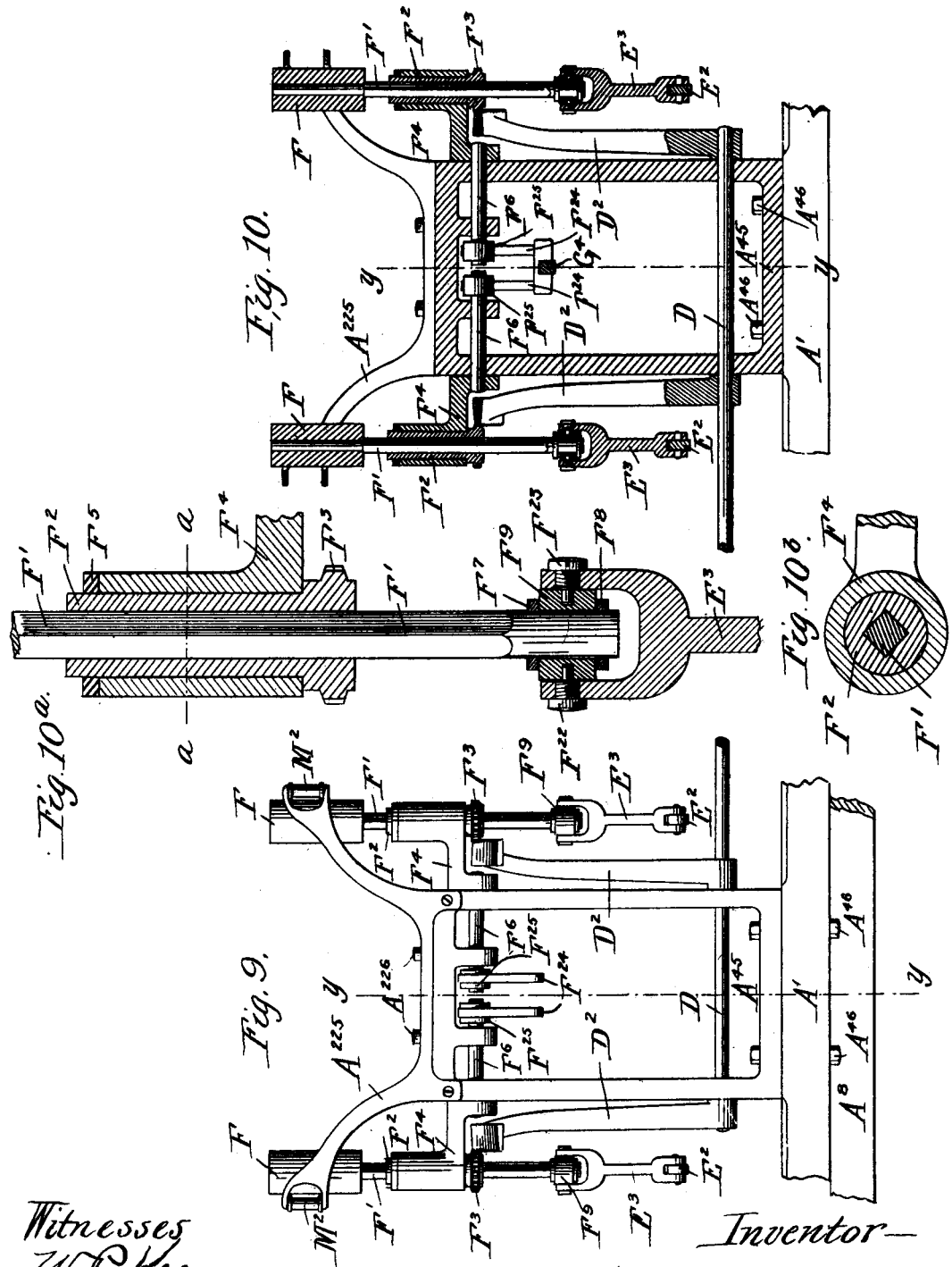

(No Model.)  T. CAHILL.  22 Sheets—Sheet 11.
TYPE WRITING MACHINE.
No. 502,700.  Patented Aug. 8, 1893.
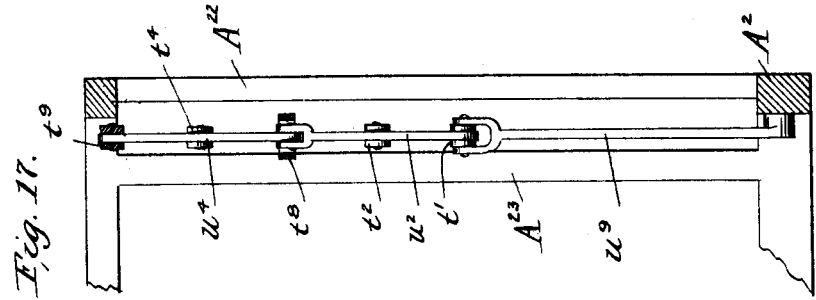
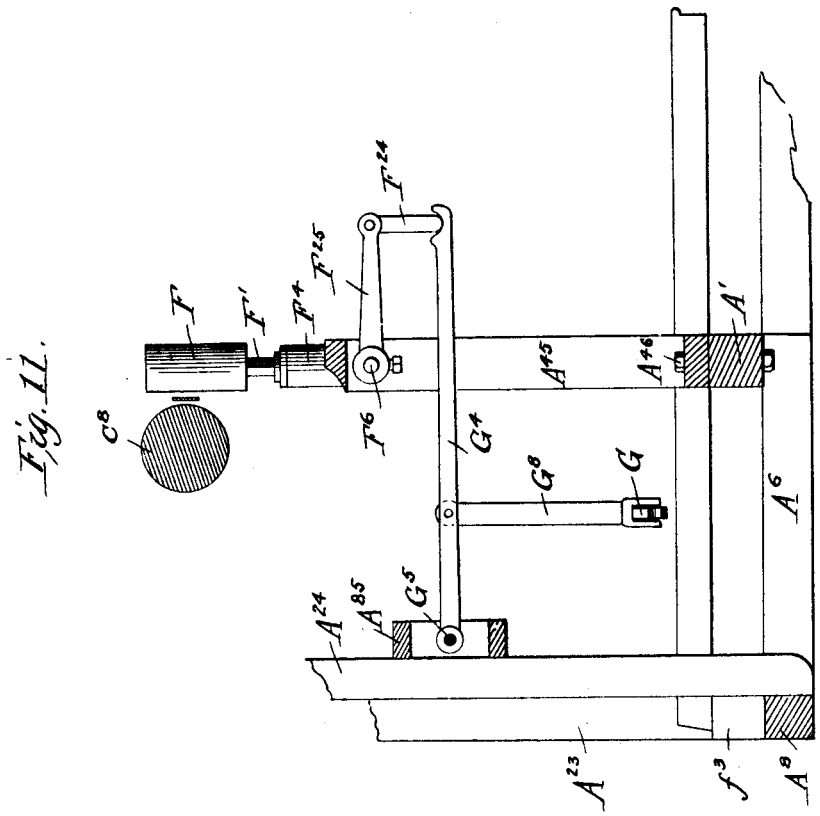

(No Model.) 22 Sheets—Sheet 12.
T. CAHILL.
TYPE WRITING MACHINE.
No. 502,700. Patented Aug. 8, 1893.
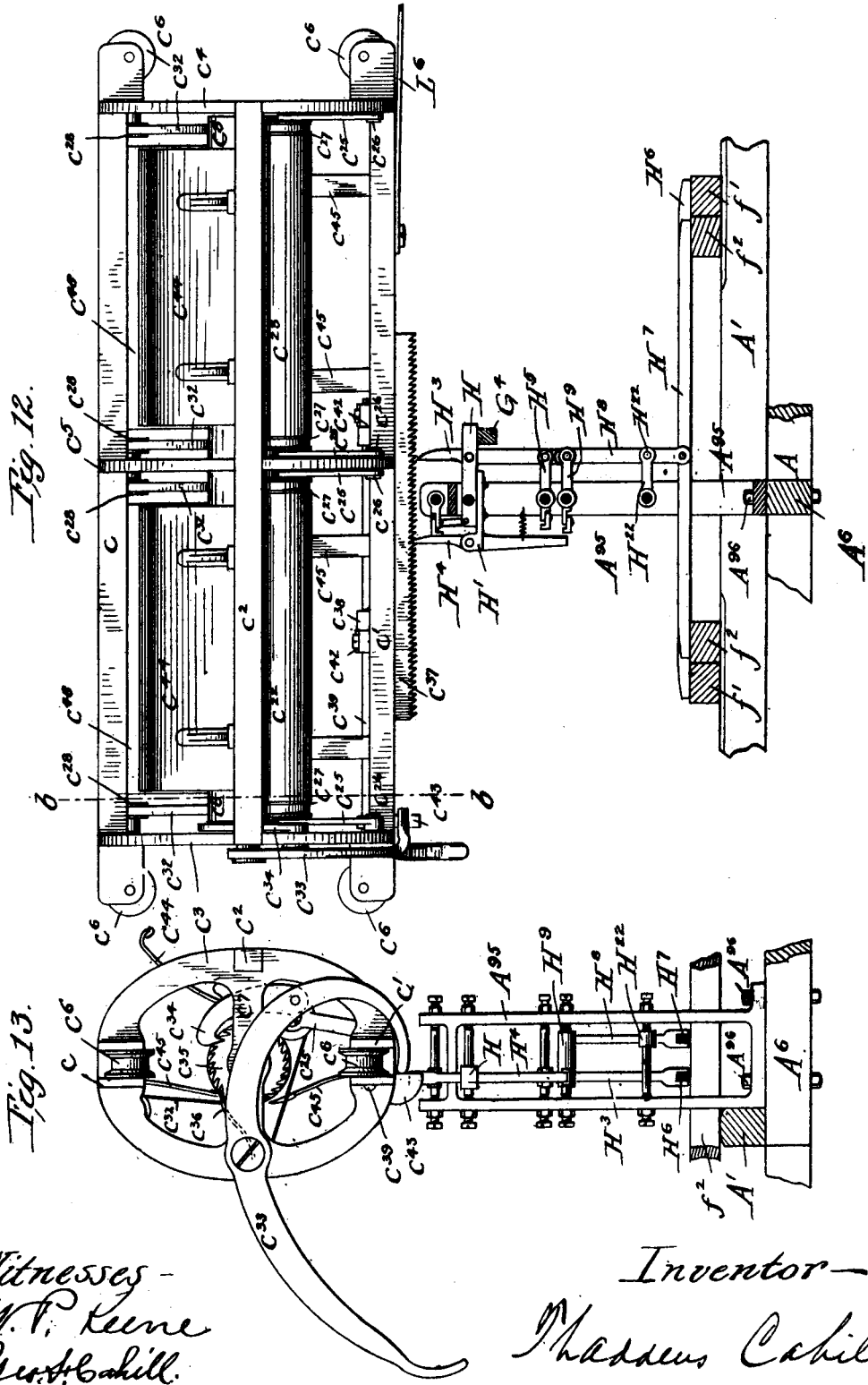
Witnesses—
W. P. Keene
Geo. H. Cahill.
Inventor—
Thaddeus Cahill.

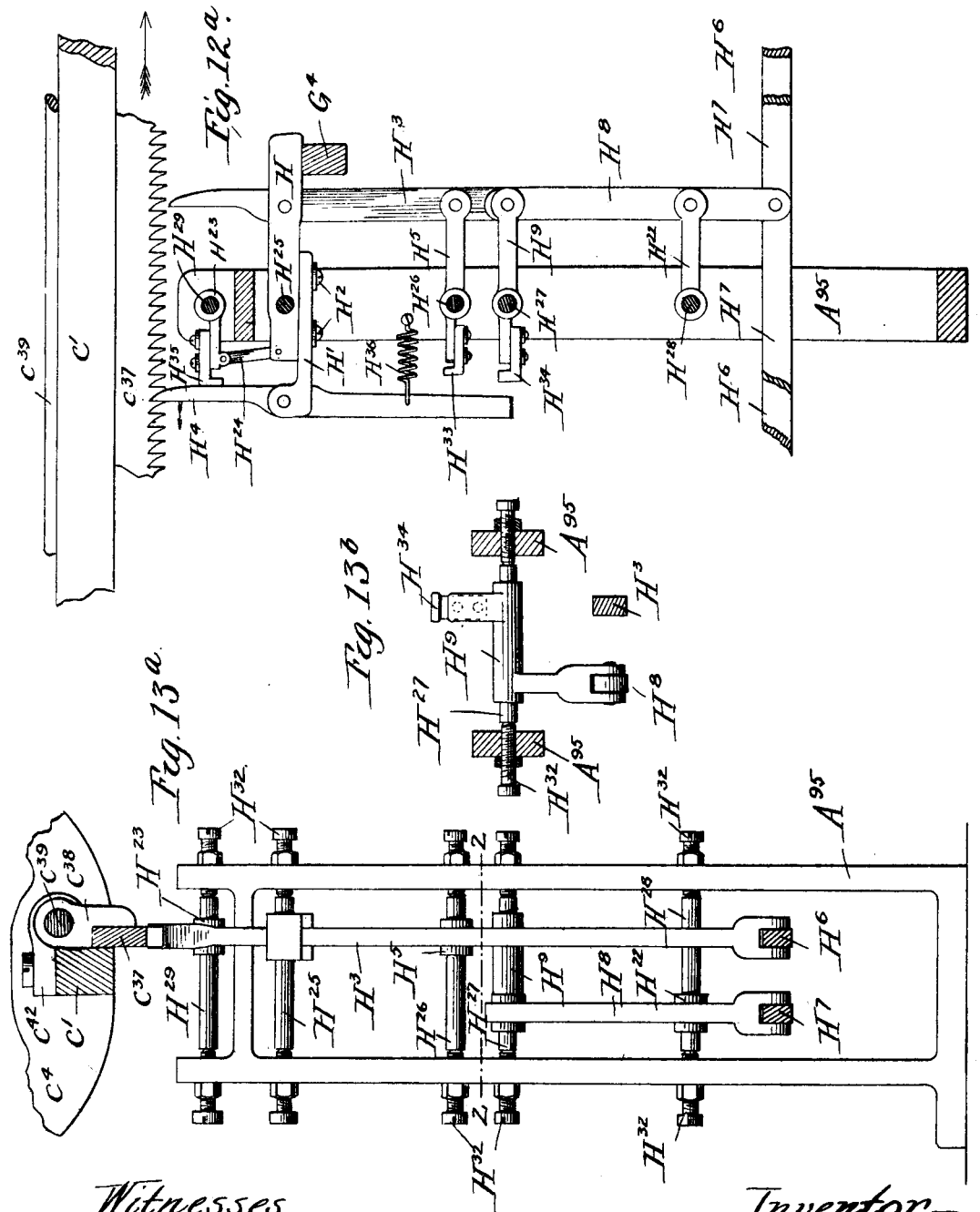

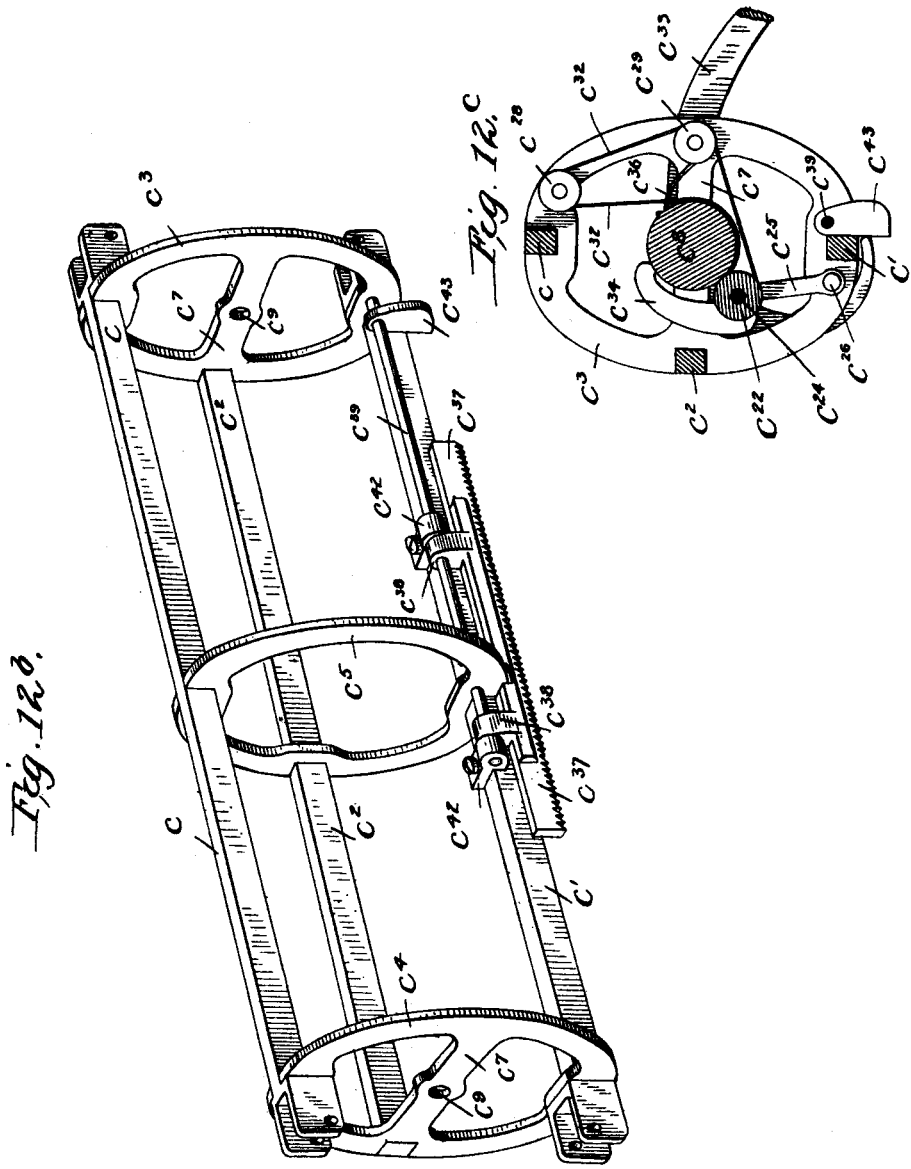

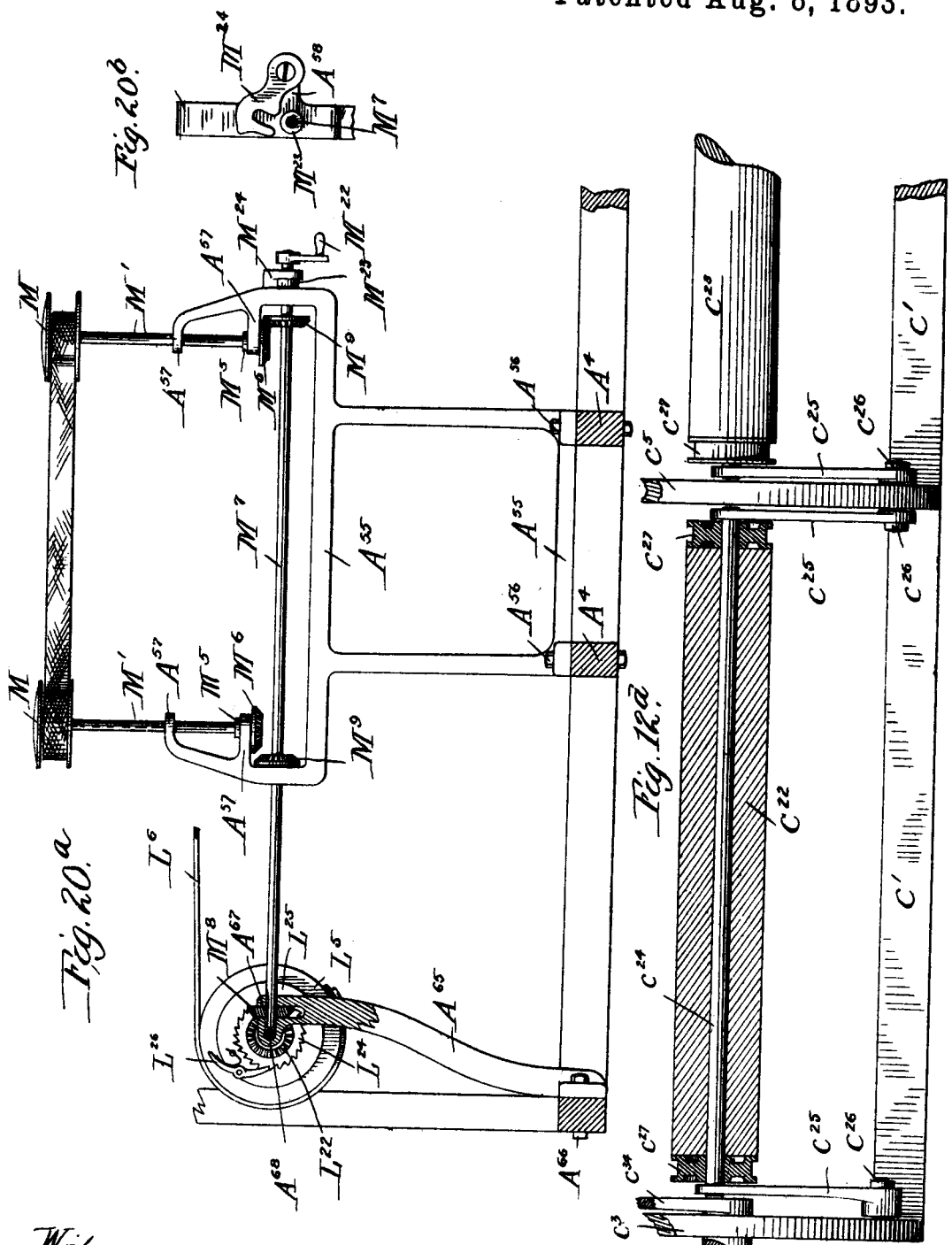

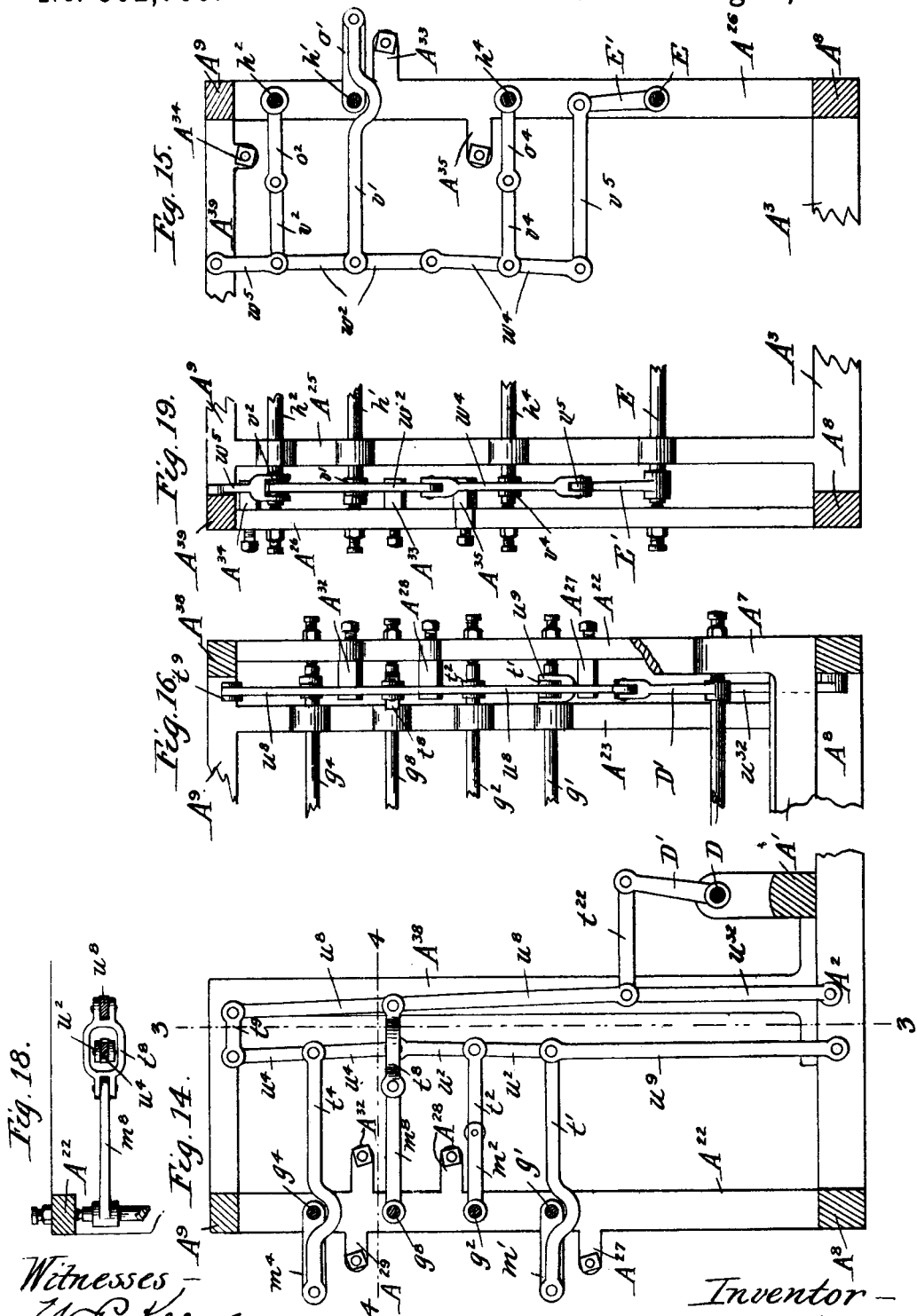

(No Model.) 22 Sheets—Sheet 17.
T. CAHILL.
TYPE WRITING MACHINE.
No. 502,700. Patented Aug. 8, 1893.
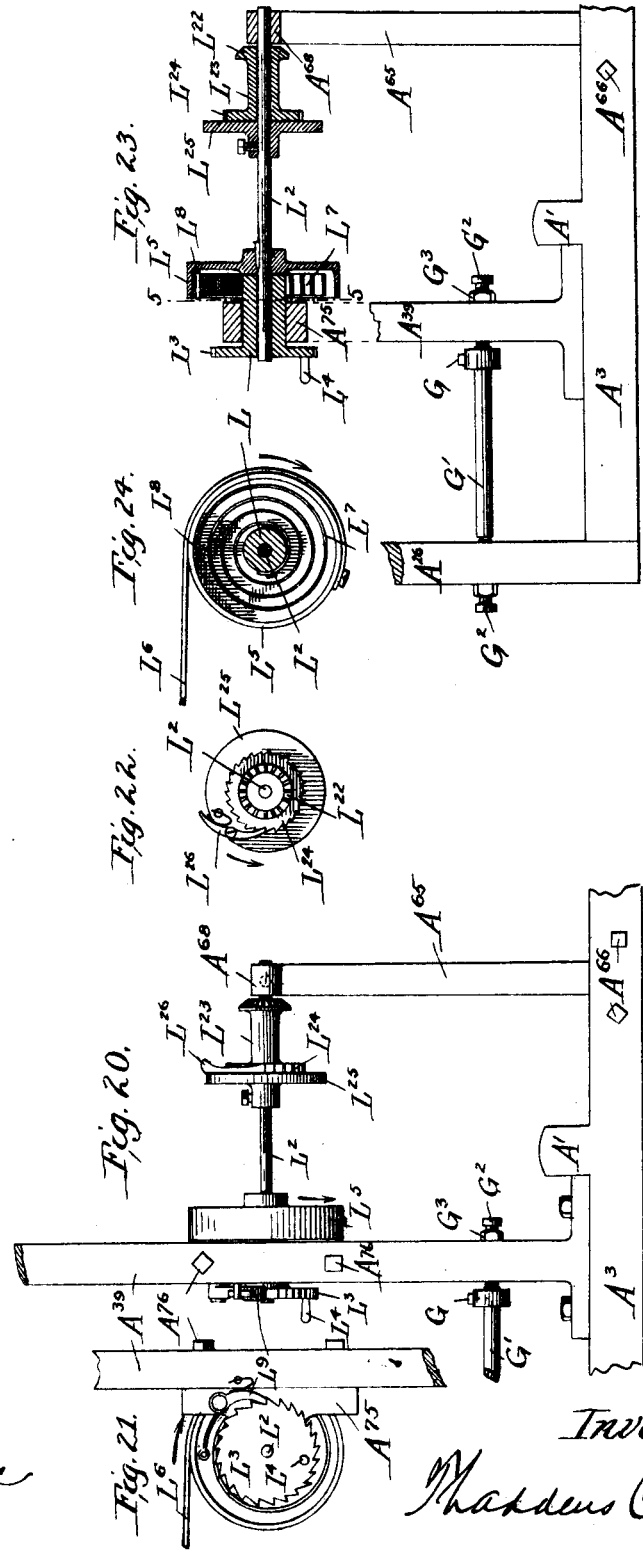
Witnesses —
W. P. Keene
Geo. H. Cahill
Inventor —
Thaddeus Cahill

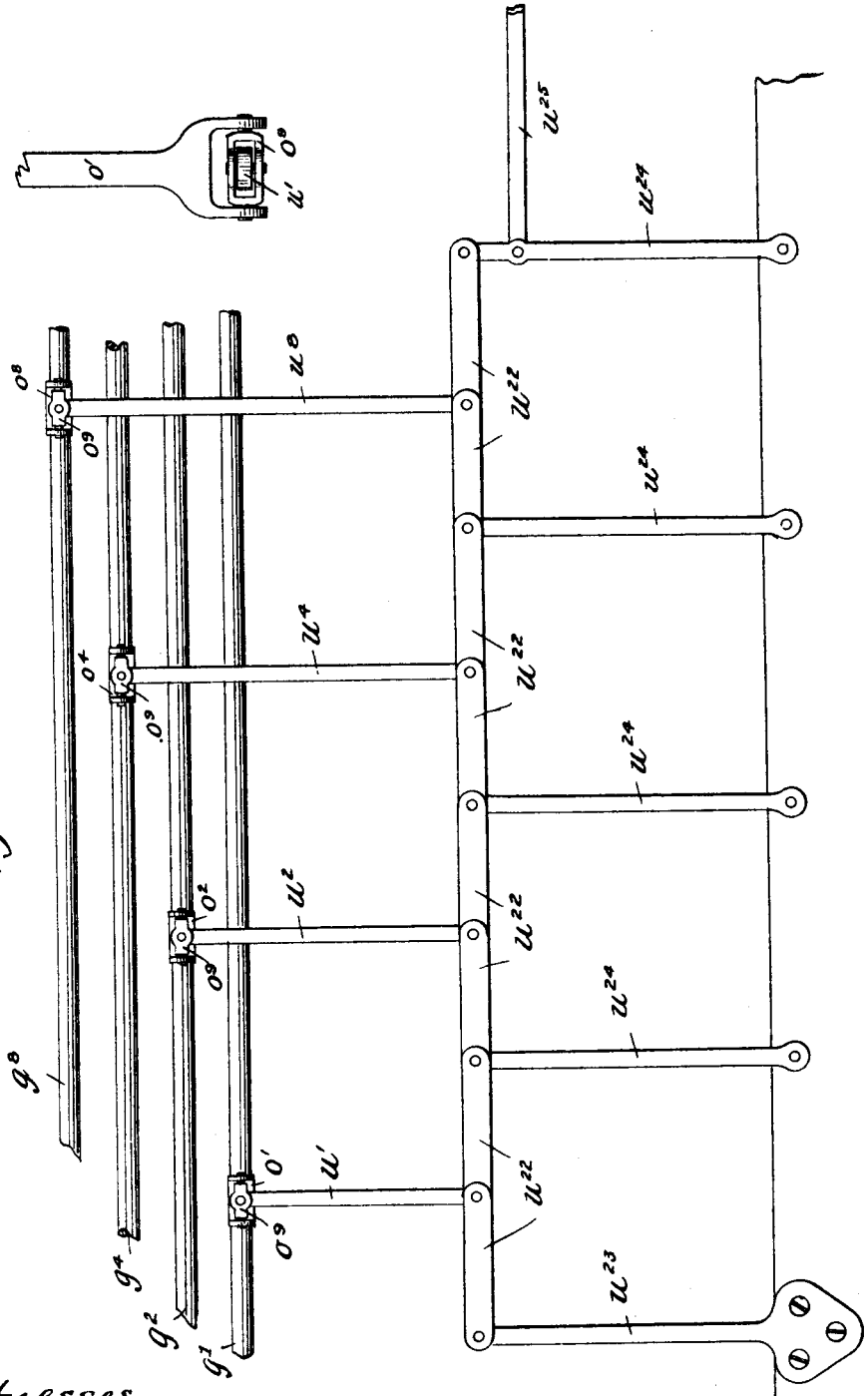
(No Model.) 22 Sheets—Sheet 18.
T. CAHILL.
TYPE WRITING MACHINE.
No. 502,700. Patented Aug. 8, 1893.

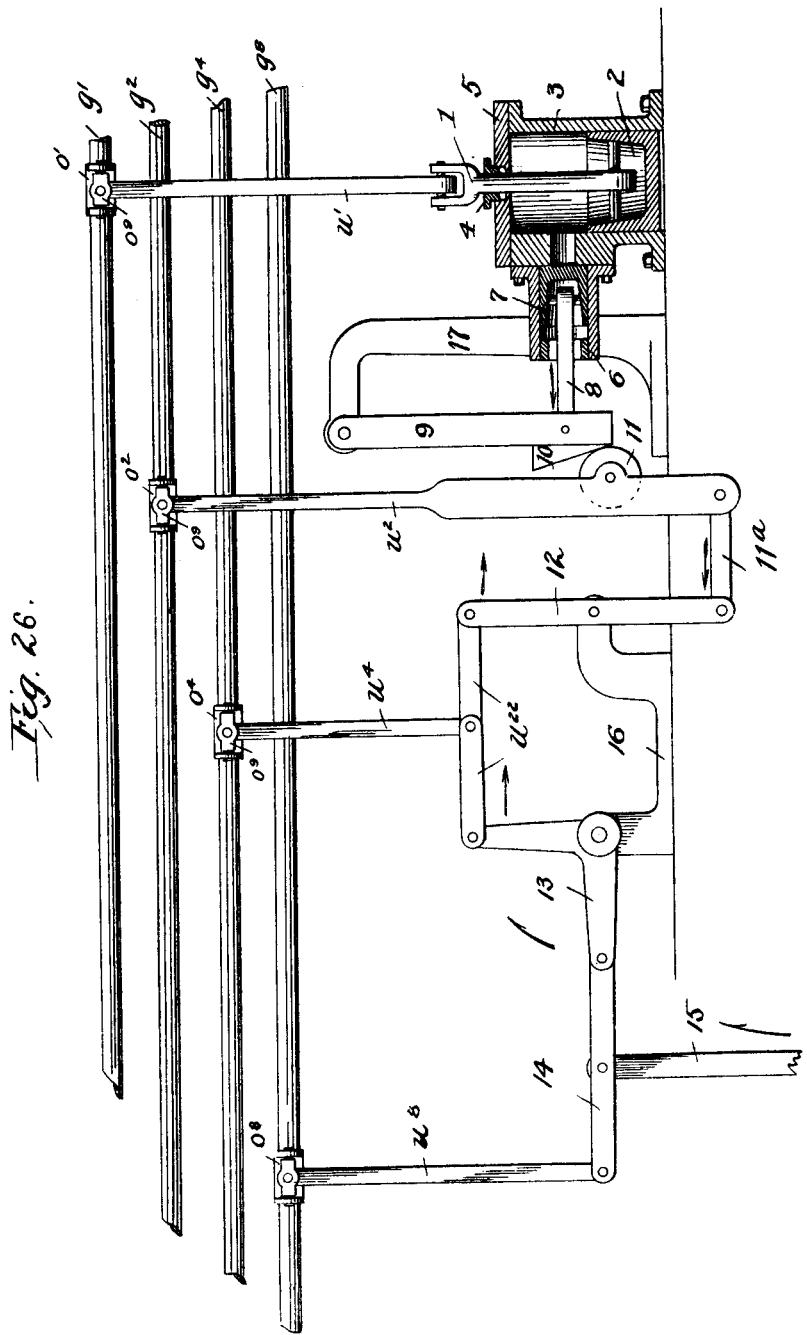

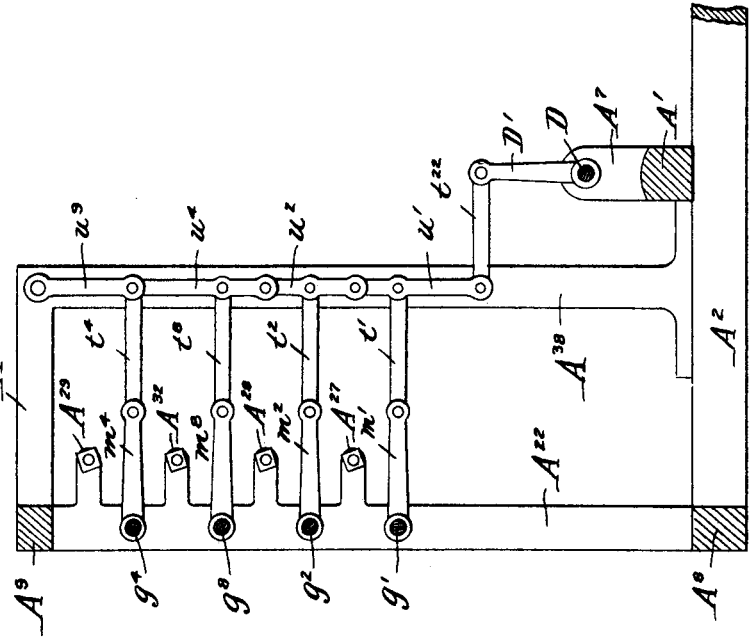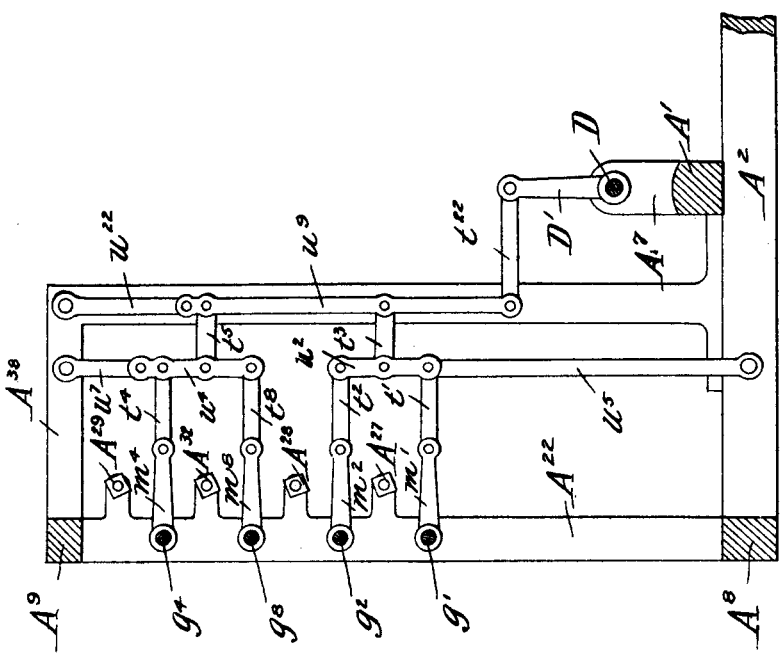

(No Model.)

22 Sheets—Sheet 21.

T. CAHILL.
TYPE WRITING MACHINE.

No. 502,700. Patented Aug. 8, 1893.

Witnesses
W. T. Keene
Geo. H. Cahill

Inventor
Thaddeus Cahill (No Model.) 22 Sheets—Sheet 22.

T. CAHILL.
TYPE WRITING MACHINE.

No. 502,700. Patented Aug. 8, 1893.

Fig. 30.

Witnesses
W. P. Keene
Geo. A. Cahill.

Inventor
Thaddeus Cahill.

UNITED STATES PATENT OFFICE.

THADDEUS CAHILL, OF WASHINGTON, DISTRICT OF COLUMBIA.

TYPE-WRITING MACHINE.

SPECIFICATION forming part of Letters Patent No. 502,700, dated August 8, 1893.

Application filed May 5, 1892. Serial No. 431,869. (No model.)

*To all whom it may concern:*

Be it known that I, THADDEUS CAHILL, a citizen of the United States, and a resident heretofore of Oberlin, in the county of Lorain and State of Ohio, but now residing temporarily at Washington, in the District of Columbia, have invented certain new and useful Improvements in Type-Writing Machines, of which the following is a specification.

The object of my invention is to increase the ease and rapidity with which such machines may be operated, and to increase the capabilities of the machine in other respects, and particularly in the production of a plurality of fac-simile copies; and my invention consists in the parts, improvements and combinations hereinafter described and particularly set forth in the claims at the end of this specification.

More particularly the objects of my invention are: first, to render it possible and easily practicable to operate a type-writer without looking at the keys; so that the eyes of the operator may be saved this labor, and be free for other uses, as, for instance looking at his copy; second, to simplify the mental operation in operating the machine, and thus relieve the operator and increase the rapidity of his execution—to construct the machine in such a manner that the same mental operation, the same nervous impulses and the same muscular exertions are always required for the printing of a given letter, no matter what character may have preceded it; third, to adapt the machine to the human frame in such a manner that the machine shall form a partial support for the arms of the operator, so that he may be free to assume a more comfortable position than that which is now generally necessary in operating such machines, and be free, also, to relieve himself from time to time by altering his position with relation to the machine, without interfering with his ability to operate it; fourth, to render useful the horizontal or to-and-fro movement of the performer's arms, as well as the vertical or up-and-down movement now employed; fifth, to make the space at the end of a word simultaneously with the last letter thereof, and without trouble to the performer.

The first and second of these objects I accomplish in the following manner: I employ a small number of keys, and by using these keys individually and in various combinations produce a large number of letters, figures and other characters. I connect the different keys (or a plurality of them), with a type-form, having a number of characters, each of which characters corresponds to a certain key or combination of keys; and I make the key or combination of keys corresponding to each character to bring that character to the printing-point, when such key or combination of keys is depressed. This I do by means of a device which I term a movement synthesizer, several forms of which are hereinafter described. As there are but few keys to be operated, the position of the arm remains substantially the same, (except for its up-and-down movement,) each finger lying in close proximity to its proper key; and the mind of the operator soon comes to know that the depressing of a certain finger or of a certain combination of fingers, results in the production of a certain letter; and as the position of the arm remains substantially unchanged, he has not to look for the keys to be struck.

The third object of my invention, I accomplish by employing a key-board consisting of two sections, remote from each other such a distance as to permit of the arms remaining in a natural and unconstrained position by the sides of the operator; and also, by furnishing arm-rests.

The fourth object I accomplish by making the arm-rests before-mentioned, movable to and fro, to a greater or less extent, and connecting them either with the spacing arrangement, so that a space may be made in consequence of their movement, or with the type-form or carriage (preferably the type-form), so that their movement may serve the office of a "shift key," that is to say, cause a different character to be printed when they are in one position from what would be printed if they were in another.

The fifth object of my invention I accomplish, preferably by means of a space key, which can be depressed simultaneously with the printing keys, and which gives a space in addition to that required for the next character to be printed.

The distinctive features of the mechanism illustrated in the accompanying drawings and hereinafter described, may be said briefly to consist of (a) certain movement synthesizer mechanism; (b) an arm-rest key, or arm-rest keys; (c) certain spacing mechanism; (d) multiple printing mechanism, whereby the same matter is printed at different printing-points simultaneously, and a plurality of fac simile copies produced, without the use of carbon paper; and (e) duplex key-boards, or sets of keys, one for the right-hand and one for the left-hand, each set being connected with the printing mechanism, the whole being constructed, arranged and connected in such a manner that the printing may be done by either hand alone, acting on its own set of keys, or by the two hands together, acting alternately, each on its own set of keys. This is the concrete structure that I have invented, and which constitutes what I believe to be the most generally useful type of machine. But it should be borne in mind that but one set of keys and one type-form are necessary to make the machine herein described practically operative. The other set of keys and the other type-form are in a certain sense, and for many purposes, superfluous, and may be omitted without involving any alteration whatever of the parts of the machine remaining, and I wish it distinctly understood at the outset that the duplicate key-boards and multiple-printing mechanism, though illustrated in the drawings and described hereinafter as forming parts of my concrete typewriter, or at least of the type of machine that I consider most generally useful, form no part of the subject matter of the present application, and are not claimed herein. This application relates to the spacing mechanism; the movement synthesizer, the arm-rest key, and the combination of the same with keys or other controllers and a type-form or other controlled part. The multiple-printing mechanism and the duplex key-boards form the subject of divisional applications, serially numbered respectively 446,990, and 446,991.

In the accompanying drawings, Figures 1, 2, 3 and 4, are the general views, Fig. 1 being a top view of the machine; Fig. 2, a front elevation; Fig. 3, a rear elevation, illustrating the mechanism at the back of the machine, the carriage spacing mechanism, ribbon feed mechanism and carriage motor mechanism not being shown, and Fig. 4, a sectional view, partly in elevation, on the line $x, x$, Fig. 1. Fig. 4ª is a plan view, partly in section, on the line $x, x$, Fig. 2. Figs. 5 to 24 inclusive, are detail views, Fig. 5 being a view in perspective, illustrating the main-frame. Fig. 6 is a top view of the bed-plate and back of the main-frame, the back being shown partly in section. Fig. 7 is a rear elevation illustrating the back of the main-frame. Fig. 8 is a side elevation of the main-frame. Fig. 9 is a front elevation of the type-forms and their mountings. Fig. 10 is a sectional view, seen from the rear partly in elevation, in a plane parallel to the plane of the preceding figure, and through the center of the type-forms there shown. Fig. 10ª is a detail view, on a larger scale than the preceding figure, illustrating more clearly a part of the mechanism shown in the preceding figure. Fig. 10ᵇ is a cross-section on the line, $a, a$, Fig. 10ª. Fig. 11 is a sectional view partly in elevation, on the line, $y, y$, Figs. 9 and 10. Fig. 12 is a rear view in elevation of the carriage and spacing mechanism. Fig. 12ª is a detail view, on a larger scale than the preceding figure, illustrating more clearly the spacing mechanism shown in the preceding figure. Fig. 12ᵇ is a detail view in perspective, illustrating the carriage-frame and the spacing rack, viewed from in front. Fig. 12ᶜ, is a sectional view, partly in elevation, through the carriage-frame, on the line, $b, b$, Fig. 12. Fig. 12ᵈ is a detail view, partly in elevation, partly in section, in a plane parallel to the plane of Fig. 12, and on a larger scale than Fig. 12, illustrating the pressure rollers hereinafter described, their hangers and mode of connection with the main-frame of the carriage. Fig. 13 is an end elevation of the carriage and spacing mechanism. Fig. 13ª is a detail view of the spacing mechanism represented in the preceding figure, on a larger scale than Fig. 13, and viewed from the opposite direction. Fig. 13ᵇ is a cross-section on the line $z, z$, Fig. 13ª. Fig. 14 is a sectional view in elevation on the line, 1, 1, Fig. 3. Fig. 15 is a sectional view in elevation on the line, 2, 2, Fig. 3. Fig. 16 is a front elevation of the mechanism shown in Fig. 14. Fig. 17 is a sectional view in elevation on the line, 3, 3, Fig. 14. Fig. 18 is a detail section on the line, 4, 4, Fig. 14. Fig. 19 is a front elevation of the mechanism shown in Fig. 15. Fig. 20 is a detail side-elevation, illustrating the carriage motor mechanism. Fig. 20ª is a detail front elevation, illustrating the ribbon spool mechanism and the manner in which it is connected with the carriage motor mechanism. Fig. 21 is a rear elevation of the carriage motor mechanism. Fig. 22 is a detail front elevation of the same. Fig. 23 is a sectional elevation in a plane parallel to the plane of Fig. 20, through the center of the mechanism illustrated in Fig. 20. Fig. 24 is a cross-section in a plane parallel to the plane of Figs. 21 and 22, through the center of the part, $L^5$, Fig. 20. Figs. 25, 25ª, 26, 27, 28, 29 and 30, represent modifications, which will be described more fully in their proper place, after the machine itself has been described. Figs. 1 to 24, inclusive illustrate the machine; Figs. 25 to 30, inclusive, illustrate modifications, or equivalent constructions.

*The main frame.*—(See particularly Figs. 5, 6, 7, and 8.) The frame of the machine is made of cast-iron or other suitable material. Its principal parts are a bed-plate; a back; and two side-pieces, serving to support the carriage-rails hereinafter mentioned and to bind the back and bed-plate together more firmly. To these larger parts many smaller ones are attached, as will be made clear hereinafter. The bed-plate is cast in one piece. It consists of a front-rib, A; a horizontal, key-supporting rib, A', lying parallel with the front rib and some distance behind it; side ribs, $A^2$ and $A^3$, lying at right angles to the ribs, A and A', and in the same horizontal plane as the rib, A; central connecting ribs, $A^4$, $A^4$, lying parallel with the ribs, $A^2$ and $A^3$; forwardly extending arms, $A^5$ and $A^5$; and a backwardly extending rib, $A^6$. The forwardly extending arms, $A^5$, $A^5$, and the backwardly extending arm or rib, $A^6$, aforesaid, all lie parallel with the ribs, $A^2$, $A^3$ and $A^4$, above-mentioned, and in the same horizontal plane therewith. A short vertical standard or upright, $A^7$, projects from the side-rib, $A^2$, immediately above the key-supporting rib, A'. Said part, $A^7$, serves to form a bearing or support for one of the rock-shafts hereinafter described. The side-ribs, $A^2$ and $A^3$, are furnished at their ends remote from the front-rib, A, with inwardly facing projections, $a$, $a$, at right angles to said ribs, $A^2$ and $A^3$, and parallel with the ribs, A and A'; and the rib, $A^6$, is provided with similar extensions, $a'$, $a'$, all of which serve to connect the bed-plate of the machine with the back. The back of the main-frame is also cast in one piece, and consists of a lower rib, $A^8$, and an upper rib, $A^9$, (both of which lie parallel with the front-rib, A, and key-supporting rib, A', before-mentioned;) and vertical ribs, $A^{22}$, $A^{23}$, $A^{24}$, $A^{25}$ and $A^{26}$, parallel with each other, connecting the upper and lower ribs, $A^8$ and $A^9$, and lying at right angles to said ribs, $A^8$ and $A^9$, and to the ribs, A, A', $A^2$ and $A^3$, before-mentioned. The vertical rib, $A^{22}$, is formed with small arms, or projections, $A^{27}$, $A^{28}$, $A^{29}$ and $A^{32}$, respectively; and the vertical rib, $A^{26}$, in like manner, is furnished with similar little arms or projections, $A^{33}$ and $A^{35}$, respectively. These little arms serve to support certain stops hereinafter described, by which the movement of the keys is limited and determined. The back is attached to the bed-plate by bolts, $A^{36}$, $A^{36}$, &c., that bind the lower rib, $A^8$, of the former, to the projections, $a$, $a$, $a'$, and $a'$, of the latter. The side-pieces, $A^{38}$ and $A^{39}$, of the main-frame, are castings, having each a lower horizontal part or foot; a vertical or upright part; and an upper, horizontal, backwardly extending part. The lower horizontal part or foot is secured by bolts, $A^{42}$, $A^{42}$, to one of the side-ribs of the bed-plate; and the upper, horizontal, backwardly extending part, is secured by a bolt, $A^{43}$, to the upper, horizontal rib, $A^9$, of the back piece. Thus the back piece, bed-plate, and side pieces are firmly bound together. The upper, horizontal, backwardly extending part of the side-piece, $A^{39}$, is provided with a projection, $A^{34}$, similar to the projections, $A^{27}$, $A^{28}$, $A^{29}$, $A^{32}$, $A^{33}$ and $A^{35}$, before mentioned, and serving a similar purpose. A casting, $A^{45}$, of the form shown in the drawings, (see particularly Figs. 2, 5, 8, 9, and 10,) is attached by bolts, $A^{46}$, to the key-supporting-rib, A'. Said casting, $A^{45}$, serves as a bearing for the horizontal shafts upon which the type-form sleeve-bearings hereinafter described are mounted; it serves also as a bearing for the rock-shaft, hereinafter described by which the type-form sleeves are rotated. A casting, $A^{55}$, of the form illustrated in the drawings, (see particularly Figs. 1, 2, 5 and $20^a$) is attached by bolts, $A^{56}$, $A^{56}$, to the ribs, $A^4$, $A^4$. Said casting, $A^{55}$, serves as a bearing for the horizontal ribbon-feed shaft, hereinafter described; and also as a bearing for the vertical ribbon shafts, hereafter described. A casting, $A^{65}$, of the form illustrated in the drawings, (see particularly Figs. 1, 2, 5, 20, $20^a$ and 23,) is attached by bolts, $A^{66}$, $A^{66}$, to the side-rib, $A^3$. It serves to support one end of the shaft upon which the wheel that moves the carriage is mounted; and also to support one end of the ribbon-feed shaft, hereinbefore mentioned and hereinafter described. A casting, $A^{75}$, of the form illustrated in the drawings, (see particularly, Figs. 1, 5 and 21,) is attached by machine screws, $A^{76}$, $A^{76}$, to the side-piece, $A^{39}$. Said casting, $A^{75}$, serves as a journal or bearing for a sleeve, in which is journaled the before-mentioned shaft on which the wheel that moves the carriage is mounted. A casting, $A^{85}$, of the form shown in the drawings, (see Figs. 1, 3, 4, 5, 8 and 11,) is attached by bolts or machine screws, $A^{86}$, $A^{86}$, to the vertical rib, $A^{24}$, of the main-frame back. Said casting, $A^{85}$, serves to support the center-screws by which the printing-lever, hereinafter described, is mounted. A casting, $A^{95}$, of the form illustrated in the drawings, (see Figs. 2, 4, 5, 8, 12, $12^a$, 13, and $13^a$,) is attached to the backwardly extending rib, $A^6$, of the bed-plate, by bolts or machine screws, $A^{96}$, $A^{96}$. Said casting, $A^{95}$, serves to support the levers on which the space-dogs hereinafter described, and certain other parts of the letter spacing mechanism hereinafter described, are mounted. A casting $A^{225}$, of the form illustrated in the drawings, (see Figs. 1, 2, 4, 9 and 10,) is attached to the top of the casting, $A^{45}$, by machine screws. Said casting, $A^{225}$, serves to form a bearing for certain little ribbon pulleys hereinafter described.

*Track for the paper-carriage.*—(See Figs. 1, 2, 4, 5 and 8.) There is a track for the paper-carriage to run upon. It is formed by parallel metal rails, $b$ and $b'$, which are attached to the side-pieces, $A^{38}$ and $A^{39}$, by bolts and nuts, $b^2$ and $b^3$.

*The paper-carriage.*—(See Figs. 1, 2, 4, 12, $12^b$, $12^c$, $12^d$ and 13.) The paper-carriage is adapted and arranged to carry and hold in place to be printed on, two sheets of paper, arranged side by side. It consists, in its most essential elements, of a carriage-frame; an impression cylinder, around which the paper passes, and against which the type-forms strike, when the letters and other characters are printed; smaller pressure rollers, and ela.\ tic bands running on pulleys and serving to feed the paper to the impression cylinder; interlinear spacing mechanism, whereby the impression cylinder is rotated and the paper fed from line to line; a space-rack for the letter spacing; and mechanism for impelling the carriage. The carriage-frame is formed of a top-bar, $c$; a bottom-bar, $c'$; a back-bar, $c^2$; a right-hand end-piece, $c^3$; a left-hand end-piece, $c^4$; and a center-piece, $c^5$. The bars, $c$, $c'$ and $c^2$ are parallel; and $c$ and $c'$ are made with enlarged and U-shaped ends, which form bearings for wheels, $c^6$, $c^6$, $c^6$, $c^6$, that run on the rails, $b$, $b'$. The pieces, $c^3$, $c^4$ and $c^5$, are substantially similar, except that the end-pieces, $c^3$ and $c^4$, have a cross-arm, or cross-rib, $c^7$, which the center-piece, $c^5$, has not. The bars, $c$, $c'$ and $c^2$, are secured to the end-pieces, $c^3$ and $c^4$, and center-piece, $c^5$, by machine screws. The impression cylinder, $c^8$, is supported by center screws, which are screwed fast into said cylinder, $c^8$, and which pass through holes, $c^9$, in the cross-arms, $c^7$, $c^7$, of the end-pieces, $c^3$ and $c^4$, which form bearings for said screws, and thus support the impression cylinder. The pressure-rollers, $c^{22}$ and $c^{23}$, lie in line with each other, parallel with and in close proximity to, the impression cylinder, $c^8$. These rollers, $c^{22}$ and $c^{23}$, are each furnished with a central shaft, $c^{24}$; and this shaft is supported at each end by levers or hangers, $c^{25}$, $c^{25}$, which are fulcrumed upon shoulder-screws, $c^{26}$, &c., screwed fast into the end-pieces, $c^3$ and $c^4$, and the center-piece, $c^5$. Little belt-wheels, or pulleys, $c^{27}$, $c^{27}$, are attached to the shafts, $c^{24}$, $c^{24}$, in close proximity to the pressure rolls $c^{22}$, $c^{23}$, (that is, one of the pulleys, $c^{27}$, at each end of each of the rolls, $c^{22}$, $c^{23}$.) For each of the pulleys, $c^{27}$, $c^{27}$, &c., before mentioned, there is a pair of corresponding pulleys, $c^{28}$, $c^{29}$, lying in the same vertical plane as the particular pulley, $c^{27}$, with which they correspond. The pair of pulleys, $c^{28}$, $c^{29}$, corresponding to the pulley, $c^{27}$, at the right hand end of the roll, $c^{22}$, lie in proximity to the surface of the right-hand end-piece, $c^3$, proximate to the center-piece, $c^5$; and are supported by shoulder screws, fixed in the said end-piece, $c^3$. The pair of pulleys, $c^{28}$, $c^{29}$, corresponding to the pulley, $c^{27}$, at the left-hand end of the roll, $c^{22}$, lie in close proximity to the surface of the center-piece, $c^5$, which is proximate to the end-piece, $c^3$; and are supported by shoulder screws, set fast in said center-piece, $c^5$. The pair of pulleys, $c^{28}$, $c^{29}$, corresponding to the pulley, $c^{27}$, at the right-hand end of the roll, $c^{23}$, lie in close proximity to the surface of the center-piece, $c^5$, which is proximate to the left-hand end-piece $c^4$; and are supported by shoulder screws set fast in said center-piece, $c^5$. The pair of pulleys, $c^{28}$, $c^{29}$, corresponding to the pulley, $c^{27}$, at the left-hand end of the roll, $c^{23}$, lie in close proximity to that surface of the left-hand end-piece, $c^4$, which is proximate to the center-piece, $c^5$; and are supported by shoulder-screws, set fast in said end-piece, $c^4$. An endless rubber band, $c^{32}$, connects each pair of pulleys, $c^{28}$ $c^{29}$, with the corresponding pulley, $c^{27}$. These bands serve to press the rolls, $c^{22}$ and $c^{23}$, in contact with the impression cylinder, $c^8$, and thus to guide and feed the sheets of paper to the impression cylinder, $c^8$, and to keep them in contact therewith. The mechanism for making the interlinear spaces is substantially similar to that used in the machine well known in the art and trade as the "Remington Standard Type Writer." There are differences in form, size and proportion, but the essentials are the same. It consists of a space-handle, $c^{33}$; a feed-pawl, $c^{34}$; a ratchet-wheel, $c^{35}$, attached to the impression cylinder, $c^8$; and a spring check, or check-spring, $c^{36}$. The space-handle, $c^{33}$, is centered upon a shoulder screw, set fast in the right-hand end-piece, $c^3$. The feed-pawl, $c^{34}$, is attached to the space-handle and carried by it, being set upon a shoulder-screw set fast in the space-handle. The feed-pawl acts upon the ratchet-wheel, $c^{35}$. The check-spring, $c^{36}$, serves to lock the ratchet-wheel, $c^{35}$, and impression cylinder attached thereto, when not acted upon by the feed-pawl, and to insure a uniform movement from line to line. The construction and operation of these parts, being well known, will require no further description. The space-rack, $c^{37}$, is attached by machine screws to a swinging frame, which is composed of the part, $c^{38}$, and rod, $c^{39}$. The rod, $c^{39}$, is supported by bearings, $c^{42}$, $c^{42}$, attached by screws to the bottom-bar, $c'$, of the carriage-frame. An arm, $c^{43}$, is fixed to the rod, $c^{39}$, at the right-hand end thereof. The rear end of the space-handle, $c^{33}$, acts upon the arm, $c^{43}$, to withdraw the rack, $c^{37}$, from contact with the space-dogs, H³ and H⁴, hereinafter described, in much the same manner as the space handle in the Remington typewriter raises the space-rack from contact with the space-dogs, when a line-space is made. The arrangement of the space-dogs, and the parts by which they are controlled and operated will be described hereinafter. $c^{44}$, $c^{44}$ are the paper-holders. Each consists of a main part, or body, of sheet metal, and little stiffeners, of cast-iron, or other suitable material, attached thereto. Screws pass through these stiffeners into the back-bar, $c^2$, and thus hold the paper-holder in its place. $c^{45}$, $c^{45}$, are spring index plates, which serve to hold the sheets of paper against the impression cylinder, $c^8$, and as indexes. They are attached by screws to the bottom-bar, $c'$. $c^{46}$, $c^{46}$ are guides for the paper. They are made of sheet metal and attached by screws to the top-bar, $c$. They serve to prevent the paper from feeding in on itself.

*Type-form controlling mechanism.*—I employ two cylindrical type-forms, each of which is arranged to print on one of the sheets of paper carried by the carriage. The mechanism for controlling the movements of these type-forms, so as to select the desired character, at any given instant, for printing, consists of (a) a movement synthesizer of four elements for turning the type-forms, which I call a type-form rotating movement synthesizer; (b) a movement synthesizer of three elements for moving the type-forms vertically, which I call a type-form reciprocating movement synthesizer; (c) keys for the right hand and keys for the left hand, corresponding to the several elements of each synthesizer; and (d) a series of rock-shafts, one for each element of each movement synthesizer, each of said rock-shafts having an arm connected with one of the elements of the corresponding movement synthesizer, and arms connected with the corresponding right-hand and left-hand keys. With this brief preliminary statement in mind, the following detailed description will be more easily understood. See particularly, Figs. 1, 2, 3, 4, 14 and 15. There are two duplicate sets of keys, a right-hand set and a left-hand set. Each set consists of eight wide or white keys, three narrow or black keys and an arm-rest. The white keys are marked respectively, $d'$, $d^2$, $d^4$, $e'$, $e^2$, $e^4$, $f'$, and $f^2$; the black keys are marked respectively, $d^{21}$, $e^{21}$ and $d^{11}$; the arm-rest is marked $d^8$. The keys $d'$, $d^2$, $d^4$, $e'$, $e^2$, $e^4$, $d^{21}$, $e^{21}$ and $d^{11}$ serve to print characters. The keys $f'$ and $f^2$ serve only to make spaces; and the key, $d^8$, serves only to move the type-forms, without, of itself, producing an impression. Said keys are centered or fulcrumed in the same manner as piano keys, that is, by means of pins, driven into the key-supporting rib, $A'$, of the main-frame, and their rear ends rest normally upon blocks, $f^3$, $f^3$, covered with felt, and attached by screws to the rail $A^8$. The keys $d'$, $d^2$, $d^4$, $d^8$, $e'$, $e^2$ and $e^4$, may be called simple keys; for each of them serves to operate but one element of some one of the movement synthesizers. The keys, $d^{21}$, $e^{21}$ and $d^{11}$, on the other hand, may be called double or compound keys; for each of them serves to operate two movement synthesizer elements. Depressing the key, $d^{21}$, has the same effect as simultaneously depressing the keys, $d^2$ and $e'$; depressing the key, $e^{21}$, has the same effect as simultaneously depressing the keys, $e^2$ and $e'$; depressing the key, $d^{11}$, produces the same effect as would be produced by depressing simultaneously the keys, $d'$ and $e'$. There are, at the back of the machine, seven rock-shafts, $g'$, $g^2$, $g^4$, $g^8$, $h'$, $h^2$ and $h^4$, supported by trunnions or centers, as shown in the drawings. The rock-shafts, $g'$, $g^2$, $g^4$, and $g^8$, correspond, respectively, with the simple keys, $d'$, $d^2$, $d^4$ and $d^8$, and with the elements of the type-form rotating movement synthesizer of movement values 1, 2, 4 and 8, respectively; the rock-shafts, $h'$, $h^2$ and $h^4$, in like manner, correspond respectively with the simple keys, $e'$, $e^2$ and $e^4$, and with the elements of the type-form reciprocating movement synthesizer of movement values 1, 2 and 4, respectively. The rock-shafts, $g^2$ and $h'$, taken together, correspond with the compound key, $d^{21}$; the rock-shafts, $e^2$ and $e'$, taken together, correspond with the compound key, $e^{21}$; and the rock-shafts, $g'$ and $h'$, taken together, correspond with the compound key, $d^{11}$, and each of the rock-shafts serves to connect the key or keys with which it corresponds, and by which it is acted upon, with the movement synthesizer element with which it corresponds, so that a movement of such element results from the depressing of the key. To this end each of said rock-shafts, (except the rock-shaft, $h'$) is provided with three rock-arms. One arm serves to connect the rock-shaft with the corresponding element of one of the movement synthesizers; the second arm serves to connect said rock-shaft with a push-up, by which the right-hand key or keys to which it corresponds acts upon it; and the third arm serves to connect the rock-shaft with a similar push-up, by which the left-hand key or keys, to which it corresponds, acts upon it. But the rock-shaft, $h'$, which is acted upon alike by the keys, $e'$, $d^{21}$, $e^{21}$ and $d^{11}$, of each set, through a push-up frame common to said keys, is furnished with five arms. One arm serves to connect said rock-shaft, $h'$, with the corresponding element of the type-form reciprocating movement synthesizer; two others serve to connect it with the push-up frame, by which the right-hand keys act upon it; and the remaining two arms serve, in like manner, to connect said rock-shaft, $h'$, with the push-up frame, by which the left hand keys, $e'$, $d^{21}$, $e^{21}$ and $d^{11}$, act upon it. A more detailed description by letters will now be more easily understood. The arms of the rock-shaft, $g'$, are marked respectively, $m'$, $n'$ and $n'$; those of the rock-shaft, $g^2$, are marked respectively, $m^2$, $n^2$ and $n^2$; those of the rock-shaft $g^4$, are marked respectively, $m^4$, $n^4$ and $n^4$; those of the rock-shaft, $g^8$, are marked respectively, $m^8$, $n^8$ and $n^8$; those of the rock-shaft, $h'$, are marked respectively, $o'$, $p'$, $p'$, $p'$ and $p'$; those of the rock-shaft, $h^2$, are marked respectively, $o^2$, $p^2$ and $p^2$; and the arms of the rock-shaft, $h^4$, are marked respectively, $o^4$, $p^4$ and $p^4$. The arms, $m'$, $m^2$, $m^4$, $m^8$, $o'$, $o^2$ and $o^4$, serve to connect their respective rock-shafts with the corresponding elements or sections, of the movement synthesizers; while the arms, $n'$, $n'$, $n^2$, $n^2$, $n^4$, $n^4$, $n^8$, $n^8$, $p'$, $p'$, $p'$, $p'$, $p^2$, $p^2$, $p^4$ and $p^4$, serve to connect their rock-shafts with the push-ups by or through which the keys act upon them. These push-ups are marked repectively, $q'$, $q'$, $q^2$, $q^2$, $q^4$, $q^4$, $q^8$, $q^8$, $r'$, $r'$, $r^2$, $r^2$, $r^4$ and $r^4$; the push-ups, $q'$, $q'$, being connected respectively with the arms, $n'$ and $n'$; the push-ups, $q^2$ and $q^2$, with the arms, $n^2$ and $n^2$; $q^4$ and $q^4$, with $n^4$ and $n^4$; $q^8$ and $q^8$, with $n^8$ and $n^8$; $r'$ and $r'$, with $o'$, $o'$ and $o'$, $o'$; $r^2$ and $r^2$, with $o^2$ and $o^2$; $r^4$ and $r^4$, with $o^4$ and $o^4$. As the push-ups, like the keys, are in duplicate, (there being a right-hand set and a left-hand set, which, being similar, are similarly marked,) a description of one will serve as a description of both. The push-up, $q'$, lies over the keys, $d'$ and $d^{11}$. In like manner, the push-up, $q^2$, lies over the keys, $d^2$ and $d^{21}$; the push-up, $q^4$, lies over the key, $d^4$; the push-up frame, $r'$, lies over the keys, $d'$, $d^{21}$, $d^{11}$, $e'$, $e^{21}$ and $e^2$; but immediately over the keys, $d'$ and $e^2$, it is notched out, so that said keys have no action upon it; the push-up, $r^2$, lies immediately above the keys, $e^2$ and $e^{21}$; the push-up, $r^4$, lies over the key, $e^4$. The push-up, $q^8$, is connected with one arm of a little bell-crank lever, $s$, (supported by a flange, $s'$, attached by machine screws to the key-supporting rib, A',) whose other arm is connected by a link, $s^2$, with one of the guide levers $s^3$, $s^3$, by which the arm-rest key, $d^8$, is mounted; so that whenever said arm-rest is pressed in, the push-up, $q^8$, is raised and the rock-shaft, $g^8$, moved, and whenever any of the printing keys is depressed, it raises the corresponding push-up, and moves the proper rock-shaft: the key, $d'$, when depressed, moves the rock-shaft, $g'$; the key, $d^2$, moves the rock-shaft, $g^2$; the key, $d^4$, moves the rock-shaft, $g^4$; the key, $e'$, moves the rock-shaft, $h'$; the key, $e^2$, moves the rock-shaft, $h^2$; the key, $e^4$, moves the rock-shaft, $h^4$; the arm-rest, $d^8$, when pressed in, moves the rock-shaft, $g^8$; the key, $d^{21}$, when depressed, moves the rock-shafts, $g^2$ and $h'$; the key, $e^{21}$, when depressed, moves the rock-shafts, $h^2$ and $h'$; and the key, $d^{11}$, when depressed, moves the rock-shafts, $g'$ and $h'$, and the movement imparted to the rock-shafts, by the keys, when depressed, is movement in the direction in which watch-hands normally move; the rock-shafts being viewed from the right hand side of the machine, and by the right-hand side of the machine, I mean that side which is nearest the performer's right, when he is in front of the machine, operating it, and by the depressing of the keys, I mean the pressing down of that part of the key upon which the operator acts. In the arrangement shown in the drawings, this is the front part, and the rear end of the key rises as the "key is depressed," that is when the front part is pressed down by the operator.

Having described the manner in which the keys move the rock-shafts, I shall now describe—

*The movement-synthesizers.*—There are two of these, as before mentioned. One, connected with the keys, $d'$, $d^2$, $h^4$ and $d^8$, through the rock-shafts, $g'$, $g^2$, $g^4$ and $g^8$, respectively; the other connected with the keys, $e'$, $e^2$ and $e^4$, through the rock-shafts, $h'$, $h^2$ and $h^4$ respectively. Each synthesizer is interposed between its keys and the type-forms, and serves to give the type-forms, when any of the keys connected with said movement synthesizer is depressed, a certain movement, (said movement thus imparted to the type-forms being different in magnitude for each different key,) and when two or more of the keys to which it corresponds are depressed, to give the type-forms a movement equal to the sum of the movements which the keys depressed would give it, if acting singly and in succession—a movement compounded, built up or synthesized out of the individual movements which the keys depressed would give it when acting singly. I shall here describe the construction of the movement synthesizers that I prefer to use; and farther on in this specification will again revert to the subject, and describe more at length their mode of operation, define more exactly what I mean by the words, "movement synthesizers," and point out certain equivalents. For the construction of the movement synthesizers, see particularly Figs. 14, 15, 16, 17, 18 and 19. The rock-arms, $m'$, $m^2$, $m^4$ and $m^8$, respectively, are connected by links marked respectively, $t'$, $t^2$, $t^4$ and $t^8$, with three levers, $u^2$, $u^4$ and $u^8$; the links, $t'$ and $t^2$, being both connected with the lever, $u^2$, and the links, $t^4$ and $t^8$, respectively, being connected with the levers $u^4$ and $u^8$, respectively. A bridle or supporting lever, $u^9$, fulcrumed upon a shoulder screw set fast in the side-rib, $A^2$, supports the lever, $u^2$, and leaves it free to move. Said lever, $u^9$, and the link, $t'$, are both connected with one and the same end of the lever, $u^2$. The link, $t^2$, is connected with the aforesaid lever, $u^2$, at or near the center of said lever; and the end of said lever remote from the link, $t'$, is connected with the lever, $u^4$. The link, $t^4$, is connected with said lever, $u^4$, at or near the center of said lever; and the end of said lever, $u^4$, remote from the lever, $u^2$, is connected with the lever, $u^8$, by a little link $t^9$. The link, $t^8$, is connected with the lever, $u^8$, at a point between the point of connection of said lever, $u^8$, with the link, $t^9$, and the point of connection of said lever, $u^8$, with another link, $t^{22}$, by which said lever, $u^8$, is connected with the arm, D', of the rock-shaft, D, through which rock-shaft an angular or rotary motion is imparted to the type-forms, in the manner hereinafter described. Little stops, $A^{27}$, $A^{28}$, $A^{29}$ and $A^{32}$, respectively, serve to limit the movements of the arms, $m'$, $m^2$, $m^4$ and $m^8$, respectively, when the latter are moved by the action of their respective keys. From a careful consideration of the drawings, and the description heretofore given, it will be clear that the construction and arrangement of the links, $t'$, $t^2$, $t^4$, $t^8$, and levers, $u^2$, $u^4$ and $u^8$, are such that each of the links, $t'$, $t^2$, $t^4$ and $t^8$, when moved by the corresponding key, gives its own proper movement to the rock-shaft, D, (by which, as before said, the type-forms are rotated,) whether any other link is moved or not; so that when two or more keys are depressed, and two or more of the links, $t'$, $t^2$, $t^4$ and $t^8$, moved as a consequence of such depressing of the keys, the joint movement of all is transmitted to the rock-shaft, D, and through it to the type-forms, and the various parts are so adjusted that the movement which the links, $t'$, $t^2$, $t^4$ and $t^8$, respectively transmit to the type-forms, are to each other as the numbers 1, 2, 4 and 8, respectively, the movement value of the key, $d'$, and link, $t'$, being 1; the movement value of $d^2$ and $t^2$, 2; of $d^4$ and $t^4$, 4; and of $d^8$ and $t^8$, 8, and the movement value of any combination of these keys—the magnitude of the movement imparted by such combination to the type-forms—is equal to the sum of the movement values of the individual elements of the combination. The rock-arms, $o'$, $o^2$ and $o^4$, respectively, of the rock-shafts, $h'$, $h^2$ and $h^4$, are connected by links marked respectively, $v'$, $v^2$ and $v^4$, with a pair of levers, $w^2$ and $w^4$; the links, $v'$ and $v^2$, being connected with the lever, $w^2$, while the link, $v^4$, is connected with the lever, $w^4$. A supporting lever, or hanger, $w^5$, fulcrumed upon a shoulder screw, set fast in the horizontal arm of the side-piece, $A^{39}$, supports the lever, $v^2$, and leaves it free to move. Said supporting lever, $w^5$, and the link, $v^2$, are both connected with one and the same end of the lever, $w^2$. The link, $v'$, is connected with said lever, $w^2$, at or near the center of said lever; and the end of said lever remote from the link, $v^2$, is connected with the lever, $w^4$. The link, $v^4$, is connected with said lever, $w^4$, at a point between the point of connection of said lever, $w^4$, with the lever, $w^2$, and its (said lever, $w^4$) point of connection with the link, $v^5$, by which the lever, $w^4$, is connected with the arm, $E'$, of the rock-shaft, $E$, through which rock-shaft an up-and-down movement is imparted to the type-forms in the manner hereinafter described. Little stops, $A^{33}$, $A^{34}$ and $A^{35}$, respectively, serve to limit the movement of the arms, $o'$, $o^2$, and $o^4$, respectively, when the latter are moved by the action of their respective keys. From a careful consideration of the drawings, it will be clear that the construction and arrangement of the links, $v'$, $v^2$ and $v^4$, and levers, $w^2$ and $w^4$, are such that each of the said links, $v'$, $v^2$ and $v^4$, when moved by the corresponding keys, gives its own proper movement to the rock-shaft, E (by which, as before said, the type-forms are raised up and down,) whether any other link is moved or not; so that when two or more keys are depressed, and two or more of the links $v'$, $v^2$ and $v^4$, moved in consequence of such depressing of the keys, the joint movement of all the links is transmitted to the rock-shaft, E, and through it to the type-forms.

*The type-forms.*—(See Figs. 1, 2, 3, 4, 9, 10, 10ª, 10ᵇ and 11.) There are two similar type-forms, F, F, a right-hand one and a left-hand one. Both are cylindrical, and have the characters arranged around them in parallel peripheral rows. Each type-form is provided with a shaft, $F'$, the type-form and shaft being firmly attached to each other, so that they move together. The type-form shafts, $F'$, $F'$, lie parallel with each other. Each of them is provided with a sleeve, $F^2$. The type-form shafts are free to slip up and down in their sleeves, but cannot revolve, except as the sleeves revolve. To this end, the shafts are made square or hexagonal in cross section. The sleeves, $F^2$, $F^2$, are furnished at their lower ends, with teeth, the toothed parts being marked, $F^3$, $F^3$. The type-form shaft-sleeves, $F^2$, $F^2$, are mounted in type-form shaft sleeve bearings, $F^4$, $F^4$, so as to be free to rotate therein. Each of said sleeves, $F^2$, $F^2$, is held in place in its bearings, $F^4$, by means of the toothed part, $F^3$, below the bearing, and a collar, $F^5$, attached to the sleeve, $F^2$, above the bearing, $F^4$, by a set screw. The type-form-shaft-sleeve bearings are mounted on shafts, $F^6$, $F^6$, the type-form-shaft sleeve bearings, $F^4$, $F^4$, being firmly attached to the respective shafts, $F^6$, $F^6$, so as to move therewith. The type-form-shaft-sleeve-bearing-shafts, $F^6$, $F^6$, are mounted in line with each other in the casting, $A^{45}$, before mentioned. The rock-shaft, D, lies parallel with the shafts, $F^6$, $F^6$, and immediately under them. The casting $A^{45}$, forms a bearing for said shaft, at one end, and its other end is supported by the upright, $A^7$. Two toothed segments, $D^2$, $D^2$, attached to the rock-shaft, D, (as for instance, by set screws) so as to move therewith, gear respectively with the toothed sleeves, $F^2$, $F^2$, so that whenever the rock-shaft, D, is rotated, or moved angularly, it imparts a similar motion to the type-form-shaft-sleeves, $F^2$, $F^2$, type-form-shafts, $F'$, $F'$, and type-forms, F, F. We have already seen that the rock-shaft, $D'$, is moved angularly by the keys, $d'$, $d^2$, $d^4$, $d^8$, $d^{21}$, $e^{21}$ and $d^{11}$, through the intervention of the push-ups, $q'$, $q^2$, $q^4$ and $q^8$, rock-shafts, $g'$, $g^2$, $g^4$ and $g^8$, rock-shaft arms, $m'$, $m^2$, $m^4$ and $m^8$, links, $t'$, $t^2$, $t^4$ and $t^8$, and levers, $u^2$, $u^4$ and $u^8$, with their links, $t^{11}$ and $t^{22}$, acting upon the arm, $D'$, of said rock-shaft, D. The rock-shaft, E, is mounted between steel trunnions or centers, like the rock-shafts, $g'$, $g^2$, $g^4$ and $g^8$, $h'$, $h^2$ and $h^4$. Said rock-shaft, E, has attached to it, so as to move with it, besides the arm, $E'$, before mentioned, two longer arms, $E^2$, $E^2$, exactly similar to each other, and both standing, preferably, at a right angle to the arm, $E'$. One of the aforesaid arms, $E^2$, $E^2$, is connected with the right-hand type-form; the other, with the left-hand type-form. Each of said type-form shafts, has a pair of fast collars, $F^7$ and $F^8$, attached to it, with a loose collar, $F^9$, between them. The loose-collar is connected by a pair of shoulder screws, $F^{22}$, $F^{23}$, set fast in the loose collar with one end of a link, $E^3$, whose other end is connected with the arm, $E^2$, of the rock-shaft, E. It will be seen that whenever said rock-shaft is rocked, or made to move angularly, on its axis, its arms, $E^2$, $E^2$, move the links, $E^3$, $E^3$, type-form shafts, $F'$, $F'$, and type-forms, F, F, up or down, and we have already seen that said rock-shaft, E, is rocked or moved angularly by the keys, $e'$, $e^2$, $e^4$, $d^{21}$, $e^{21}$ and $d^{11}$, through the intervention of the push-ups, $r'$, $r^2$ and $r^4$; rock-shafts, $h'$, $h^2$ and $h^4$, rock-shaft arms, $o'$, $o^2$ and $o^4$, links, $v'$, $v^2$ and $v^4$, and levers, $w^2$ and $w^4$, acting, through the link, $v^5$, upon the arm, $E'$, of said rock-shaft, E.

*The impression mechanism.*—(See particularly Figs. 1, 3, 4ª, 9, 10, 11 and 23.) A lever, G, lies across the right-hand set of keys back of their fulcra. It is provided with a trunnion, $G'$, which is supported by center screws, $G^2$, $G^2$, passing respectively through the side-pieces, $A^{38}$, and the rib, $A^{22}$, and provided with check-nuts, $G^3$, $G^3$. A similar lever, G, lies across the left-hand set of keys, back of their fulcra. It is likewise provided with a trunnion, $G'$, supported by center screws, $G^2$, $G^2$, passing respectively through the side-piece, $A^{39}$ and the rib, $A^{26}$, and furnished with checknuts, $G^3$, $G^3$. These levers lie in close proximity to the keys, $d'$, $d^2$, $d^4$, $e'$, $e^2$, $e^4$, $d^{21}$, $e^{21}$ and $d^{11}$, so that when any one of said keys is acted on by the performer, it raises the lever, G, lying over it. Said levers, G and $G'$, however, do not lie close to the space-keys, $f'$ and $f^2$, and are not acted on by said keys. The impression-lever, $G^4$, is furnished with a trunnion, $G^5$, which is supported by center screws, $G^6$, $G^6$, set in the casting, $A^{35}$, and held in place by check-nuts, $G^7$, $G^7$. A push-up, $G^8$, is connected with the impression lever, $G^4$, and extends down over the proximate ends of the levers, G, G, so that when either of said levers is raised by the action of any one or more of the keys, $d'$, $d^2$, $d^4$, $e'$, $e^2$, $e^4$, $d^{21}$, $e^{21}$ and $d^{11}$, such lever, in rising, raises the push-up, $G^8$, and the impression lever, $G^4$. A casting, $G^9$, attached by machine screws to the rib, $A^6$, serves to support the proximate ends of the levers, G, G. The impression-lever, $G^4$, before mentioned, in rising, acts upon two little push-ups, $F^{24}$, $F^{24}$, connected respectively with rock-arms, $F^{25}$, $F^{25}$, which are firmly attached in a suitable manner, (as for instance, by set screws) to the type-forms-shaft-sleeve-bearing shafts, $F^6$, $F^6$, respectively. Thus the impression lever, $G^4$, when raised, throws the type-forms against the paper, or inking ribbon interposed between the type-forms and the printing surface. It has already been made clear that each and every one of the keys, $d'$, $d^2$, $d^4$, $e'$, $e^2$, $e^4$, $d^{21}$, $e^{21}$ and $d^{11}$, when pressed upon by the operator, serves both to move the type-forms, so as to select the character to be printed—that is, to bring the character to be printed in front of the printing-point on the paper—and then to raise the impression-lever, $G^4$, and thus cause the character selected to be printed.

*The spacing mechanism.*—(See, particularly, Figs. $4^a$, 12, $12^a$, 13, $13^a$ and $13^b$.) $c^{37}$ is the space-rack, before-mentioned as attached to a swinging-frame, connected with the bottom-bar, $c'$, of the carriage-frame. The dog-carrying lever is formed of two parts, H and $H'$, connected together by machine screws, $H^2$ and $H^2$, the holes in the part, H, through which said screws $H^2$, pass being made elliptical or elongated to permit of the adjustment of the part, H, upon the part, $H'$, so as to bring the space-dogs hereinafter described closer together or farther apart, as desired; suitable washers being placed between the part, $H'$, and the heads of the screws, $H^2$. There are two space-dogs, a fast-dog and a loose dog; the former being so called because it has no movement in the line of motion of the rack, $c^{37}$, and the latter being so termed because it has a movement in the same plane and tangent to the line of motion of said rack, $c^{37}$. Both dogs have an up-and-down movement. To this end, the fast-dog, $H^3$, is connected with the part, H, of the dog-carrying lever, by a little center pin; and the loose dog, $H^4$, is in like manner connected with the part, $H'$, of the aforesaid dog-carrying lever, by another little center pin. The fast-dog, $H^3$, is also connected by a center pin or pin-joint with a bridle-lever, $H^5$, lying substantially parallel with the dog-carrying lever. Said fast dog, $H^3$, is also connected at its lower end, with a cross bar, $H^6$, that lies across the space keys, $f'$, $f^2$, $f'$, $f^2$, so that it is raised by any of said keys, when such key is acted upon by the performer. A similar, but shorter, cross-bar, $H^7$, lies back of the bar $H^6$, and parallel with it. Said bar, $H^7$, lies across the space keys, $f^2$, $f^2$, (but not across $f'$, $f'$,) so that it is raised by either of said keys, $f^2$, $f^2$, when such key is acted on by the performer. Said cross-bar, $H^7$, is pin-jointed at its center to a link, $H^8$. Said link is connected by center pins, or pin joints with parallel levers, $H^9$ and $H^{22}$. A lever, $H^{23}$, lies above the dog-carrying lever; and said lever, $H^{23}$, is connected with the dog-carrying lever by means of a link, $H^{24}$, said link being pin jointed to the parts H and $H^{23}$ respectively. The levers, H, $H^5$, $H^9$, $H^{22}$ and $H^{23}$, respectively, are provided with centers or trunnions, marked respectively, $H^{25}$, $H^{26}$, $H^{27}$, $H^{28}$ and $H^{29}$; and each of these trunnions is supported by center screws, $H^{32}$, $H^{32}$, said screws being provided with check-nuts for adjustment. Adjustable stops, $H^{33}$, $H^{34}$ and $H^{35}$, respectively, are attached to the levers, $H^5$, $H^9$ and $H^{23}$, respectively, by machine screws. To admit of adjustment, the holes in the stops, $H^{33}$, $H^{34}$ and $H^{35}$, through which the machine-screw last mentioned passes, are made elongated or elliptical; and washers are interposed between the heads of such screws and the stops, $H^{33}$, $H^{34}$ and $H^{35}$. The loose-dog, $H^4$, is arrested by and rests against the stop, $H^{35}$, when the rack, $c^{37}$, rests against said dog. When said dog, $H^4$, is free from the rack, $c^{37}$, it (said dog) is arrested by the stop, $H^{34}$; but if the link, $H^8$, is elevated and the stop, $H^{34}$, moved down, then the loose-dog, $H^4$, moves on, under the influence of the spring, $H^{36}$, until it (said dog) is arrested by the stop, $H^{33}$. By the main-spring arrangement hereinafter described, the carriage and the space-rack, $c^{37}$, are constantly urged in the direction shown by the arrow in Fig. $12^a$. Normally the various parts occupy substantially the positions in which they are shown in Fig. $12^a$; the rack rests in contact with the loose-dog, $H^4$, whose point is well up into the pitch of the rack; the fast-dog, $H^3$, lies with its point below a line tangent to the teeth of the rack, $c^{37}$, a less distance than the point of the loose-dog, $H^4$, is above such a line. The impression lever, $G^4$, lies immediately under the part, H. We have already seen that the aforesaid impression lever, $G^4$, is raised by the levers, G, G, whenever any of the keys, $d'$, $d^2$, $d^4$, $e'$, $e^2$, $e^4$, $d^{21}$, $e^{21}$ and $d^{11}$, is acted on by the performer. Said impression lever, in rising, tilts the dog-carrying lever, thus drawing the loose-dog, $II^4$, down out of the rack, $c^{37}$, and pressing the fast-dog, $II^3$, up into it. The points of the dogs, $II^3$ and $II^4$, stand, when the loose-dog, $II^4$, is pressed by the rack, $c^{37}$, against the stop, $II^{35}$, a certain number of rack-tooth spaces and a small fraction of a rack-tooth space apart, so that when the loose-dog, $II^4$, moves down, away from the rack, $c^{37}$, said rack moves a short distance in the direction of the arrow, under the influence of the motor spring arrangement hereinafter described, until one of the teeth of said rack, $c^{37}$, comes in contact with the fast-dog, $II^3$, whereby the rack (and carriage connected therewith) are thereupon arrested. Meantime, the loose-dog, $II^4$, moves on, in the direction of the arrow, under the influence of the contractile spring, $II^{36}$, until said dog, $II^4$, is arrested by the stop, $II^{34}$, when the point of the dog, $II^4$, stands not quite one rack-tooth space to the left of its former position, in close proximity to the rack-tooth next to the left of the tooth with which it was last in contact. When the impression lever, $G^4$, returns to its normal position, the fast-dog, $II^3$, moves down out of the rack, and at the same time the loose-dog, $II^4$, moves up into it, and as soon as the fast-dog, $II^3$, clears the rack, said rack moves in the direction of the arrow, under the influence of the motor spring hereinafter described until it is arrested by the loose-dog, $II^4$, which is pressed by the rack up against the stop, $II^{35}$. When either of the keys, $f'$, $f'$, is acted on by the performer, it raises one end of the cross-bar, $II^6$, which acts as a lever of the second class and raises the fast-dog, $II^3$, thus moving the dog-carrying lever in the direction of the arrow and drawing the loose-dog, $II^4$, down from the rack. When the space-key, $f$ or $f'$, returns to its normal position, the dogs, $II^3$ and $II^4$, return to their normal positions; the operation of these parts in connection with each other and with the parts, $H^{34}$ and $II^{35}$, being the same, of course, as when moved by the impression-lever, $G^4$, which has been already described.

When either of the keys, $f^2$, $f^2$, is acted on by the performer, it raises one end of the cross-bar, $II^6$, and thus moves the dog-carrying lever and the dogs, $II^3$ and $II^4$, in the manner just described. It also raises one end of the cross-bar, $II^7$, thus raising the link, $II^8$, moving the lever, $II^9$, and throwing the end of the stop, $II^{34}$, down below the end of the loose-dog, $II^4$, so that said loose-dog, when it is moved by the contractile spring, $H^{36}$, after its (said loose dog's) point has been moved down below the teeth of the rack, moves on until it is arrested by the stop, $II^{33}$, and as the stop, $II^{34}$, is so adjusted that when the loose-dog is arrested by it, the point of said loose-dog lies one rack-tooth-space to the left of its normal position. So in like manner, the stop, $H^{33}$, is adjusted in such a position that when the loose-dog is arrested by it the point of said loose-dog lies two rack-tooth-spaces to the left of its normal position, so that when the dog-carrying lever returns to its normal position, the carriage moves two rack-tooth-spaces to the right (as viewed from behind). Thus it will be seen that the depressing of any key whatever or keys whatever, except the keys, $f^2$, $f^2$, causes the carriage to move one rack-tooth-space, while the depressing of either of the keys, $f^2$, $f^2$, causes it to move two rack-tooth-spaces. It will be seen also that these keys, $f^2$, $f^2$, may be depressed simultaneously with any of the other keys, and by depressing one of them simultaneously with the key or keys that stand for the last letter of a word, the space at the end of that word, between said word and the next following word, can be made at the same time with the final letter, instead of requiring a separate and subsequent operation, as in typewriting machines generally.

*The carriage-motor.*—(See particularly Figs. 2, 20, 21, 22, 23 and 24.) A sleeve, L, is journaled in the casting, $A^{75}$, before mentioned. A shaft, $L^2$, is journaled in this sleeve and in the hub, $A^{68}$, of the casting, $A^{65}$. A ratchet-wheel, $L^3$, provided with a handle $L^4$, is formed integral with the sleeve L. A wheel, $L^5$, of the section shown, is firmly attached to the shaft, $L^2$, in like manner, by shrinking or otherwise. A belt or strap, $L^6$, connects the wheel, $L^5$, with the lower rail, $c'$, of the carriage; one end of said strap being connected with said rail and the other wound around the periphery of said wheel. A coiled spring, $L^7$, having its inner end attached to the sleeve, L, and its outer end attached to a pin, $L^8$, driven into the wheel, $L^5$, serves to urge the wheel, $L^5$, in the direction of the arrow, and thus to urge the carriage from right to left. A stop-pawl, or catch, $L^9$, serves to hold the ratchet-wheel, $L^3$, in any position that may be necessary to give the spring, $L^7$, the required tension.

*The ribbon arrangement.*—(See Figs. 1, 2, 4, 8, 9, 10, 20, $20^a$, 22 and 23.) The inking ribbon is wound on two ribbon-spools, M, M. These spools are mounted respectively on shafts, M', M'. The inwardly-facing projections, $A^{57}$, $A^{57}$, $A^{57}$, $A^{57}$, of the casting, $A^{55}$, form bearings for the ribbon-spool shafts, M', M'. The ribbon passes also around (that is, turns an angle of ninety degrees on), little pulleys, $M^2$, $M^2$, which are mounted on shafts, $M^3$, $M^3$, which shafts are supported by the forwardly-projecting arms of the casting, $A^{225}$. Each of the shafts, M', M', has a collar, $M^5$, suitably attached to it, (as, for instance, by a set-screw,) immediately above the lower one of the projections, $A^{57}$, $A^{57}$, that forms a bearing for it (said shaft), and a miter-gear, $M^6$, in like manner attached to it immediately below the lower one of the said projections. In this manner, displacement of the ribbon-spool shafts, M', M', is prevented. $M^7$ is the horizontal ribbon spool driving shaft. The casting, $A^{55}$, and the lips, $A^{67}$, $A^{68}$, of the casting, $A^{65}$, form bearings for it, and it is movable longitudinally in the direction of its axis in said bearings, as well as rotatively mounted therein. A miter-wheel, $M^8$, lying between the lips, $A^{67}$ and $A^{68}$, of the casting, $A^{65}$, is loosely keyed to the shaft, $M^7$, in such a manner that the two rotate together while the shaft, notwithstanding, is free to move somewhat in the direction of its axis, without moving the miter-wheel, $M^8$. Said miter-wheel, $M^8$, meshes with a miter-wheel, $L^{22}$. Said miter, $L^{22}$, is formed at one end of a sleeve, $L^{23}$, at the other end of which is an escapement wheel, $L^{24}$. This escapement, $L^{24}$, is formed as a part of the sleeve, $L^{23}$, and miter, $L^{22}$, before mentioned, and lies in close proximity to the flange, $L^{25}$, and is connected therewith by means of a detent, $L^{26}$, normally spring-pressed against said escapement-wheel, $L^{24}$. The flange, $L^{25}$, (on which the detent, $L^{26}$ is centered,) is suitably attached to the shaft, $L^2$ (as, for instance, by a set-screw), so that it moves therewith. The sleeve, $L^{23}$, on the contrary, and the miter-wheel, $L^{22}$, and escapement-wheel, $L^{24}$, formed integral therewith are mounted loosely upon said shaft, $L^2$. The detent, $L^{26}$, before mentioned, connects the parts in such a manner that the escapement-wheel, $L^{24}$, sleeve, $L^{23}$, and miter, $L^{22}$, move with the flange, $L^{24}$, and shaft, $L^2$, when the wheel, $L^5$, mounted fast on said shaft, urges the carriage from right to left, (as viewed from in front,) but not when the carriage moves in the opposite direction. This movement of the escapement, $L^{24}$, sleeve, $L^{23}$, and miter, $L^{22}$, in turn moves the miter-wheel, $M^8$, and ribbon spool driving shaft, $M^7$. Two other miter-wheels, $M^9$, $M^9$, are firmly attached to this shaft in a suitable manner (as, for instance, by set-screws.) Said miter-wheels, $M^9$, $M^9$, are arranged to mesh respectively with the miter-wheels, $M^6$, $M^6$, attached to the ribbon spool shafts, $M'$, $M'$. The miters, $M^9$, $M^9$, however, are placed such a distance apart upon the ribbon spool driving shafts, $M^7$, that when the right hand miter-wheels, $M^9$ and $M^6$, mesh with each other, the left-hand pair, $M^9$, $M^6$, are disengaged and vice versa; and the before-mentioned movement of the shaft, $M^7$, in the direction of its longitudinal axis, is for the purpose of bringing the miters, $M^9$, $M^9$, carried by said shaft, $M^7$, alternately into engagement with the right-hand and left-hand ribbon spool shaft miters, $M^6$, $M^6$, so that the ribbon is first wound, (for instance,) from the right-hand spool onto the left-hand spool, and then vice versa, and so on alternately.

The means provided for moving the shaft, $M^7$, longitudinally, and for locking it in its right-hand and left-hand positions, are the following: $M^{22}$ is a handle and $M^{23}$ a collar, attached fast to the shaft, $M^7$. $M^{24}$, is a lever, serving as a detent. Said lever is supported by, and fulcrumed upon, a shoulder screw, set fast in the arm, $A^{58}$, of the casting, $A^{55}$. When said detent, $M^{24}$, is dropped down on the right-hand side of the collar, $M^{23}$, the right-hand pair of miters, $M^9$ and $M^6$, are held in mesh with each other; and so in like manner, when said detent, $M^{24}$, is dropped down on the left-hand side of said collar, $M^{23}$, the left-hand pair of miters, $M^9$ and $M^6$, are held in mesh with each other.

*Movement synthesizer mechanism.*—Each of the keys, $d'$, $d^2$, $d^4$, and the arm-rest or arm key $d^8$, is adapted, when depressed, to cause an angular or rotatory movement of the type-forms; the key, $d'$, serving to move them one letter-space; the key, $d^2$, two letter-spaces; the key, $d^4$, four letter spaces; and the key, $d^8$, serving to move them eight letter-spaces. In like manner, the keys, $e'$, $e^2$ and $e^4$, are each adapted to move the type-forms up and down; the key, $e'$, being adapted to move them one letter-space; the key, $e^2$, being adapted to move them two letter spaces; and the key, $e^4$, being adapted to move them four letter-spaces, and the construction and arrangement of the parts are such that every one of the keys mentioned, when acted upon by the performer, causes its own proper movement of the type-forms, whether any other key or keys is being acted upon by the performer or not; and any number of keys may be acted upon at the same time, and when a plural number of keys is acted upon by the performer, the type-forms receive a movement which is the sum of the movement values of all the keys acted upon, and as before said, the movement values of the keys, $d'$, $d^2$, $d^4$ and $d^8$, respectively, are 1, 2, 4 and 8, respectively; and the movement values of the keys, $e'$, $e^2$ and $e^4$, respectively, are 1, 2 and 4 respectively. To rotate the type-forms one letter space, the key, $d'$, is depressed; to rotate them two letter-spaces, the key, $d^2$, is depressed; to rotate them three letter-spaces, the keys, $d'$ and $d^2$, are depressed; to rotate them four letter-spaces, the key, $d^4$, is depressed; to rotate them five letter spaces, the keys, $d'$ and $d^4$, are depressed; to rotate them six letter-spaces, the keys, $d^2$ and $d^4$, are depressed; to rotate them seven letter spaces, the keys, $d'$, $d^2$ and $d^4$, are depressed; to rotate them eight letter-spaces, the arm-rest or arm key, $d^8$, is pressed in; to rotate them nine letter-spaces, the arm-rest or arm key, $d^8$, is pressed in, and the key, $d'$, is depressed; to rotate them ten letter spaces, the arm-rest, $d^8$, is pressed in and the key, $d'$, is depressed; to rotate them eleven letter spaces, the arm-rest, $d^8$, is pressed in, and the keys, $d'$ and $d^2$, are depressed; to rotate them twelve letter-spaces, the arm-rest, $d^8$, is pressed in, and the key, $d^4$, is depressed; to rotate them thirteen letter-spaces, the arm-rest $d^8$, is pressed in, and the keys, $d'$ and $d^4$, are depressed; to rotate them fourteen letter spaces, the arm-rest, $d^8$, is pressed in, and the keys, $d^2$ and $d^4$, are depressed; and to rotate them fifteen letter-spaces, the arm-rest, $d^8$, is pressed in, and the keys, $d'$, $d^2$ and $d^4$, are depressed.

As before said, each of the keys, $e'$, $e^2$ and $e^4$ is adapted to give to the type-forms an and-down motion, the first of one letter-space, the second of two letter-spaces, and the third of four letter-spaces; and if the keys, $e'$ and $e^2$, are depressed simultaneously, the type-forms are raised three letter-spaces; if the keys, $e'$ and $e^4$, are depressed simultaneously, the type-forms are raised five letter-spaces; if the keys, $e^2$ and $e^4$, are depressed simultaneously, the type-forms are raised six letter-spaces; and if the keys, $e'$, $e^2$ and $e^4$, are depressed simultaneously, the type-forms are raised seven letter spaces, and any one or more of the keys, $e'$, $e^2$ and $e^4$, may be depressed at the same time that any one or more of the keys, $d'$, $d^2$, $d^4$ and $d^8$, are actuated; and every key that is acted upon will cause its own proper movement of the type-forms, which will be combined with the movement caused by the depression of the other keys. Thus a very great many different movements of the type-forms, each corresponding to a particular letter or other character is made by a small number of keys, each key representing a letter or other character, and each combination of keys also representing and serving to produce its own proper letter or other character. That part of the mechanism which serves to produce this result, I call the movement synthesizer, because a large number of compound movements are made from a smaller number of elementary movements, brought together in different combinations. There are, indeed, two movement synthesizers in the machine. One movement synthesizer serves to move the type-forms in one direction, (that is, to turn them around,) while the other serves to move them in another direction transverse to the first, (that is, to give them a to-and-fro, or up-and-down movement.) The keys, $d'$, $d^2$, $d^4$ and $d^8$, control or belong to one movement synthesizer; the keys, $e'$, $e^2$ and $e^4$, control or belong to the other movement synthesizer. The first is the type-form-rotating movement synthesizer; the second is the type-form-reciprocating movement synthesizer, as before mentioned. The most essential parts of the movement synthesizers, in the form of device I have already described, are the levers, $u^2$, $u^4$ and $u^8$, with the links, $t'$, $t^2$, $t^4$ and $t^8$, of the one synthesizer; and the levers, $w^2$ and $w^4$, with the links, $v'$, $v^2$ and $v^4$, of the other synthesizer. But the parts, $m'$, $m^2$, $m^4$ and $m^8$, of the one synthesizer, and $o'$, $o^2$, and $o^4$, of the other synthesizer, are by no means unimportant, as will appear clearly in another place. We have already seen that the link, $t'$, corresponds to the key, $d'$; the link, $t^2$, to the key, $d^2$; the link, $t^4$, to the key, $d^4$; the link, $t^8$, to the arm-rest key, $d^8$; the link, $v'$, to the key, $e'$; the link, $v^2$, to the key, $e^2$; and the link, $v^4$, to the key, $e^4$, and the rock-shafts, and push-ups, and rock-shaft-arms, serve, as we have already seen, to connect each key with its proper link, so that each link moves when its proper key is acted upon. When the link, $t'$, is moved from its normal position by the action of the arm, $m'$, it causes the lever, $u^2$, to swing upon its point of connection with the link, $t^2$, as a fulcrum, thus causing the lever, $u^4$, to swing upon its point of connection with the link, $t^4$, as a fulcrum and the lever, $u^4$, through the link, $t^9$, causes the lever, $u^8$, to move upon its point of connection with the link, $t^8$, as a fulcrum, and thus, through the link, $t^{22}$, connected with the arm, $D'$, of the rock-shaft, $D$, (whose segmental, toothed arms, $D^2$, $D^2$, mesh with the toothed parts, $F^3$, $F^3$, of the type-form shaft-sleeves, $F^2$, $F^2$,) the movement of the link, $t'$, is transmitted to the type-forms. When the link, $t^2$, is moved from its normal position by the action of the arm, $m^2$, it causes the lever, $u^2$, to move upon its point of connection with the link, $t'$, as a fulcrum, and in so moving, moves the type-forms through the intervention of the levers, $u^4$, link, $t^9$, lever, $u^8$, link, $t^{22}$, rock-shaft-arm, $D'$, and other parts already named, giving the type-forms a movement of two letter-spaces. When the link, $t^4$, is moved from its normal position by the action of the arm, $m^4$, it causes the lever, $u^4$, to move upon its point of connection with the lever, $u^2$, as a fulcrum, and thus, through the link, $t^9$, lever, $u^8$, link, $t^{22}$, and other parts named, moves the type-forms four letter spaces; when the link, $t^8$, is moved from its normal position by the action of the arm, $m^8$, it swings upon its point of connection with the lever, $u^4$, (that is, upon the point that connects it with the link, $t^9$, by which it is connected with the lever, $u^4$,) and through the link, $t^{22}$, and other parts named, moves the type-form eight letter-spaces, and, as before stated, an attentive examination of the device will render plain the fact that each of the links, $t'$, $t^2$, $t^4$ and $t^8$, effects its own proper movement of the type-forms, whether any other link or links is effecting a motion thereof or not. If the links, $t'$ and $t^2$, are both moved from their normal positions at the same time, the movement imparted to the lever, $u^2$, by one of the links has the movement imparted to said lever by the other link superposed upon it, while swinging upon its point of connection with that link as a fulcrum to transmit the movement imparted by the other link to the type-forms. If the lever, $u^2$, is moved by the action of either or both of the links, $t'$, $t^2$, and the lever, $u^4$, is also moved at the same time by the action of the link, $t^4$, the last named lever, while swinging upon its point of connection with said link, $t^4$, as a fulcrum, and thus serving to transmit the movement of the lever, $u^2$, to the type-forms, has the movement imparted by the link, $t^4$, to said lever, $u^4$—its own proper movement—superposed upon the motion which it has as a mere connector or transmitter between the lever, $u^2$, and the type-form, and in like manner, if while the lever, $u^4$, is being moved by the action of its own link, $t^4$, or by the action of either of the links $t'$, $t^2$, the link, $t^8$, is also moved, the lever, $u^8$, while swinging upon its point of connection with the link, $t^8$, as a fulcrum upon which to transmit the motion of the lever, $u^4$, to the type-forms, has the movement imparted by the link, $t^8$, to said lever, $u^3$—its own proper movement—superposed upon the motion which it has as a mere connector or transmitter between the lever, $u^4$, and the type-forms. It would perhaps be as correct to say that the transmitted movement is superposed upon the proper movements of the levers. The form of expression is immaterial; the fact is the same whichever movement is considered as superposed upon the other—they are combined by superposition into one movement equal in value to the algebraic sum of the movements of which it is composed. The operation of the links, $v'$, $v^2$ and $v^4$, and levers, $w^2$ and $w^4$, is exactly analogous to that of the links, $t'$, $t^2$, and $t^4$, and levers, $u^2$ and $u^4$, already described. When the link, $v'$, is moved from its normal position by the action of the arm, $o'$, it causes the lever, $w^2$, to move upon its point of connection with the link, $v^2$, as a fulcrum, and the lever, $w^2$, causes the lever $w^4$ to swing upon its point of connection with the link, $v^4$, as a fulcrum, and thus, through the link, $v^5$, connected with the arm, E', of the rock-shaft, E, moves said rock-shaft, which through the arms, $E^2$, $E^2$, rigidly attached to said rock-shaft, and the links, $E^3$, $E^3$, connecting said arms with the loose collars, $F^9$, $F^9$, carried by the type-form-shafts, F', F', elevates the type-forms one letter-space; when the link, $v^2$, is moved from its normal position by the action of the arm, $o^2$, it causes the lever, $w^2$, to move upon its point of connection with the link, $v'$, as a fulcrum, thus moving the lever, $w^4$, link, $v^5$, rock-shaft arm, E', rock-shaft, E, arms, $E^2$, $E^2$, and links, $E^3$, $E^3$, thus elevating the type-forms two letter-spaces; when the link, $v^4$, is moved from its normal position by the action of the arm, $o^4$, it causes the lever, $w^4$, to move upon its point of connection with the lever, $w^2$, as a fulcrum, and thus, through the intervention of the link, $v^5$, rock-shaft arm, E', rock-shaft, E, arms, $E^2$, $E^2$, and links, $E^3$, $E^3$, raises the type-forms four letter-spaces; and each one of the links, $v'$, $v^2$ and $v^4$, when moved, causes its own proper movement of the type-forms whether either or both of the other links is being moved or not; and if two or more of them are moved simultaneously, the motion of one is superposed upon that of another in the manner already described and a movement of the type-form is effected equal in value to the algebraic sum of the several movements thus combined.

In describing the operation, I have said little about the keys, $d^{21}$, $e^{21}$ and $d^{11}$; but an attentive consideration of the description heretofore given of the construction, arrangement and connection of the parts, will disclose the fact that the key, $d^{21}$, when depressed, produces the same effect as would the keys, $d^2$ and $d'$, if they were depressed simultaneously; the key, $e^{21}$, produces the same effect, when depressed, as would the keys, $e^2$ and $e'$, if depressed simultaneously; and the key, $d^{11}$, when depressed, produces the same effect as would the keys, $d'$ and $e'$, if depressed simultaneously. Said keys, $d^{21}$, $e^{21}$, and $d^{11}$, are in reality as before-mentioned, simply combination keys, each equivalent to two of the white keys.

Figs. 14, 15, 16, 17, 18 and 19, illustrate a very serviceable form of movement synthesizer; but it is only one of many forms of movement synthesizers that may be used. To the end that the full scope of my invention and the just and liberal construction of my claims, and particularly of the combination claims into which the movement synthesizer enters as an element, are entitled, may be rendered more apparent, I shall describe certain other forms of movement synthesizer, which might be used instead of that shown, in Figs. 14, 15, 16, 17, 18 and 19. I shall not describe a whole typewriter for this purpose, but shall content myself with showing the movement synthesizer of four elements variously modified, and its connection with the correct number of keys.

Figs. 25 and 25$^A$ represent one modified form of movement synthesizer; Fig. 25 being a view in elevation, and Fig. 25$^A$ a detail top view of one of the arms, $o'$, $o^2$, $o^4$ or $o^8$, and the universal joint, $o^9$, connecting said arm with its link, $u'$, $u^2$, $u^4$ or $u^8$. In this drawing, $g'$, $g^2$, $g^4$ and $g^8$, are the respective rock-shafts, connected with the corresponding keys, $d'$, $d^2$, $d^4$ and $d^8$, in the manner already described, and having arms, $o'$, $o^2$, $o^4$ and $o^8$, respectively as hereinbefore described. The arms, $o'$, $o^2$, $o^4$ and $o^8$, respectively are connected by universal joints, $o'$, $o'$, &c., with links, $u'$, $u^2$, $u^4$ and $u^8$. $u^{22}$, $u^{22}$, $u^{22}$, &c., are metal links, pin-jointed together as shown, and held in place by a standard, $u^{23}$, and bridle levers, $u^{24}$, $u^{24}$, &c., as shown, there being one bridle lever for each pair of links. The left-most link is pin-jointed to the standard, $u^{23}$, and the right-most link, or rather the bridle lever with which it is connected, is pin-jointed to a link, $u^{25}$, which serves to connect the device with the type-forms. When any one of the links $u'$, $u^2$, $u^4$ or $u^8$, is raised by the action of the corresponding rock-shaft with which it is connected, the pair of links, $u^{22}$, $u^{22}$, with which it is connected are raised up, and the chain of links is shortened; the link, $u^{25}$, is drawn to the left and the type-forms are moved from their normal positions. Each key serves to shorten the chain of links and to move the type-forms a distance proportionate to its movement value and when two or more keys are acted upon simultaneously, the chain of links is shortened and the type-forms moved a distance equivalent to the sum of the movement values of all the keys depressed. When the keys return to their normal positions, the links, $u^{22}$, $u^{22}$, &c., also return to their normal positions, the chain formed by them lengthens to its normal length and the type-forms resume their normal positions.

In Figs 14, 15, 16, 17, 18 and 19, I have shown movement synthesizers, whose essential elements are levers.

A movement synthesizer may well be made of other elements, or of the elements named in combination with other elements; and in Fig. 26 I show a movement synthesizer whose first essential element is a pair of cylinders and pistons, whose second essential element is an inclined plane and wheel moving thereon, whose third essential element is a pair of links, and whose fourth essential element is a lever. The order of the elements is of course unimportant. In this drawing, $g'$, $g^2$, $g^4$ and $g^8$, are the rock-shafts connected with the respective keys, $d'$, $d^2$, $d^4$, and $d^8$, in the manner already described. $o'$, $o^2$, $o^4$ and $o^8$ are the rock-shaft arms before described, which are connected by universal joints, $o^9$, $o^9$, &c., with the respective links, $u'$, $u^2$, $u^4$ and $u^8$. The link, $u'$, is connected with a piston rod, 1, attached to a piston, 2, which is fitted closely to a cylinder, 3. The rod, 1, passes out through a packing-box, 4, in the cylinder head, 5. 6 is a cylinder, attached to the cylinder, 3, in the manner shown, and opening upon it. 7 is a piston closely fitting the cylinder, 6. Said piston, 7, is connected by a rod, 8, with a swinging lever, 9, having an inclined face, 10. Proximate to this inclined face, 10, is a wheel, 11, set in the link, $u^2$. The link, $u^2$, is connected by a link, $11^a$, with a reversing lever, 12, which is connected by links, $u^{22}$, $u^{22}$, with the vertical arm of a bell-crank lever, 13, whose horizontal arm is connected by a lever bar, 14, with the link, $u^8$. The link, $u^4$, is connected with the links, $u^{22}$, $u^{22}$, at the point where they are jointed together. A link, 15, connected with the lever, 14, serves to communicate motion to the type-forms. A standard, 16, serves to support the reversing lever, 12, and the bell-crank lever, 13. Another standard or bracket, 17, serves to support the hanging lever, 9. The links, $u'$, $u^2$, $u^4$ and $u^8$, are raised by their respective keys, $d'$, $d^2$, $d^4$ and $d^8$ in the manner already described. The link, $u'$, in rising, raises the piston, 2, which through the intermedium of the fluid contained in the cylinders, 3 and 6, forces the piston, 7, outward, thus moving the lever, 9, link $11^a$, reversing lever, 12, links $u^{22}$, $u^{22}$, bell-crank lever, 13, lever bar, 14, and link, 15, in the directions represented by the arrows. When the link, $u^2$, rises, the action of the inclined face, 10, of the lever, 9, upon the wheel, 11, moves the link, $u^2$, link, $11^a$, reversing lever, 12, links, $u^{22}$, $u^{22}$, bell-crank lever, 13, lever bar, 14 and link, 15 in the direction of their respective arrows. When the link, $u^4$, rises, it pulls upon the links, $u^{22}$, $u^{22}$, thus moving the bell-crank lever, 13, lever bar, 14, and link, 15, in the direction of their respective arrows. When the link, $u^8$, is raised, it raises the end of the lever-bar, 14, connected with it and thus raises the link, 15. The link, $u'$, raises the link, 15, a distance of one letter-space, the link, $u^2$, raises it a distance of two units, the link, $u^4$, a distance of four units; and the link, $u^8$, a distance of eight units, and when two or more of these links are raised at the same time they give to the link, 15, and type-forms connected therewith, a movement equal to the sum of the movements which the several links would give it if acting singly.

The different movement synthesizer elements may be combined with each other in many other ways too numerous to mention. Obviously, a cord and pulley arrangement of elements may be combined with any of the other kinds.

In all the forms of movement synthesizer illustrated in the drawings, the power to impel the type-forms is furnished by the fingers or hands of the performer in operating the keys. The connection between the keys and the movement synthesizer is a purely mechanical connection. But it is not indispensable that the keys be connected with the type-forms by a purely mechanical connection. Suitable power connections (such, for instance, as electro-magnetic or pneumatic devices, many of which are well known), might be interposed between the keys and the parts to be operated by them. It is important that the keys be suitably connected with the movement synthesizers, but the exact manner of connection is not material.

In the forms of movement synthesizer illustrated in the drawings hereinbefore described, the several elements all act to produce movements of the type-forms in the same direction. This arrangement is very advantageous, for by it the greatest possible number of characters can be printed with a given number of keys. The several elements of the movement synthesizer may, however, be arranged to impel the type-forms, some in one direction and some in the opposite direction—some positively, some negatively. Such an arrangement in which one or more of the elements of the movement synthesizer serve to produce a movement of the type-forms in one direction, while one or more other elements of the movement synthesizer serve to produce a movement of the type-forms in the opposite direction, may be fitly termed a positive and negative movement synthesizer. Such synthesizers may be formed in a great many different ways, but I shall content myself with illustrating one or two such devices formed of levers. These devices are illustrated in Figs. 27 and 28. Both of these figures are views corresponding to Fig. 14, and the mechanism illustrated in either one of said Figs. 27 and 28 might be substituted for that illustrated in Fig. 14, without making any other change whatever in the mechanism of the machine.

In Fig. 30, $g'$, $g^2$, $g^4$, and $g^8$, are the rock-shafts, connected with the keys, $d'$, $d^2$, $d^4$, and $d^8$, respectively in the manner already described, and furnished with arms, $m'$, $m^2$, $m^4$ and $m^8$, respectively. $u^2$ is a lever, supported by a lever, $u^5$, and connected by links, $t'$ and $t^2$, respectively, with the arms, $m'$ and $m^2$, of the rock-shafts, $g'$ and $g^2$. $u^4$ is a lever, supported by a hanging lever, $u^7$, and connected by links, $t^4$ and $t^8$, with the arms, $m^4$ and $m^8$, of the rock-shafts, $g^4$ and $g^8$. $u^9$ is a lever, supported by a hanging lever, $u^{22}$, and connected by a link, $t^{22}$ with the arm, D', of the rock-shaft, D. The levers, $u^2$ and $u^4$, respectively, are connected with the lever, $u^9$, in the manner shown, by links, $t^3$ and $t^5$, respectively. It will be seen that when the arms, $m'$ and $m^2$, or either of them, are moved from their normal positions, they act (through the links, $t'$, $t^2$, lever, $u^2$, link, $t^3$, lever, $u^9$, and link, $t^{22}$), upon the arm, D', of the rock-shaft, D, moving said rock-shaft (as viewed in Fig. 27), in the opposite direction to that in which watch hands normally move, and when the arms, $m^4$ and $m^8$, or either of them, are moved from their normal positions, they act (through the links, $t^4$, $t^8$, lever, $u^4$, link, $t^5$, lever, $u^9$, and link, $t^{22}$) upon the arm, D', of the rock-shaft, D, moving said rock-shaft (as viewed in Fig. 27) in the same direction in which watch hands normally move. The movement values of the arms, $m'$ and $m^2$, (that is, the relative magnitudes of the movements they impart to the type-forms,) may be advantageously made to stand to each other as 1 and 3; and that of the arms, $m^4$ and $m^8$, should also be as 1 and 3 in the opposite direction, and when two or more of the arms, $m'$, $m^2$, $m^4$, $m^8$, act simultaneously, the magnitude of the movement of the type-forms effected thereby is equal to the algebraic sum of the movement values of the parts acting.

Fig. 31 shows a somewhat different detail of arrangements, as compared with Fig. 30. The parts, $g'$, $g^2$, $g^4$ and $g^8$, $m'$, $m^2$, $m^4$ and $m^8$, $t'$, $t^2$, $t^4$ and $t^8$, $t^{22}$ and D', are the same; but the means used to connect the parts, $t'$, $t^2$, $t^4$ and $t^8$ with the rock-shaft, D'—the movement super-poser interposed between the independently movable parts $t'$, $t^2$, $t^4$ and $t^8$, and the part by which they are connected with the type-forms—is somewhat different. $u^4$ is a lever connected with the lower end of the hanging-lever, $u^7$. $u^2$ is a lever whose upper end is connected with the lower end of the lever, $u^4$; and $u'$ is a lever whose upper end is connected with the lower end of the lever, $u^2$, and whose lower end is connected with the arm, D', by the link, $t^{22}$. The link, $t'$, is connected with the lever, $u'$, at a point on said lever between its (said lever's) point of connection with the link, $t^{22}$, and its point of connection with the lever, $u^2$. The link, $t^2$, is connected with the lever, $u^2$, at a point between its (said lever's) point of connection with the lever, $u'$, and its point of connection with the lever, $u^4$. The link, $t^4$, is connected with the upper end of the lever, $u^4$; and the link, $t^8$, is connected with the lever, $u^4$, at a point between its (said lever's) point of connection with the link, $t^4$, and the lever, $u^2$. The links, $t'$ and $t^8$, whether acting jointly or severally, serve to move the arm, D', and rock-shaft, D, in a direction (as viewed in Fig. 28) opposite to that in which watch hands normally move; while the links, $t^2$ and $t^4$, whether acting jointly or severally, serve to move said arm, D', and the rock-shaft, D, in the direction in which watch hands normally move. The parts should be so adjusted that the movement values of the links, $t'$ and $t^8$, will be as 1 and 3, respectively, in one direction, and that of the links, $t^2$ and $t^4$, as 1 and 3 respectively, in the opposite direction, and when two or more of the said links, $t'$, $t^2$, $t^4$ and $t^8$, are moved simultaneously, the magnitude of the movement of the type-forms effected thereby is equal to the algebraic sum of the movement values of the parts acting.

As before said, either the form of movement synthesizer illustrated in Fig. 27, or that illustrated in Fig. 28, may be substituted for that illustrated in Fig. 14, without making any other change whatever in the machine. But if such a substitution is made, in connection with the movement synthesizer illustrated in Fig. 27 it will be advantageous to employ such a key-board as that illustrated in Fig. 29, (which is a top view, corresponding to Fig. 1,) connected with the rock-shafts in the manner illustrated in Fig. 30, (which is a rear elevation, corresponding to Fig. 3,) the key, $d'$, being connected with the arm, $n'$, of the rock-shaft, $g'$, by the push-up, $q'$; the key, $d^2$, being connected with the arm, $n^2$, of the rock-shaft, $g^2$, by the push-up, $q^2$; the key, $d^4$, being connected with the arm, $n^4$, of the rock-shaft, $g^4$, by the push-up, $q^4$; the key, $e^4$, being connected with the arm, $n^8$, of the rock-shaft, $g^8$, by the push-up, $q^8$; the key, $e'$, being connected with the arm, $p'$, of the rock-shaft, $h'$, by the push-up, $r'$; the key, $e^2$, being connected with the arm, $p^2$, of the rock-shaft, $h^2$, by the push-up, $r^2$; and the arm-rest key, $d^8$, being connected with the arm, $p^4$, of the rock-shaft, $h^4$, by the push-up, $r^4$. The movement values of the keys, $e'$, $e^2$ and $d^8$, connected respectively with the rock-shafts, $h'$, $h^2$ and $h^4$, that serve to reciprocate the type-forms, are as 1, 2 and 4, respectively; the movement values of the keys, $d'$ and $d^2$, connected respectively with the rock-shafts, $g'$ and $g^2$, that serve to rotate the type-forms in one direction, are as 1 and 3, positive; while the movement values of the keys, $d^4$ and $e^4$, connected respectively with the rock-shafts, $g^4$ and $g^8$, that serve to rotate the type-forms in the opposite direction are as 1 and 3, negative, and when two or more of the keys, $e'$, $e^2$, $d^8$, of the type-form reciprocating movement synthesizer, or $d'$, $d^2$, $d^4$, $e^4$, of the type-form rotating movement synthesizer are made to act simultaneously, the movement of the type-forms effected thereby is equal in magnitude to the algebraic sum of the movement values of the keys acting.

In the devices illustrated in the drawings, the power to impel the type-forms is transmitted to them from the keys through the movement synthesizer. This is a convenient but not an indispensable point of construction. Much of the mechanism illustrated in the drawings, particularly the movement combining, or movement aggregating connector (formed, in Fig. 14, by the levers $u^2$, $u^4$, $u^8$ and their connections), may be used in a movement synthesizer in which the power to impel the type-forms is not transmitted to them from the keys through the movement synthesizer, but in which the power to impel the type-forms is called into action by the depressing of the keys and the parts of the movement synthesizer moved by the keys serve each, not to transmit a certain movement to the type-forms, but to permit a certain movement of the type-forms and of the movement synthesizer. I intend to describe such a device in a future specification. What I wish to make clear in this place is that the movement combining, movement superposing or movement aggregating connector herein described may be used in a movement synthesizer modified in the manner above mentioned; and that the words "movement synthesizer" refer as well to such a device as that mentioned in this paragraph as to those illustrated in the drawings, and other modifications may be made in the various forms of movement synthesizer illustrated in the drawings, too numerous to mention.

In each and every of the forms of movement synthesizer illustrated in the drawings, saving only those illustrated in Figs. 27 and 28, the type-forms are supposed to be normally urged by a spring or equivalent (suitably arranged and not appearing in the drawings), in the opposite direction to that in which they are moved by the movement synthesizers.

An important feature of my invention as illustrated in Figs. 14, 15, 25, 27 and 28, is the locking arrangements of the movement synthesizers. To illustrate by Fig. 14: the arms, $m'$, $m^2$, $m^4$ and $m^8$, may be considered as cranks. They are normally on their dead centers. And while they remain in these their normal positions as shown in the drawings, each of the elements of the movement synthesizer is locked. The links, $t'$, $t^2$, $t^4$, $t^8$, and the levers, $u^2$, $u^4$ and $u^8$, are held motionless. When any of the arms, $m'$, $m^2$, $m^4$, $m^8$, before mentioned, is moved from its normal position and off its dead center, it is unlocked and imparts its proper motion to the type-forms, but the rest of the movement synthesizer remains locked, and the links, $t'$, $t^2$, $t^4$, $t^8$, connected with the arms that remain in their normal positions, though subjected to strain, remain motionless; and the levers, $u^2$, $u^4$, or $u^8$, connected with the motionless links and arms, serve only to transmit motion to the type-forms from the arms and links that move, and remain motionless at their centers of connection with the links by which they are connected with the arms that remain in their normal positions. It will be obvious that mechanical equivalents might be used instead of the rock-shaft arms or cranks $m'$, $m^2$, $m^4$, $m^8$, $o'$, $o^2$, $o^4$, and their respective links $t'$, $t^2$, $t^4$, $t^8$, $v'$, $v^2$, $v^4$.

In the device illustrated in Fig. 14, the rock-shafts, $g'$, $g^2$, $g^4$, and $g^8$, may well be considered as the points of application of power to the movement synthesizer; the links, $t'$, $t^2$, $t^4$ and $t^8$, may be considered as independently movable elements (that is, movable independently of each other) of the movement synthesizer; and the levers, $u^2$, $u^4$, $u^8$, may be considered as forming a motion superposing or movement aggregating transmitter, that is, they take up the individual movements of whatever one or ones of the links, $t'$, $t^2$, $t^4$, $t^8$, are moved, and transmit to the type-forms a movement substantially equal to the algebraic sum of such movements; and the cranks, or arms, $m'$, $m^2$, $m^4$ and $m^8$, may be considered, when in their normal positions, as locks upon these independently movable elements; the whole forming a double-acting, self-locking movement synthesizer. It is double-acting in the sense that each of the parts that moves another part in a certain direction when it (the first named part) itself moves in a certain direction, is so connected with such controlled part that when either of them moves in the opposite direction to its motion above mentioned, the other also moves in the opposite direction to its above mentioned motion. It is self locking, for the parts, when in their normal positions, form as we have already seen, effective locks upon each other, and when any of the arms, $m'$, $m^2$, $m^4$, $m^8$, is moved from its normal position, the key, forcing such arm against its appropriate stop $A^{27}$, $A^{28}$, $A^{29}$ or $A^{32}$, effectually locks it, for the time being, in such position, and prevents any material or continued vibration of the type-forms or other parts set in motion by the arm moving from its normal position to its position of contact with such stop.

I have spoken of dead centers and locks. I do not mean that the cranks, $m'$, $m^2$, $m^4$ or $m^8$, are always, when serving as locks, upon their absolute, mathematical dead centers. I only mean that they are so near the true dead centers as to be for practical intents and purposes as effective locks as if they were on their exact, mathematical dead centers, and so, when I speak of the arms, $m'$, $m^2$, $m^4$, $m^8$, and links, $t'$, $t^2$, $t^4$, $t^8$, serving as locks upon the levers, $u^2$, $u^4$, or $u^8$, so that such levers have no motion, or only an exceedingly small motion at their centers of connection with the links aforesaid, I do not mean that the arms and links before mentioned form absolute locks in the sense of rendering any motion whatever, as before described, of the parts absolutely impossible, but only that they form for practical intents and purposes effective locks upon the parts, as before described. As a matter of fact, the position of the levers, $u^2$, $u^4$ and $u^8$, and the angles they form with the links, $t'$, $t^2$, $t^4$, $t^8$, and arms, $m'$, $m^2$, $m^4$, $m^8$, respectively, change somewhat as the arms, $m'$, $m^2$, $m^4$, $m^8$, are moved; so that though the three points forming respectively the center of motion of one of the rock-shafts, the center of connection of the arm of such rock-shaft with its link, and the center of connection of such link with its lever, $u^2$, $u^4$, or $u^8$, lie in one line, and that line is exactly coincident with the line of thrust of the lever with which such link is connected, so that the rock-shaft arm is on its absolute mathematical dead center, yet when the lever is moved by the action of some other rock-shaft, the line of thrust of the lever is no longer parallel with the line joining the center of motion of the rock-shaft with the center of connection of its rock-shaft arm with the corresponding link, and the couple is no longer on its dead center. But the angular variations between the thrust line of any of the levers and the line drawn from the center of the rock-shaft to the center of connection of the rock-shaft arm with its link is not large enough, when the parts are proportioned correctly to have any practical effect, and by lengthening the levers, $u^2$, $u^4$ and $u^8$, or shortening the rock-shaft arm, D', it can be decreased as desired, and so by lengthening the levers, $w^2$ and $w^4$ (Fig. 15) or shortening the rock-shaft arm, E'. And the locking arrangements shown, while not absolutely perfect from a theoretical or mathematical point of view, are sufficiently perfect for practical purposes and answer well the end for which they are designed, to wit, the prevention of useless and troublesome motions and vibrations of the type-forms and bringing them to rest promptly in the position required for printing the character to be printed.

I have spoken of the movement synthesizer transmitting to the type-forms, when two or more of the movement synthesizer's elements act at the same time, a movement equal to the algebraic sum of the movements produced by the individual elements acting singly. On account of the changes in the angular positions of the levers, $u^2$, $u^4$, $u^8$, before mentioned, the movements transmitted to the type-forms, when several of the rock-shafts act together, are not absolutely equal, if measured in inches or millimeters, to the sum of the movements produced by such rock-shafts acting singly. But when the parts are proportioned as shown in the drawings, they are very nearly equal— near enough for practical purposes. By lengthening the levers, $u^2$, $u^4$ and $u^8$, with reference to the rock-shaft arm, D', and the levers, $w^2$ and $w^4$ with reference to the rock-shaft arm, E', the approximation to exact equality may be made more close. But it is not essential that there should be any very close approximation; the characters may be so placed upon the type-forms as to compensate for the inequalities. To explain the matter more in detail: As the machine illustrated in the drawings is constructed, each type-form has (or at least, may have), one hundred and twenty-eight characters, arranged in eight circumferential rows of sixteen each. All the type in each circumferential row stand on the same printing level as the other types in that row; but the different rows are not equal distances apart. The vertical center of the first row lies immediately opposite the printing center of the carriage roll, $c^8$. The vertical center of the next circumferential row stands below that of the first circumferential row a distance equal to the distance which the type-form is elevated by the rock-shaft $h'$, so that when the key, $e'$, is depressed, such row is brought into position opposite the printing center. The vertical center of the third circumferential row stands below that of the top row a distance equal to the distance which the type-form is elevated by the action of the rock-shaft, $h^2$, so that when the key, $e^2$, is depressed, such row is brought into position opposite the printing center. The vertical center of the fourth circumferential row stands below that of the top row a distance equal to the distance which the type-form is elevated by the action of the rock-shafts, $h^2$ and $h'$, so that when the keys, $e^2$ and $e'$, are depressed simultaneously, such row is brought into position opposite the printing center. The vertical center of the fifth circumferential row stands below that of the top row a distance equal to the distance which the type-form is elevated by the action of the rock-shaft, $h^4$, so that when the key, $e^4$, is depressed, such row is brought into position opposite the printing center; and so, in like manner, the sixth, seventh and eighth circumferential rows respectively stand below the top row distances equal respectively to the distances which the type-form is elevated by the action of the shafts, $h^4$ and $h'$; $h^4$ and $h^2$; and $h^4$, $h^2$, and $h'$, respectively. We have seen that all the characters in a circumferential row stand on the same printing level, but that the circumferential rows are different distances apart. So also the characters in a circumferential row, though on the same level, are not exactly quite equidistant from each other; but corresponding members of the different circumferential rows stand one over the other in the same vertical line, so as to form vertical rows, which, like the circumferential rows, are not exactly equidistant. The first vertical row stands opposite the printing-point. The second vertical row lies distant from the first vertical row a distance equal to the distance which the type-form is moved through by the action of the rock-shaft, $g'$, so that when the key, $d'$, is depressed such row is brought around to the printing center. The third vertical row lies distant from the first vertical row a distance equal to the distance which the type-form is moved through by the action of the rock-shaft, $g^2$, so that when the key, $d^2$, is depressed, such row is brought around to the printing center; and so the fourth, fifth, sixth, seventh, eighth, ninth, tenth, eleventh, twelfth, thirteenth, fourteenth, fifteenth and sixteenth vertical rows respectively, lie distant from the first vertical row distances equal respectively to the distances through which the type-form is moved by the action of the rock-shafts, jointly or singly, as follows, to-wit, $g'$ and $g^2$; $g^4$; $g^4$ and $g'$; $g^4$ and $g^2$; $g^4$, $g^2$ and $g'$; $g^8$; $g^8$ and $g'$; $g^8$ and $g^2$; $g^8$, $g^2$ and $g'$; $g^8$ and $g^4$; $g^8$, $g^4$ and $g'$; $g^8$, $g^4$, and $g^2$; and $g^8$, $g^4$, $g^2$ and $g'$; respectively. Thus the most perfect alignment may be produced; and though the movement given by two or more rock-shafts to the type-forms when acting together are not exactly equal mathematically to the sum of the motions given by such rock-shafts acting singly, they are made by the proper placing of the characters on the type-forms to be equal for all practical purposes. The aggregated or combined movement is to be measured in letter-spaces on the type-form, and not in inches or millimeters. And by the "movement value" of any part or combination of parts, I mean the number of letter spaces that the type-form is moved through—or the number of rows of type that it is moved through—by the action of the part or parts having such movement value. And when I speak in the statement of claim of the magnitude of the movements of the type-form, and the magnitude of the movements transmitted to the type-form or other part controlled by the movement synthesizer, I mean the magnitude of such movements as measured in letter spaces on the type-form or equivalent part. It is true these letter spaces may not all be of exactly the same size as measured in millimeters or inches; but that is not material. But I wish it to be distinctly understood that when I speak of a plurality of type-forms, I do not mean to include under that term a plurality of type-bars, each of which is arranged to strike to a center and has no other motion. By the word "type-form," as I use it, (and as the word is generally used,) I refer to an object carrying a plurality of characters, and made movable into different positions to bring different characters to the printing-point.

The mechanism illustrated in the drawings for making two spaces at the same time, and for making the inter-verbal spaces at the same time that characters are printed, may be modified very much in details of construction without departing from the substance of my invention.

The right-hand and left-hand keys may be connected with the type-forms in many other ways than that illustrated in the drawings. Corresponding right and left hand keys might be connected with the corresponding element of the movement synthesizer through a lever arrangement, for instance, as well as through a rock-shaft. And instead of having one type-form reciprocating movement synthesizer and one type-form rotating movement synthesizer, whose individual elements are connected with the right-hand and left-hand keys, the type-form reciprocating movement synthesizer and the type-form rotating movement synthesizer—either or both—may be made in duplicate (one for each key-board the left-hand keys, and one for the left-hand keys) the two divisions being connected with the type-form through a lever or other part moved by both.

An inking pad, or cylinder might be used instead of the inking ribbon shown, but I prefer to use the inking ribbon. And the details of construction and arrangement of the machine may be modified in many other particulars without departing from certain essential features of my invention.

Some of the most important features of the invention herein described may be used with advantage in printing telegraphs, and in type-setting and type-distributing machines. The movement synthesizer, in particular, may be used in other machines which are similar to a type-writer in having some part (whether the type-form of a type-writer or of a printing telegraph or the type-carriers of a type-setting or distributing machine, is not material), which is moved into different positions to get different letters or other characters. The devices illustrated herein for operating the type-form of a type-writing machine are equally applicable to the type-form of a printing telegraph, (the receiving part of which is indeed, in many ways a true type-writer.) The carriage can be returned at the end of a line to its position at the right hand of the machine for the writing of another line by an attendant on the spot; or electrical arrangements might be devised for this purpose worked from the sending station; or, which is in some respects better, the type-forms might be made to print upon a reel of paper of great length, as is now generally done in printing telegraphs. I wish it be understood that my invention is capable of such uses and that I desire full protection.

An important feature of my invention is a movement synthesizer embracing ($a$) a plurality of independently reciprocating movement determining elements; and ($b$) a movement aggregator, formed of parts positively connected for to-and-fro motion with each other and with the reciprocating movement determining elements before mentioned, so that each movement, whether forward or backward, of any of the before mentioned elements, results in a corresponding movement of the movement aggregator; and in the combination of this movement synthesizer, with keys or other suitable controllers and with the type-form or other parts to be moved into different positions in the same arc or plane by the action of the controllers. By a "movement synthesizer," I mean a device interposed between a plurality of keys or other suitable controllers and a type-form or other part to be controlled thereby, serving, when the said controllers act singly, to effect certain movements of the type-form, and serving, when a plurality of said controllers act together, to effect a certain movement of the type-form equal in magnitude to the algebraic sum the movements effected by the controllers acting singly—a movement in the same arc or plane as the movements effected by the individual controllers acting singly, and built up, or synthesized out of these individual movements. The object of my invention, in so far as the movement synthesizer is concerned, is to make a device of this character that will move the type-form rapidly and accurately, carrying it at once to the position required for printing, and arresting it instantly, and holding it in that position, with the desired character exactly in front of (or opposite to) the printing point, until such character has been printed.

By a "reciprocating movement determining element," I mean a part or collection of parts adapted and arranged to reciprocate, (that is to move backward and forward,) and to determine, by its movement, a movement of the type-form. By "independently reciprocating movement determining elements," I mean movement determining elements that are capable of reciprocating independently of each other—reciprocating movement determining elements each of which can act and effect its own proper movement of the type-form, whether any other acts to determine a movement of the type-form or not. I prefer to transmit motion from the keys or other controllers to the type-form or equivalent controlled part through and by means of the independently reciprocating movement determining elements—the independently reciprocating movement determining elements being independently reciprocating transmitters and each determining a certain movement of the type-form by transmitting so much motion to it. But this last is not indispensable, for in the form of device that I prefer to employ (illustrated in Figs. 14 and 15), the movement determining elements may, without any change whatever in so far as their connection with the aggregator part of the device and the type-form is concerned, serve not as transmitters, but as movement determiners only, each permitting a certain movement of the type-form—and the movement aggregator permitting a movement equal to the sum of the movements permitted by the movement determining elements acting—under the influence of a force transmitted to the type-form in some other way than through the reciprocating movement determining elements.

The form of reciprocating movement determining element that I prefer to use is what I term a double-acting versed-sine transmitter. By a "versed-sine transmitter," I mean a part (or a collection of parts) which receives a certain angular movement (or certain angular movements) and transmits to the part with which it is connected a motion proportional to the versed-sine of the arc which it has described, if there be but one such part, and to the algebraic sum of the versed-sines of the arcs which they have described, if there be a plurality of parts acting together. By a "double acting versed-sine transmitter," I mean a versed-sine transmitter which is capable of transmitting a movement in a certain direction and resisting the continuance of the movement thus transmitted—a versed-sine transmitter capable of acting to move a part (for instance the type-form), through a certain space and to resist its movement through a greater space under the influence of the acquired momentum. I prefer to use as a double acting versed-sine transmitter, two rigid parts jointed together by a center-pin or in some other suitable manner, arranged to lie normally substantially parallel or in line with each (that is with their radial lines substantially parallel or in line with each other), and to be moved from this position of parallelism or alignment with each other by the depressing of the key with which they are connected.

In Fig. 14 (and also in the alternative constructions illustrated in Figs. 27 and 28) $m'$ and $t'$ form one double-acting versed-sine transmitter: $m^2$ and $t^2$ form another; $m^4$ and $t^4$, another; $m^8$ and $t^8$ another.

In Fig. 15, $o'$ and $v'$ form one double-acting versed-sine transmitter; $o^2$ and $v^2$ another; $o^4$ and $v^4$ another.

In the alternative construction illustrated in Fig. 25, each pair of radius bars $u^{22}$, $u^{22}$, is a double-acting versed-sine transmitter. The particular form of double-acting versed-sine transmitter used is not indispensable. And while I prefer, as before said, to use as a double-acting versed-sine transmitter two parts suitably jointed together (as, for instance, by a pin-joint), a person skilled in mechanics will readily understand that two such parts are not indispensable, and that a versed-sine transmitter may be formed with but one angularly-moving part. One of the reasons why I prefer to use double acting versed-sine transmitters as movement determining elements is, that a movement determining element thus formed can be easily arranged in such a manner that it is normally locked against the thrusts and strains transmitted to it by the movement aggregator; another reason is that a versed-sine transmitter, properly arranged, offers but little resistance to the key when the finger first strikes it and a constantly increasing resistance as the key is depressed. This contributes to produce an elastic touch.

By the movement aggregator, I refer to that part of the device which unites in one the separate movements of the independently reciprocating movement determining elements. The movement aggregator is formed by the levers $u^2$, $u^4$ and $u^8$, with their connecting link $t^9$, in Fig. 14; by the levers $w^2$ and $w^4$, in Fig. 15; by the levers $u^2$, $u^4$, and $u^9$, with their connecting links $t^3$ and $t^5$, in Fig. 27; and by the levers $u'$, $u^2$ and $u^4$, in Fig. 28. In the alternative construction illustrated in Fig. 28, the pairs of links or radius bars $u^{22}$, $u^{22}$, &c., are arranged in such a manner that they the selves form (with their guides or bridles $u^{23}$, $u^{23}$, &c.), the movement aggregator; for each of the movement determining elements (except the one most remote in the series from the type-form), is capable of acting as a versed sine-transmitter, under the influence of the key with which it is connected, itself to determine a certain movement of the type-form, and also of aggregating with this movement, and passing on to the parts connecting it with the type-form, the movements of the versed-sine transmitters more remote in the series than it from the type-form.

Another important feature of my invention, as already explained, consists in constructing the movement synthesizer with its reciprocating movement-determining elements normally locked against the thrusts and strains transmitted by the movement aggregator. The movement determining elements may be thus locked in a variety of ways; but the most convenient way and the one that I prefer, is to employ, as the movement determining elements, double-acting versed-sine transmitters, and to arrange these double-acting versed sine transmitters so that they stand normally on their dead centers. The movement determining elements are thus locked against the thrusts and strains of the movement aggregator or other parts of the device and are not thrown out of their proper positions by such thrusts or strains; and at the same time said movement determining elements are free to move under the influence of their respective keys.

Another important feature of my invention consists in providing a stop or stops (preferably stops, though a single stop might be made to serve), for the reciprocating movement determining elements, and constructing, arranging and combining the parts in such a manner that the movement determining elements are first moved by the keys or other controllers, so that they effect a movement of the type-form, and are then pressed against the stops by the controllers, arrested by the stops, and held firmly in position by the joint action of the controllers and the stops, so that they determine promptly the movement of the type-form thus effected, and arrest the type-form instantly in the position required for printing the desired character. This feature of my invention, with the feature of normally locked movement determining elements before mentioned, and the movement aggregator before mentioned, formed of parts positively connected for to-and-fro motion with each other and with the movement determining elements and with the type-form, contribute to produce that easy, rapid and exact operation of the type-form which is indispensable to the usefulness of any typewriting machine.

An important feature of my invention consists in the combination of a plurality of keys, or other suitable controllers, with a type-form, and type-form positioning mechanism, including two levers which I shall for convenience' and distinction's sake (and for that reason alone), hereinafter term the first lever, and the second lever, said first lever being positively connected for to-and-fro motion with the type-form at one point in its (said first lever's) length for convenience' sake hereinafter termed the point, $1^a$, said first lever being also connected in a suitable manner with a key at another point in (its said lever's) length, hereinafter termed for convenience' sake the point $1^b$; said first lever being positively connected for to-and-fro motion with the second lever at a third point in its (said first lever's) length, for convenience' sake hereinafter termed the point $1^c$; said second lever being connected at one point in its length with the first lever, as before mentioned, and being also suitably connected with different keys at two other points in its (said second lever's) length, for convenience' sake hereinafter termed $2^a$ and $2^b$, respectively; whereby said second lever has two simple motions and a compound motion for positioning the type-form, to-wit, a simple motion on the point $2^a$, as a fulcrum, when key connected with said second lever at point $2^b$ acts; a simple motion on the point $2^b$ as a fulcrum, when key connected with said second lever at point $2^a$ acts; and a compound motion composed of the two simple motions before mentioned, when the keys connected with said second lever at points $2^a$ and $2^b$ act simultaneously; the aforesaid first lever having also two simple motions and a compound motion, for positioning the type-form, to-wit, a simple motion on the point $1^c$ as a fulcrum, when key connected with said first lever at point $1^b$, acts; a simple motion on the point $1^b$, as a fulcrum, when either or both of the keys connected with the aforesaid second lever at points $2^a$ and $2^b$ act; and a compound motion composed of the before-mentioned simple motions, when key connected with aforesaid first lever at point $1^b$ acts simultaneously with one or more of the keys connected with aforesaid second lever at point $2^a$ and $2^b$. This feature of my invention appears in several of the drawings; but the details there shown— the size, shape, and relative positions of the two levers which I here term for distinction's sake first and second, the manner of connecting said levers with each other and with the type-form, and the relative positions of the three points before mentioned (and termed for convenience' sake $1^a$, $1^b$ and $1^c$ respectively), at which the lever is connected respectively, with the type-form, the key (or keys), and the second lever, and the relative positions on the second lever of the before-mentioned points at which said second lever is connected with the first lever, and the points (termed for distinction's sake $2^a$ and $2^b$) at which it is connected with the two different keys, are by no means essential, and indeed may be varied *ad infinitum* without departing from my invention.

In Fig. 15, the levers marked $w^4$ and $w^2$, respectively, are illustrations of the arrangement of levers which I have termed for distinction's sake, in the statement of the invention as first and second levers. $w^4$ is the first lever and $w^2$ the second. The point at which $w^4$ is connected with the link $v^5$, is the point $1^a$; the point at which said lever is connected with the link $v^4$ is the point $1^b$; the point at which said lever is connected with the lever $w^2$ is the point $1^c$, and the points at which said last-named lever is connected with the links $v'$ and $v^2$, may be considered as the points $2^a$ and $2^b$ before mentioned.

In Fig. 14, the levers marked in the drawings $u^8$ and $u^4$ respectively, may be considered as illustrations of what is meant by the levers termed for convenience' and distinction's sake first and second levers in the statement of invention; in which case the point at which $u^8$ is connected with $t^{22}$ would be the point $1^a$; the point at which $t^8$ is connected with $u^8$ would be the point $1^b$; the point at which $u^8$ is connected with $t^9$ would be the point $1^c$; and the points at which $u^4$ is connected with $t^4$ and $u^2$ will be the points $2^a$ and $2^b$. Or still considering the lever $u^8$ as an illustration of the "first lever," $u^2$ may be considered as an illustration of the second lever, and its points of connection with the links $t'$ and $t^2$ will be the points $2^a$ and $2^b$. Or, still considering $u^2$ as the "second" lever, $u^4$ may be considered as the first lever, in which case, the point at which $u^4$ is connected with $t^9$ will be the point $1^a$; the point at which $u^4$ is connected with $t^4$, will be the point $1^b$; and the point at which $u^4$ is connected with $u^2$, will be the point $1^c$.

In Fig. 27, $u^9$ may be considered as the "first" lever (in the sense already mentioned), and either $u^2$ or $u^4$ as the "second" lever. Considering $u^2$ as the second lever, the point at which $u^9$ is connected with $t^{22}$, is the point $1^a$; the point at which $u^9$ is connected with $t^5$, is the point $1^b$; the point at which $u^9$ is connected with $t^3$, is the point $1^c$; the points at which $u^2$ is connected with $t'$ and $t^2$ respectively are the points $2^a$ and $2^b$. Considering $u^4$ as the second lever, the point at which $u^9$ is connected with $t^3$ is the point $1^b$; the point at which $u^9$ is connected with $t^5$ is the point $1^c$; and the points at which $u^5$ is connected with $t^4$ and $t^8$ are the points $2^a$ and $2^b$. It will be seen that if either of the points, $2^a$ or $2^b$, were fixed, (instead of being connected with keys,) the device would still be capable of useful operation, but to a less extent, for fewer compound motions could be made with the levers. It will also be obvious that a plurality of keys, may act upon the first lever at point $1^b$, and upon the second lever at points $2^a$ and $2^b$ as well as a simple key.

By type-form positioning mechanism, I mean mechanism whereby the type-form is brought into the positions required for the printing of the different characters. By a selecting device, I mean an arrangement by which the character to be printed is determined. The term is *nomen generalissimum*, and includes, *inter alia*, all sorts of movement synthesizers, and all kinds of type-form positioning mechanisms.

It will be obvious to any one familiar with the well nigh infinite variety of selecting devices that have been patented and proposed for type writers, that the arrangement of lever mechanism illustrated in the drawings may be used in a type-form positioning device without being directly connected with the type-form; and that it may be used in a selecting device without any sort of connection with the type-form. It will also be readily understood by a person skilled in the art and thoroughly familiar with all the various selecting devices patented and proposed to the public that the lever mechanism herein described may be used in a selecting device, whether said levers are positively connected for to-and-fro motion with their respective keys or not. It is only necessary that the lever or levers be connected with the controllers in such a manner that a motion of the lever or levers is effected by or results from a motion of the controllers. And it will be understood that the arrangement of levers herein described, connected with the type-form in a manner such as that described, may be used whether the movement determining elements serve to transmit motion through the levers to the type-form, or serve only to limit a movement of the type-form effected in some other way.

I wish it to be distinctly understood that I do not dedicate any part of my invention to the public and that I wish adequate and just protection for every feature of the machine and devices herein described that is new and useful and involves invention and in particular, I wish it to be understood in regard to the various modified and alternative constructions illustrated in Figs. 25 to 30 inclusive, forming different species under the same genus, and not properly patentable by specific claims herein, drawn to cover their peculiar features of novelty and invention, that I do not dedicate them to the public, or waive or abandon my right to patent them in other patents.

I do not claim herein the multiple printing mechanism herein described. The same forms the subject of a divisional application, Serial No. 446,990, filed September 24, 1892. Nor do I claim herein the mechanism for printing with the two hands alternately, herein described. The same forms the subject of another divisional application, Serial No. 446,991, filed September 24, 1892.

What I claim as my invention, and desire to secure by Letters Patent, is—

1. In a type writer or other similar machine, a movement synthesizer embracing (*a*) a plurality of independently reciprocating movement determining elements, and (*b*) a movement aggregator formed of parts positively connected for to-and-fro motion with each other and with the reciprocating movement determining elements before mentioned so that each movement, whether forward or backward, of any of the before mentioned movement determining elements, results in a corresponding motion of the movement aggregator.

2. In a type writer or other similar machine, and in combination, a plurality of keys; and a movement synthesizer embracing (a) a plurality of independently reciprocating movement determining elements corresponding with and controlled by the keys, and (b) a movement aggregator, formed of elements positively connected for to-and-fro motion with each other and with the reciprocating movement determining elements before mentioned.

3. In a type writer or other similar machine, and in combination, a type-form; and a movement synthesizer embracing (a) a plurality of independently reciprocating movement determining elements, and (b) a movement aggregator interposed between said reciprocating movement determining elements and the type-form, said movement aggregator being formed of parts positively connected for to-and-fro motion with the type-form, and with the before mentioned movement determining elements, and with each other, so that no considerable movement of the type-form can take place in the same arc or plane as that in which it moves in consequence of the action of the movement determining elements before mentioned, without a corresponding movement of one or more of said movement determining elements.

4. In a type writer or other similar machine and in combination, a plurality of keys; a type-form; and a movement synthesizer embracing (a) a plurality of independently reciprocating movement determining elements connected with, and controlled by, the keys, and (b) a movement aggregator interposed between such independently reciprocating movement determining elements and the type-form, said movement aggregator being formed of parts positively connected for to-and-fro motion with the movement determining elements before mentioned and with the type-form, and with each other, so that no considerable movement of the type-form can take place in the same arc or plane as that in which it moves in consequence of the action of the movement determining elements before mentioned, without a corresponding movement of one or more of the said movement determining elements.

5. In a type writer or other similar machine, and in combination a plurality of controllers, a part ultimately to be moved into different positions in the same arc or plane by the controllers before mentioned acting singly and in various combinations, and a movement synthesizer having (a) a plurality of independently reciprocating movement determining elements connected with the controllers before mentioned, and (b) a movement aggregator interposed between said movement determining elements and the before mentioned part ultimately to be moved into different positions, said movement aggregator being formed of parts positively connected for to-and-fro motion with the movement determining elements before mentioned, and with the part ultimately to be moved into different positions as before mentioned, and with each other, so that no considerable movement of the type-form (or other part ultimately to be moved), can take place in the same arc or plane as that in which it moves in consequence of the action of the movement determining elements before mentioned, without a corresponding movement of one or more of the said movement determining elements, before mentioned.

6. In a type writer or other similar machine, a movement synthesizer having a plurality of double-acting versed-sine transmitters.

7. In a type writer or other similar machine, and in combination, a plurality of controllers, a part to be moved into different positions in the same arc or plane by said controllers acting separately and acting together in various combinations; and a movement synthesizer, for this purpose, having a double-acting versed-sine transmitter connected with one of the controllers before mentioned and with the part to be moved into different positions as before mentioned.

8. In a type writer or other similar machine, and in combination, a plurality of keys; a type-form, to be moved into different positions in the same arc or plane by said keys acting singly and acting together in various combinations; and a movement synthesizer, for this purpose, having a double-acting versed-sine transmitter connected with one of the keys before mentioned and with the type-form.

9. In a type writer or other similar machine and in combination, a plurality of controllers, a part to be moved into different positions in the same arc or plane by the separate and by the combined action of the controllers before mentioned; and a movement synthesizer interposed between the controllers before mentioned and the part to be by them moved into different positions, said movement synthesizer embracing a plurality of double acting versed-sine transmitters (for example, cranks and links, or pairs of links), each of said versed-sine transmitters being connected with one of the controllers before mentioned in such a manner that it is moved thereby, said versed-sine transmitters being positively connected for to-and-fro motion with the type-form in such a manner that each of said versed-sine transmitters communicates substantially the same movement to the type-form whether any other of said versed-sine transmitters is communcating motion to it or not, so that when a plurality of said versed-sine transmitters act simultaneously, they communicate to the type-form, a movement substantially equal to the sum of the movements which each communicates to it when acting singly.

10. In a type writer or other similar machine, and in combination, a plurality of keys; a type-form; and a movement synthesizer interposed between the keys before mentioned and the type-form, said movement synthesizer embracing a plurality of double-acting versed-sine transmitters each of said versed-sine transmitters being connected with one of the keys before mentioned in such a manner that it is moved thereby, said versed-sine transmitters being positively connected with the type-form for to-and-fro motion in such a manner that each of said versed-sine transmitters communicates substantially the same movement to the type-form whether any other of said versed-sine transmitters is communicating motion to it or not, so that when a plurality of said versed sine-transmitters act simultaneously they communicate to the type-form a movement substantially equal in magnitude to the sum of the movements which each communicates to it when acting singly.

11. In a type writer or other similar machine, and in combination, a plurality of controllers, a part to be moved into different positions in the same arc or plane by said controllers acting separately and acting together in various combinations; and a movement synthesizer, for this purpose, having a plurality of double-acting versed-sine transmitters each formed by two stiff parts, lying normally substantially parallel or in line with each other, and being connected with each other, and with the part to be moved into different positions by the before mentioned controllers, and with one of said controllers, the controller serving to move the different parts of the versed-sine transmitter from their positions of parallelism or alignment with each other, so that they, by such their departure from parallelism or alignment with each other, move the type-form or other part to be moved into different positions by the controllers.

12. In a type writer or other similar machine, and in combination, a plurality of keys; a type-form; and a movement synthesizer having a plurality of double-acting versed-sine transmitters, each formed by two stiff parts lying normally substantially parallel or in line with each other, and being connected with each other, and with the type-form, and with one of the keys, the key serving to move the different parts of the versed-sine transmitter from their positions of parallelism or alignment with each other, so that they, by such their departure from parallelism or alignment with each other, move the type-form.

13. In a type writer or other similar machine, and in combination, a plurality of controllers, a part to be moved into different positions in the same arc or plane by the separate and by the combined action of the controllers before mentioned; a movement synthesizer for this purpose including one or more double-acting versed-sine transmitters formed of two stiff parts suitably connected with each other, one of said parts being fulcrumed or centered upon a fixed part, the other being fulcrumed or centered upon a movable part connected with the before mentioned part to be moved into different positions; said versed-sine transmitter being connected with one of the controllers before mentioned so that said controllers impart motion to said versed-sine transmitter which in turn moves the part ultimately to be moved.

14. In a type writer or other similar machine, and in combination, a plurality of keys; a type-form; a movement synthesizer including one or more double-acting versed-sine transmitters formed of two stiff parts suitably connected with each other one of said parts being fulcrumed or centered upon a fixed point, the other being fulcrumed or centered upon a movable part connected with the type-form; said versed-sine transmitter being connected with one of the keys before mentioned so that said key imparts motion to the versed-sine transmitter, which in turn moves the type-form.

15. In a type writer or other similar machine, a movement synthesizer embracing (a) a movement aggregator, and (b) a plurality of independently reciprocating movement determining elements, positively connected for to-and-fro motion with the movement aggregator, and normally locked against the thrusts and pressures transmitted by the movement aggregator.

16. In a type writer or other similar machine, and in combination, a plurality of controllers, a part, ultimately to be moved into different positions in the same arc or plane by said keys, acting singly and acting together in various combinations; a movement aggregator, for this purpose, formed of parts positively connected for to-and-fro motion with the type-form or other part ultimately to be moved, and with each other; and reciprocating connections between the keys and the movement aggregator, normally locked against the thrusts and strains resulting from the operation of the device.

17. In a type writer or other similar machine, and in combination, a plurality of keys; a type-form, to be moved into different positions in the same arm or plane by said keys, acting singly and acting together in various combinations; a movement aggregator, for this purpose, formed of parts positively connected for to-and-fro motion with the type-form and with each other; and reciprocating connections beneath the keys and the movement aggregator, normally locked against the thrusts, strains or pressures resulting from the operation of the device.

18. In a type writer or other similar machine, and in combination, a plurality of controllers; a movement synthesizer embracing (a) a plurality of independently reciprocating movement determining elements connected with and controlled by the controllers before mentioned, and (b) a movement aggregator positively connected for to-and-fro motion with the movement determining elements before mentioned; and a stop or stops for said movement determining elements; the parts being constructed, arranged and combined in such a manner that the movement determining elements before mentioned are first moved by the controllers, so that they effect a movement of the movement aggregator, and are then pressed by the controllers against the stop or stops before mentioned, so that they determine the movement of the movement aggregator, thus effected.

19. In a type writer or other similar machine, and in combination, a plurality of keys; a movement synthesizer embracing (a) a plurality of independently reciprocating movement determining elements connected with and controlled by, the keys, and (b) a movement aggregator positively connected for to-and-fro motion with the movement determining elements before mentioned; and a stop or stops for said movement determining elements; the parts being constructed, arranged and connected in such a manner that the movement determining elements before mentioned are first moved by the keys, so that they effect a movement of the movement aggregator, and are then pressed by the keys against the stop or stops before mentioned, so that they determine the movement of the movement aggregator thus effected.

20. In a type writer or other similar machine, and in combination, a plurality of controllers; a type-form; a movement synthesizer embracing (a) a plurality of independently reciprocating movement determining elements, connected with and controlled by the controllers before mentioned, and (b) a movement aggregator interposed between the before mentioned movement determining elements and the type-form, said movement aggregator being positively connected for to-and-fro motion with the type-form and with the movement determining elements before mentioned; and a stop or stops for the movement determining elements before mentioned; the parts being constructed, arranged and connected in such a manner that the movement determining elements before mentioned are first moved by the controllers before mentioned, so that they effect a movement of the type-form, and are then pressed by the controllers against the stop or stops before mentioned, and held firmly by the joint action of such stop and the controllers.

21. In a type writer or other similar machine, and in combination, a plurality of keys; a type-form; a movement synthesizer embracing (a) a plurality of independently reciprocating movement determining elements, connected with the keys before mentioned, and (b) a movement aggregator interposed between said movement determining elements and the type-form, said movement aggregator being positively connected for to-and-fro motion with the type-form and with the movement determining elements before mentioned; and a stop or stops for said movement determining elements; the parts being constructed, arranged and connected in such a manner that the afore-said movement determining elements are first moved by the keys before mentioned, so that they effect a movement of the type-form, and are then arrested by the stop or stops, and held firmly by the joint action of such stop and the keys; so that they determine the movement of the type form thus by them effected.

22. In a type writer or other similar machine and in combination, a plurality of controllers; a part to be moved into different positions in the same arc or plane by the before mentioned controllers acting singly and acting together in various combinations; and a movement synthesizer for this purpose interposed between the controllers and the part ultimately to be moved thereby, and embracing (a) a plurality of independently reciprocating movement determining elements connected with the controllers before mentioned so that they (the aforesaid movement determining elements), are moved thereby, and (b) one or more levers positively connected for to-and-fro motion with the movement determining elements before mentioned and with the type-form or other part ultimately to be moved.

23. In a type writer or other similar machine, and in combination, a plurality of keys; a type-form to be moved into different positions in the same arc or plane by said keys acting singly, and acting together in different combinations; and a movement synthesizer for this purpose interposed between the key and the part ultimately to be moved thereby, and embracing, (a) a plurality of independently reciprocating movement determining elements connected with the keys before mentioned, so that they (said movement determining elements) are moved thereby, and (b) one or more levers positively connected for to-and-fro motion with the independently reciprocating movement determining elements before mentioned and with the type-form.

24. In a movement synthesizer for a type-writer or other similar machine, and in combination, a plurality of controllers, a part to be moved into different positions in the same arc or plane by the joint and several action of such controllers; and a lever interposed between said controllers and the before mentioned controlled part, one or more of the said controllers being connected with the lever at one point, one or more of said controllers being connected with the lever at another point, the type-form or equivalent being connected with the lever at a third point, so that the controllers are capable of acting each independently of the other to determine a movement of the type-form or equivalent, and jointly to determine a movement of the type-form compounded of their several movements.

25. In a type writer or other similar machine, and in combination, a plurality of keys; a type-form; and a lever interposed between the keys and the type-form, one or more of the keys being connected with the lever at one point, one or more of the keys being connected with the lever at another point, and the type-form being connected with the lever at a third point, so that the keys are capable of acting each independently of the other to determine a movement of the type-form and jointly to determine a movement of the type-form compounded of their individual movements.

26. In a type writer or other similar machine, and in combination, a plurality of controlling parts; and a selecting device having two levers, hereinafter termed for distinction's sake, the first lever and the second lever, said first lever being connected in a suitable manner with one or more of the controlling parts before mentioned at one point in its (said first lever's) length, for convenience' sake hereinafter termed the point 1$^b$, and being also positively connected for to and fro motion with the second lever, at another point in its (said first lever's) length, for convenience hereinafter termed the point 1$^c$; the second lever being connected with the first lever at one point in its (said second lever's) length as before mentioned, and being also suitably connected with one or more of the controlling parts before mentioned, in a suitable manner at another point in its (said second lever's) length; all the parts being constructed, arranged and connected in such a manner that the first lever has two simple motions and a compound motion to-wit, a simple motion on the before mentioned point 1$^c$, as a fulcrum, when the controlling part or controlling parts connected with the aforesaid first lever at the point 1$^b$ act; a simple motion on the point 1$^b$, before mentioned, as a fulcrum when the controlling part or controlling parts before mentioned connected with the aforesaid second lever act; and a compound motion composed of the two motions before mentioned, when the controlling parts connected with said first and second levers act simultaneously.

27. In a type writer or other similar, machine and in combination, a plurality of keys; and a selecting device having two levers, hereinafter termed for distinction's sake the first lever, and the second lever, the first lever being connected in a suitable manner with one or more of the keys before mentioned at one point in its (said first lever's) length, for convenience' sake hereinafter termed the point 1$^b$, and being also positively connected for to-and-fro motion with the second lever at another point in its (said first lever's) length, for convenience' sake hereinafter termed the point 1$^c$; the second lever being connected with the first lever at one point in its (said second lever's) length as before mentioned, and being also suitably connected with one or more of the keys before mentioned, at another point in its (said second lever's) length; all the parts being constructed, arranged and connected in such a manner that the first lever has two simple motions and a compound motion to-wit, a simple motion on the before mentioned point 1$^c$, as a fulcrum, when the key or keys connected with the aforesaid first lever, at the point, 1$^b$ act; a simple motion on the point, 1$^b$, before mentioned, as a fulcrum, when the key or keys before-mentioned connected with the second lever act; and a compound motion composed of the two motions before mentioned, when the keys connected with the first and second levers act simultaneously.

28. In a type writer and other similar machine, and in combination, a plurality of keys; a type-form; and type-form positioning mechanism including two levers, hereinafter termed for distinction's sake the first lever, and the second lever, said first lever being positively connected for to-and-fro motion with the type-form at one point in its (said first lever's length) for convenience' sake hereinafter termed the point 1$^a$, and connected with one or more keys in a suitable manner at another point, for convenience' sake hereinafter termed the point 1$^b$, and positively connected for to-and-fro motion with the second lever at a third point in its (said first lever's) length for convenience' sake hereinafter termed the point 1$^c$; said second lever being connected with the first lever at one point in its (said second lever's) length, as before mentioned, and being also suitably connected with one or more of the keys at another point in its length; all the parts being constructed, arranged and connected in such a manner that the aforesaid first lever has two simple motions and a compound motion, to-wit, a simple motion on the before mentioned point 1$^c$, as a fulcrum, when the key or keys connected with said first lever, at the point 1$^b$, act; a simple motion on the point 1$^b$, before mentioned, as a fulcrum, when the key or keys before mentioned connected with the aforesaid second lever act; and a compound motion composed of the two motions before mentioned, when the keys connected with the first and second levers act simultaneously.

29. In a type writer or other similar machine, and in combination, a plurality of controlling parts, and a selecting device having two levers hereinafter termed for distinction's sake the first lever and the second lever, said first lever being connected in a suitable manner with one or more of the controlling parts before mentioned at one point in its (said first lever's) length, for convenience' sake hereinafter termed the point 1$^b$, and being also positively connected for to-and-fro motion with the second lever at another point in its (said first lever's) length, for convenience' sake hereinafter termed the point $1^c$, said second lever being connected with the first lever at one point in its (said second lever's) length, as before mentioned, and being also suitably connected with different ones of the controlling parts before mentioned at two other points in its (said second lever's) length, for convenience' sake hereinafter termed $2^a$ and $2^b$ respectively; whereby said second lever has two simple motions and a compound motion, to-wit, a simple motion on the point $2^a$, as a fulcrum, when controlling part connected with said second lever at point $2^b$ acts; a simple motion on the point $2^b$, as a fulcrum, when controlling part connected with said second lever at point $2^a$, acts; and a compound motion composed of the two simple motions before mentioned, when the controlling parts connected with said second lever at points $2^a$ and $2^b$ act simultaneously; the aforesaid first lever having also two simple motions and a compound motion, to-wit, a simple motion on the point $1^c$ as a fulcrum when controlling part connected with said first lever at point $1^b$ acts; a simple motion on the part $1^b$ as a fulcrum when either or both of the controlling parts connected with the before mentioned second lever at points $2^a$ and $2^b$ act; and a compound motion, composed of the before mentioned simple motions, when controlling part connected with the before mentioned first lever at point $1^b$ acts simultaneously with one or more of the controlling parts connected with the before mentioned second lever at points $2^a$ and $2^b$.

30. In a type writer or other similar machine, and in combination, a plurality of keys; and a selecting device having two levers, hereinafter termed for distinction's sake the first lever, and the second lever, said first lever being connected in a suitable manner with one or more of the keys before-mentioned at one point in its (said first lever's) length, for convenience' sake hereinafter termed the point $1^b$, and being also positively connected for to-and-fro motion with the second lever at another point in its (said first lever's), length, for convenience' sake hereinafter termed the point $1^c$; said second lever being connected with the first lever at one point in its (said second lever's) length, as before mentioned, and being also suitably connected with different ones of the keys before mentioned at two other points in its (said second lever's) length, for convenience' sake hereinafter termed $2^a$ and $2^b$ respectively; whereby said second lever has two simple motions and a compound motion, to-wit, a simple motion on the point $2^a$, as a fulcrum, when key connected with said second lever at point $2^b$ acts; a simple motion on the point $2^b$ as a fulcrum, when key connected with said second lever at point $2^a$, acts; and a compound motion composed of the two simple motions before mentioned, when the keys connected with said second lever at points $2^a$ and $2^b$ act simultaneously; the aforesaid first lever having also two simple motions and a compound motion, to-wit, a simple motion on the point $1^c$ as a fulcrum, when key connected with said first lever at point $1^b$ acts; a simple motion on the point $1^b$, as a fulcrum, when either or both of the keys connected with the second lever at points $2^a$ and $2^b$ act; and a compound motion composed of the before mentioned simple motions, when key connected with the first lever at point $1^b$ acts simultaneously with one or more of the keys connected with the second lever at points $2^a$ and $2^b$.

31. In a type writer or other similar machine, and in combination, a plurality of keys; a type-form; and type-form positioning mechanism including two levers hereinafter termed for distinction's sake the first lever, and the second lever, said first lever being positively connected for to-and-fro motion with the type-form at one point in its (said lever's) length, for convenience' sake hereinafter termed the point $1^a$, said first lever being also connected in a suitable manner with the key at another point in its (said lever's) length, hereinafter termed for convenience' sake the point $1^b$; said first lever being positively connected for to-and-fro motion with the second lever at a third point in its (said first lever's), length, for convenience' sake hereinafter termed the point $1^c$; the aforesaid second lever being connected at one point in its length with the first lever, as before mentioned, and being also suitably connected with different keys at two other points in its (said second lever's) length, for convenience' sake hereinafter termed $2^a$ and $2^b$, respectively; whereby said second lever has two simple motions and a compound motion for positioning the type-form to-wit, a simple motion on the point $2^a$, as a fulcrum, when key connected with said second lever at point $2^b$, acts; a simple motion on the point $2^b$, as a fulcrum, when key connected with said second lever at point $2^a$, acts; and a compound motion composed of the two simple motions before mentioned, when the keys connected with said second lever at points $2^a$ and $2^b$ act simultaneously; the aforesaid first lever having also two simple motions and a compound motion for positioning the type-form, to-wit, a simple motion on the point $1^c$ as a fulcrum, when key connected with said first lever at point $1^b$ acts; a simple motion on the point $1^b$, as a fulcrum, when either or both of the keys connected with the aforesaid second lever at points $2^a$ and $2^b$ act; and a compound motion composed of the before mentioned simple motions, when key connected with aforesaid first lever at point $1^b$ acts simultaneously with one or more of the keys connected with the aforesaid second lever at points $2^a$ and $2^b$.

32. In a type writer or other similar machine, and in combination, a plurality of controllers; a part to be moved into different positions in the same arc or plane by the individual and by the combined action of the controllers before mentioned; a plurality of rock-shafts connected with and controlled by the controllers; and a movement aggregator interposed between said rock-shafts and the type-form or other part to be moved into different positions by the before mentioned controllers.

33. In a type writer or other similar machine, and in combination, a plurality of keys; a type-form to be moved into different positions in the same arc or plane by the individual and by the combined action of the keys before mentioned; a plurality of rock-shafts connected with and controlled by the keys; and a movement aggregator interposed between said rock-shafts and the type-form.

34. In a type writer or other similar machine, and in combination, a plurality of controllers and a movement synthesizer formed of rock-shafts, rock-shaft arms and levers, suitably connected.

35. In a type writer or other similar machine, and in combination, a plurality of keys and a movement synthesizer formed of rock-shafts, rock-shaft arms and levers suitably connected.

36. In a type writer or other similar machine, and in combination, printing mechanism and a movable arm-rest connected therewith and serving as a shift, so that different characters are printed when the arm rest is in one position from what are printed when it is in another position.

37. In a type writer or other similar machine, a type-form and an arm key, the parts being connected in such a manner that a movement of the type-form is effected by a movement of the arm key.

38. In a type writer or other similar machine, and in combination, movement synthesizer mechanism and a movable arm-rest connected therewith.

39. In a type-writer or other similar instrument, an arm-rest key, as herein described.

40. In a type writer or other similar machine, and in combination, a type-form; movement synthesizer mechanism; a plurality of finger keys and an arm key connected with the movement synthesizer.

41. In a type-writer or other similar machine and in combination, a type-form; a plurality of type-form controlling keys; movement synthesizer mechanism interposed between the keys and the type-form; a paper carriage; spacing mechanism for the paper carriage including (a) a suitable toothed part connected with the carriage, (b) a loose dog or equivalent, (c) a fast dog, (d) a movable stop for the loose dog or equivalent, and (e) connections between the before-mentioned type-form controlling keys and the spacing mechanism; and a space key, connected with the before mentioned movable stop for the loose dog or equivalent, said space key serving when acted upon to move the movable stop before mentioned so as to permit of an onward movement of the carriage large enough for a character to be printed and for a space between two words in addition thereto.

42. In a type writer or other similar machine, and in combination, a type-form; a plurality of type-form controlling keys, movement synthesizer mechanism interposed between said keys and the type-form; a paper carriage; letter spacing mechanism connected with the paper carriage and with the type-form controlling keys and serving when brought into action by the type-form controlling keys to effect a lateral movement of the paper carriage through a certain space or distance; a space enlarger, serving when brought into action for that purpose to augment the last mentioned space; and a space key, serving when acted upon by the operator to bring the before mentioned space enlarger into action for the purpose before mentioned, the parts being constructed, arranged, and connected in such a manner that the space key before mentioned can be acted upon by the operator substantially simultaneously with the type-form controlling keys and an interverbal space made at the same time that a space is made for the printing of a letter.

43. In a type writer or other similar machine, and in combination, a type-form; a plurality of type-form controlling keys; movement synthesizer mechanism interposed between the type-form controlling keys and the type-form; a paper carriage; letter spacing mechanism for the paper carriage including (a) a suitable toothed part positively connected with the paper carriage, (b) a space determiner, serving normally to bear the pressure of the carriage motor-spring or equivalent and to hold the carriage from moving in the direction in which it is urged by such spring, (c) a releaser serving when moved from its normal position to relieve the space determiner of the pressure exerted on it by the carriage, (d) means serving when the before mentioned space determiner is released from the pressure of the carriage to move said space determiner in the opposite direction to that in which the carriage presses it, (e) a movable stop or space enlarger for increasing the movement of the space determiner before mentioned, said movable stop or space enlarger serving when in one position to permit a certain movement of the space determiner sufficient to allow, on the return of the releaser before mentioned to its normal position, of a movement of the carriage large enough to make room for a letter to be printed, and when in another position to permit a movement of the space determiner sufficient to allow, on the return of the releaser before mentioned to its normal position, of a movement of the carriage large enough to make room for a letter to be printed and for an inter-verbal space in addition thereto; and a space key; the type-form controlling keys and the space key before mentioned being both suitably connected with the spacing mechanism, the parts being constructed, arranged, and connected in such a manner that the movable stop or space enlarger occupies its first mentioned position when the typeform controlling keys alone are acted upon and its other position when the space key is acted upon by the operator simultaneously with the type-form controlling keys.

44. In a type writer or other similar machine, and in combination, a type-form; a plurality of type-form controlling keys; a movement synthesizer mechanism interposed between the type-form controlling keys and the type-form; a paper-carriage; letter spacing mechanism for the paper carriage including (a) a suitable toothed part positively connected with the paper carriage, (b) a space determiner serving normally to bear the pressure of the carriage motor-spring or equivalent and to hold the carriage from moving in the direction in which it is urged by such spring, (c) a releaser serving when moved from its normal position to release the space determiner from the pressure exerted on it by the carriage, (d) means serving when the before mentioned space determiner is released from the pressure of the carriage to move said space determiner in the opposite direction to that in which the carriage presses it, (e) a movable stop or space enlarger for increasing the movement of the space determiner before mentioned, said movable stop or space enlarger serving when in its normal position to permit a certain movement of the space determiner sufficient to allow (on the return of the releaser before mentioned to its normal position), of a movement of the carriage large enough to make room for a letter to be printed and serving when moved from its normal position to permit a movement of the space determiner sufficient to allow a movement of the carriage (on the return of the releaser to its normal position) large enough to make room for a letter to be printed and for an inter-verbal space in addition thereto; and a space key connected with the movable stop or space enlarger before mentioned, the type-form controlling keys being connected with the releaser before mentioned in such a manner that the same moves (or is moved) from its normal position when the type-form controlling keys are acted upon by the operator.

45. In a type writer or other similar machine, and in combination, a type-form; a plurality of type-form controlling keys; movement synthesizer mechanism interposed between the type-form controlling keys and the type-form; a paper carriage; letter spacing mechanism for the paper carriage including (a) a suitable toothed part positively connected with the paper carriage, (b) a space determiner serving normally to bear the pressure of the carriage motor-spring or equivalent and to hold the carriage from moving in the direction in which it is urged by such spring, (c) a releaser serving when moved from its normal position to relieve the space determiner of the pressure exerted on it by the carriage, (d) means serving when the before mentioned space determiner is released from the pressure of the carriage to move said space determiner in the opposite direction to that in which the carriage presses it, (e) a movable stop or space enlarger for increasing the movement of the space determiner before mentioned, said movable stop or space enlarger serving when in one position to permit a certain movement of the space determiner sufficient to allow (on the return of the releaser before mentioned to its normal position), of a movement of the carriage large enough to make room for a letter to be printed, and when in another position to permit a movement of the space determiner sufficient to allow (on the return of the releaser before mentioned to its normal position), of a movement of the carriage large enough to make room for a letter to be printed and for an inter verbal space in addition thereto; a single-space key; and a double-space key; the type-form controlling keys and the space keys before mentioned being suitably connected with the spacing mechanism, the parts being constructed, arranged and connected in such a manner that the movable stop or space enlarger occupies its first mentioned position when the single-space key or the type-form controlling keys alone are acted upon, and occupies its normal position when the double-space key is acted upon by the operator simultaneously with the type-form controlling keys.

46. In a type writer or other similar machine, and in combination, a type-form; a plurality of type-form controlling keys; movement synthesizer mechanism interposed between the type-form controlling keys and the type-form; a paper carriage; letter spacing mechanism for the paper carriage including (a) a suitable toothed part connected with the paper carriage, (b) a space determiner serving normally to bear the pressure of the carriage motor-spring or equivalent, and to hold the carriage from moving in the direction in which it is urged by such spring, (c) a releaser serving when moved from its normal position to release the space determiner from the pressure exerted on it by the carriage, (d) means serving when the before mentioned space determiner is released from the pressure of the carriage to move said space determiner in the opposite direction to that in which the carriage presses it, (e) a movable stop or space enlarger for increasing the movement of the space determiner before mentioned, said movable stop or space enlarger serving when in its normal position to permit a certain movement of the space determiner sufficient to allow (on the return of the releaser before mentioned to its normal position), of a movement of the carriage large enough to make room for a letter to be printed and serving when moved from its normal position to permit a movement of the space determiner sufficient to allow a movement of the carriage (on the return of the releaser to its normal position) large enough to make room for a letter to be printed and for an inter verbal space in addition thereto; a single-space key; and a double-space key; the single space key and the type-form controlling keys before mentioned being connected with the releaser before mentioned in such a manner that said releaser moves (or is moved) from its normal position when the single-space key or one or more of the type-form controlling keys are acted upon by the operator; the double space key being connected with the space enlarger before mentioned and serving when acted upon by the operator simultaneously with the type-form controlling keys to increase the space made by the carriage at its next movement.

47. In a type writer or other similar machine, and in combination, a type-form; a plurality of type-form controlling keys; movement synthesizer mechanism interposed between the type-form controlling keys and the type-form; a paper carriage; letter spacing mechanism for the paper carriage including (a) a suitable toothed part connected with the paper carriage, (b) a space determiner serving normally to bear the pressure of the carriage motor, spring or equivalent and to hold the carriage from moving in the direction in which it is urged by such spring, (c) a releaser serving when moved from its normal position to relieve the space determiner of the pressure exerted on it by the carriage, (d) means serving when the before mentioned space determiner is released from the pressure of the carriage to move said space determiner in the opposite direction to that in which the carriage presses it, (e) a movable stop or space enlarger for increasing the movement of the space determiner before mentioned, said movable stop or space enlarger serving when in one position to permit a certain movement of the space determiner sufficient to allow (on the return of the releaser before mentioned to its normal position) of a movement of the carriage large enough to make room for a letter to be printed, and when in another position to permit a movement of the space determiner sufficient to allow (on the return of the releaser before mentioned to its normal position) of a movement of the carriage large enough to make room for a letter to be printed and for an inter verbal space in addition thereto; a movable stop for the loose dog before mentioned, serving when moved from its normal position to increase the play of the loose dog; and a space key connected with the movable loose dog stop.

48. In a type writer or other similar machine, and in combination, a type-form; a plurality of type-form controlling keys; movement synthesizer mechanism interposed between the type-form controlling keys and the type-form; a paper carriage; letter spacing mechanism for the paper carriage including (a) a suitable toothed part connecting with the paper carriage, (b) a space determiner serving normally to bear the pressure of the carriage motor spring or equivalent and to hold the carriage from moving in the direction in which it is urged by such spring, (c) a releaser serving when moved from its normal position to release the space determiner from the pressure exerted on it by the carriage, (d) means serving when the before mentioned space determiner is released from the pressure of the carriage to move said space determiner in the opposite direction to that in which the carriage presses it, (e) a movable stop or space enlarger for increasing the movement of the space determiner before mentioned, said movable stop or space enlarger serving when in its normal position to permit a certain movement of the space determiner sufficient to allow (on the return of the releaser before mentioned to its normal position), of a movement of the carriage large enough to make room for a letter to be printed, and serving when moved from its normal position, to permit a movement of the space determiner sufficient to allow a movement of the carriage (on the return of the releaser to its normal position), large enough to make room for a letter to be printed and for an inter-verbal space in addition thereto; a single-space key; and a double-space key; the single-space key and the type-form controlling keys before mentioned being connected with the releaser before mentioned in such a manner that said releaser moves (or is moved) from its normal position when the single-space key or one or more of the type-form controlling keys are acted upon by the operator; the double-space key being connected with the space enlarger before mentioned and serving when acted upon by the operator simultaneously with the type-form controlling keys to increase the space made by the carriage at its next movement: a movable stop for the loose dog before mentioned, serving when moved from its normal position to increase the play of the loose dog; and a space key connected with the movable loose dog stop.

In testimony whereof I have hereunto set my hand, at Washington, in the District of Columbia, this 5th day of May, A. D. 1892.

THADDEUS CAHILL.

Witnesses:
ARTHUR T. CAHILL,
J. J. MALONE.